(12) United States Patent
Saito et al.

(10) Patent No.: US 11,034,087 B2
(45) Date of Patent: *Jun. 15, 2021

(54) SHAPING MATERIAL SUPPLY DEVICE AND THREE-DIMENSIONAL SHAPING APPARATUS

(71) Applicant: Seiko Epson Corporation, Tokyo (JP)

(72) Inventors: Koichi Saito, Matsumoto (JP); Kohei Yuwaki, Shiojiri (JP); Shunsuke Mizukami, Hokuto (JP); Kazuhide Nakamura, Asahi (JP)

(73) Assignee: Seiko Epson Corporation

( * ) Notice: Subject to any disclaimer, the term of this patent is extended or adjusted under 35 U.S.C. 154(b) by 120 days.

This patent is subject to a terminal disclaimer.

(21) Appl. No.: 16/109,976

(22) Filed: Aug. 23, 2018

(65) Prior Publication Data

US 2019/0061243 A1 Feb. 28, 2019

(30) Foreign Application Priority Data

Aug. 24, 2017 (JP) .................................. 2017-160830
Oct. 30, 2017 (JP) ............................. JP2017-208808
Oct. 30, 2017 (JP) ............................. JP2017-208812
Oct. 30, 2017 (JP) ............................. JP2017-208816

(51) Int. Cl.

| | |
|---|---|
| *B29C 64/209* | (2017.01) |
| *B33Y 30/00* | (2015.01) |
| *B22F 3/00* | (2021.01) |
| *B29C 64/35* | (2017.01) |
| *B29C 64/106* | (2017.01) |

(Continued)

(52) U.S. Cl.
CPC ............ *B29C 64/209* (2017.08); *B22F 10/10* (2021.01); *B28B 1/001* (2013.01); *B29C 64/106* (2017.08); *B29C 64/35* (2017.08); *B33Y 30/00* (2014.12)

(58) Field of Classification Search
CPC ... B29C 64/209; B29C 64/295; B29C 64/241; B29C 64/106; B29C 64/40; B33Y 30/00; B33Y 10/00; B33Y 70/00
See application file for complete search history.

(56) References Cited

U.S. PATENT DOCUMENTS

| | | | |
|---|---|---|---|
| 5,121,329 | A | 6/1992 | Crump |
| 5,340,433 | A | 8/1994 | Crump |
| 6,401,001 | B1 | 6/2002 | Jang et al. |

(Continued)

FOREIGN PATENT DOCUMENTS

| | | |
|---|---|---|
| CN | 103878979 A | 6/2014 |
| CN | 104290325 A | 1/2015 |

(Continued)

OTHER PUBLICATIONS

Extended European Search Report for Patent Application No. EP18190394.9, dated Jan. 17, 2019 (15 pages).

*Primary Examiner* — Nahida Sultana
(74) *Attorney, Agent, or Firm* — Harness, Dickey & Pierce, P.L.C.

(57) ABSTRACT

Provided is a shaping material supply device for use in a three-dimensional shaping apparatus, which includes a first flow path through which a shaping material flows, a nozzle that communicates with the first flow path and discharges the shaping material, and a flow rate regulation mechanism that includes a butterfly valve provided in the first flow path.

7 Claims, 31 Drawing Sheets

(51) Int. Cl.
 *B22F 10/10* (2021.01)
 *B28B 1/00* (2006.01)

(56) References Cited

U.S. PATENT DOCUMENTS

| | | | |
|---|---|---|---|
| 6,578,596 | B1 | 6/2003 | Batchelder et al. |
| 7,874,825 | B2* | 1/2011 | Khoshnevis ............ B29C 48/14 |
| | | | 425/114 |
| 2005/0015175 | A1 | 1/2005 | Huang |
| 2013/0141491 | A1* | 6/2013 | Krichtman ............. B33Y 40/00 |
| | | | 347/30 |
| 2014/0252668 | A1 | 9/2014 | Austin et al. |
| 2016/0046073 | A1* | 2/2016 | Hadas ................... B29C 48/345 |
| | | | 264/211.21 |
| 2017/0157820 | A1* | 6/2017 | Ward ..................... B29C 45/164 |
| 2017/0210069 | A1* | 7/2017 | Stubenruss ........... B29C 64/118 |
| 2017/0210074 | A1 | 7/2017 | Ueda et al. |
| 2017/0297107 | A1 | 10/2017 | Oka et al. |
| 2018/0200955 | A1 | 7/2018 | Hoelldorfer et al. |
| 2019/0022940 | A1* | 1/2019 | Hofmann ................ B29C 64/30 |
| 2019/0030811 | A1 | 1/2019 | Gasso et al. |
| 2019/0076924 | A1 | 3/2019 | Jepeal et al. |
| 2019/0168446 | A1 | 6/2019 | Leibig et al. |
| 2019/0375003 | A1* | 12/2019 | Mark ................... B22D 31/002 |
| 2020/0230942 | A1 | 7/2020 | Gasso et al. |

FOREIGN PATENT DOCUMENTS

| | | |
|---|---|---|
| CN | 204622625 U | 9/2015 |
| CN | 106573405 A | 4/2017 |
| EP | 3 437 837 A1 | 2/2019 |
| JP | H03-158228 A | 7/1991 |
| JP | 07-096534 A | 4/1995 |
| JP | 2006-192710 A | 7/2006 |
| JP | 2015-502870 A | 1/2015 |
| JP | 2017-035811 A | 2/2017 |
| JP | 2017-190505 A | 10/2017 |
| WO | WO-2015-135434 A1 | 9/2015 |
| WO | WO-2015-182675 A1 | 12/2015 |
| WO | 2017-008789 A1 | 1/2017 |

* cited by examiner

SHAPING MATERIAL SUPPLY DEVICE AND THREE-DIMENSIONAL SHAPING APPARATUS

This application claims priority under 35 U.S.C. § 119 to Japanese Patent Application No. 2017-160830 filed on Aug. 24, 2017, No. 2017-208816 filed on Oct. 30, 2017, No. 2017-208808 filed on Oct. 30, 2017, and No. 2017-208812 filed on Oct. 30, 2017, the entire disclosures of which are expressly incorporated by reference herein.

BACKGROUND

1. Technical Field

The present invention relates to a shaping material supply device and a three-dimensional shaping apparatus.

2. Related Art

A three-dimensional shaping apparatus using a fused deposition modeling (FDM) in which a melted resin material is discharged, deposited, and cured to manufacture a three-dimensional shaped object is known (for example, JP-A-2017-35811).

International Publication No. 2015/182675 discloses a three-dimensional shaping apparatus in which a resin material (filament) and carbon fibers are injected from a head.

In the fused deposition modeling in the related art, a solid filament made of a thermoplastic resin is supplied, and a tip part of the filament is softened while disposing the softened thermoplastic resin at a predetermined position on a virtual plane. Since the thermoplastic resin disposed at the predetermined position is softened, such a thermoplastic resin is bonded to a thermoplastic resin already placed at an adjacent position. An object having a three-dimensional shape is formed by repeatedly performing such processing while sequentially shifting positions in a direction perpendicular to the virtual plane.

Further, in the fused deposition modeling, only the thermoplastic resin delivered from a nozzle is softened and the other parts of the filament are not softened. Therefore, in a case where dislocation of the resin in a certain region is ended, supply of the filament is stopped and the nozzle is moved from a point where the thermoplastic resin is lastly disposed, thereby completing dislocation of the thermoplastic resin at the last point. At that time, in the nozzle, a softened thermoplastic resin which is connected to a thermoplastic resin already disposed outside the nozzle and a thermoplastic resin (filament) in parts which are not yet sufficiently softened are separated from each other.

On the other hand, in the field of foam molding machine, the following short filler has been proposed (JP-A-7-96534). This short filler includes a cylindrical filler tube portion, a rod head portion for opening and closing which is positioned near a tip opening of the filler tube body, a piston rod head which is connected to the rod head portion for opening and closing, is positioned in the filler tube body, and is driven by a piston of a drive cylinder, and a through-hole for bead grain feeding which is obliquely connected to the filler tube portion accommodating the piston rod.

Upon molding, the piston rod is retracted to open the tip opening of the filler tube body, and raw material beads are charged into a cavity via the through-hole for bead grain feeding. At that time, compressed air is jetted from the retracted rod head portion for opening and closing rod, and the raw material beads are supplied into a mold cavity. In a case where charging of the raw material beads is ended, the piston rod is advanced again to close the tip opening of the filler tube body. An opening for jetting the compressed air which is provided on a side surface of the rod head portion for opening and closing is closed by an inner wall of the tip opening of the filler tube body, and supply of the compressed air is stopped.

In a shaping process with a three-dimensional shaping apparatus, discharge and stopping of a melted material from a nozzle are repeated. However, a flow rate of a shaping material discharged from the nozzle is not controlled. Therefore, in a case where a three-dimensional shaped object has a complicated structure, it is not possible to manufacture a three-dimensional shaped object by properly changing the flow rate depending on a site to be formed. Further, in a case of stopping discharge of the material from the nozzle, outflow of the material from the nozzle is not immediately stopped, and thus, there is a case where timing of stopping the discharge of the material is delayed or a case where a discharge amount of the material becomes excessive than an amount as planned.

Further, in a case where the discharge of the material from the nozzle is resumed, due to delayed supply of the material to the nozzle, there is a case where ejection timing of the material is delayed or a case where a discharge amount of the material becomes insufficient (for example, JP-A-2017-35811 and International Publication No. 2015/182675).

Further, in the apparatus described in International Publication No. 2015/182675, supply of a material to a head is stopped by controlling a material feed device that supplies a resin material to the head and a fiber introduction device that supplies carbon fibers to the head. However, since the material feed device and the fiber introduction device are relatively distant from the head, it is difficult to stop injection of the material with good response.

Further, in the shaping process with a three-dimensional shaping apparatus, in a case where delivery of the resin material from the nozzle is stopped, there is a problem (hereinafter also referred to as "stringing") that, between a resin delivered from the nozzle and a melted resin remaining at a delivery port of the nozzle, the melted resin extends in a thread shape (for example, International Publication No. 2015/182675).

Further, at the time of forming an object having a three-dimensional shape, in a case of using a material which is melted in advance and has high fluidity and viscosity as compared with the fused deposition modeling, there is a possibility that a melted material in the nozzle and a melted material already disposed outside the nozzle are not appropriately separated in a case where disposition of a resin at a certain part is ended. That is, after a resin part connected in an elongated manner is formed between the both resins, the both resins are separated at any site of the elongated part. In such a case, a shape of the thermoplastic resin is not appropriately controlled at a point where the thermoplastic resin is lastly disposed. As a result, it is not possible to form an object having a three-dimensional shape with a highly accurate shape. Such a problem is also not taken into consideration in JP-A-7-96534 which discloses a technique of supplying solid raw material beads.

Thus, in the three-dimensional shaping apparatus, there is still room for improvement concerning adjustment of a discharge amount of the material from the nozzle and stopping of discharge of the material with good response.

SUMMARY

The invention can be realized in the following aspects or application examples.

Configuration 1

According to an aspect of the invention, there is provided a shaping material supply device for use in a three-dimensional shaping apparatus. The shaping material supply device includes a first flow path through which a shaping material flows, a nozzle that communicates with the first flow path and discharges the shaping material, and a flow rate regulation mechanism that includes a butterfly valve provided in the first flow path.

In this configuration, due to the butterfly valve provided in the first flow path through which the shaping material flows, it is possible to control initiation and stopping of discharge of the shaping material from the nozzle, and a discharge amount of the shaping material discharged from the nozzle. Therefore, it is possible to control initiation timing and stopping timing of the discharge of the shaping material from the nozzle, and the discharge amount of the shaping material with higher accuracy than a mode in which the flow rate regulation mechanism is not provided.

Configuration 2

In the shaping material supply device, the butterfly valve may include a plate-like member rotatably disposed in the first flow path, and a cross section in a plane perpendicular to a flow direction of the shaping material in a space, in the first flow path, in which the plate-like member is provided may be larger than a cross section in a plane perpendicular to the flow direction of the shaping material in a part, in the first flow path, in which the plate-like member is not provided.

In this configuration, a flow path around the flow rate regulation mechanism can be enlarged due to the space provided at the position including a plate-like member of the butterfly valve. That is, the flow rate around the plate-like member can become larger than in a mode in which no space is provided. Therefore, in a case where a surface direction of the plate-like member becomes parallel to a flow direction of the shaping material, it is possible to prevent the flow rate of the first flow path from being greatly limited by the plate-like member as compared with a mode in which the flow rate regulation mechanism is not provided.

Configuration 3

The shaping material supply device may further include a suction section that sucks the shaping material into a branched flow path connected to the first flow path so that a negative pressure is generated in the first flow path.

In this configuration, by causing the suction section to generate a negative pressure in the flow path of the shaping material, it is possible to quickly stop discharge of the shaping material from the nozzle.

Configuration 4

The shaping material supply device may further include a purge section that is connected to the first flow path and delivers gas to the first flow path.

In this configuration, by causing the purge section to send gas to an upstream side of the shaping material remaining in the first flow path, it is possible to quickly discharge the shaping material remaining in the first flow path from the nozzle. Therefore, it is possible to quickly stop the discharge of the shaping material from the nozzle.

Configuration 5

In the shaping material supply device, a position at which the purge section is connected to the first flow path may be close to the nozzle as compared with a position, in the first flow path, at which the butterfly valve is provided.

In this configuration, it is possible to quickly stop the discharge of the shaping material from the nozzle. In addition, it is possible to decrease a discharge amount of the shaping material remaining in the first flow path, as compared with a mode in which the position at which the purge section is connected to the first flow path is at an opposite side (that is, upstream side) to the nozzle across the flow rate regulation mechanism.

Configuration 6

The shaping material supply device may further include a control section for controlling the flow rate regulation mechanism and the purge section, in which the control section operates the purge section after closing the flow rate regulation mechanism to stop flow of the shaping material in the first flow path.

In this configuration, it is possible to execute control to operate the purge section after the flow path is closed by the flow rate regulation mechanism. Therefore, it is possible to control stopping of discharge of the shaping material from the nozzle with higher accuracy. In addition, in a case where gas is sent into the flow path by the purge section, it is possible to prevent the shaping material in the flow path from flowing backward to a flow path at an upstream side of the flow rate regulation mechanism.

Configuration 7

According to another aspect of the invention, there is provided a shaping material supply device for use in a three-dimensional shaping apparatus. The shaping material supply device may include a first flow path through which a shaping material flows, a second flow path capable of communicating with the first flow path, and a rotating body having a nozzle in communication with the second flow path and a flow rate regulation mechanism which is provided in the second flow path and regulates a flow rate of the second flow path. In a case where the rotating body is at a first rotational position, the first flow path and the second flow path are brought into a communication state, and the shaping material is delivered from the nozzle. In a case where the rotating body is at a second rotational position that is rotated by a predetermined angle or more from the first rotational position, the first flow path and the second flow path are brought into a non-communicating state, and an opening of the nozzle is closed by a member surrounding the rotating body so that the delivery of the shaping material from the nozzle is stopped.

In this configuration, by rotating the rotating body having the nozzle, it is possible to stop the delivery of the shaping material. Therefore, it is possible to stop the delivery of the shaping material with good response. In addition, due to the flow rate regulation mechanism provided in the second flow path through which the shaping material flows, initiation and stopping of the delivery of the shaping material from the nozzle and an amount of the shaping material to be delivered are controlled. Therefore, it is possible to control, with higher accuracy, initiation timing and stopping timing of the delivery of the shaping material from the nozzle, and a delivery amount of the shaping material.

Configuration 8

In the shaping material supply device, the flow rate regulation mechanism may change an area of the second flow path in a case of being projected onto a plane perpendicular to a flow direction of the shaping material, and may include a shutter capable of opening and closing the second flow path.

In this configuration, since the second flow path is opened and closed by the shutter, it is possible to perform initiation or stopping of the delivery of the shaping material from the nozzle at a more appropriate timing. In addition, due to closing of the second flow path by the shutter, leakage of the shaping material from the nozzle during the stopping of delivery of the shaping material from the nozzle is stopped.

Configuration 9

In the shaping material supply device, the flow rate regulation mechanism may include a butterfly valve that opens and closes the second flow path.

In this configuration, since the second flow path is opened and closed by the butterfly valve, it is possible to perform initiation or stopping of the delivery of the shaping material from the nozzle at a more appropriate timing. In addition, by adjusting an opening degree of the butterfly valve, it is possible to control an amount of the shaping material delivered from the nozzle.

Configuration 10

The shaping material supply device may further include a cutting portion on a side where the nozzle moves in a case where the rotating body rotates from the first rotational position to the second rotational position, with respect to a position of the nozzle in a case where the rotating body is at the first rotational position, in which the cutting portion and the rotating body is configured so that the cutting portion transverses the opening of the nozzle in a relative manner in a case where the rotating body rotates from the first rotational position to the second rotational position.

In this configuration, it is possible to control a shape of an end of the shaping material delivered to an outside of the nozzle to a certain shape. Therefore, it is possible to increase shaping accuracy of a three-dimensional shaped object. In addition, in a case of a shaping material including a material having thermoplastic properties as a main material, it is possible to suppress occurrence of stringing that, between a shaping material delivered from the nozzle and a melted shaping material remaining at a delivery port of the nozzle, the melted shaping material extends in a thread shape.

Configuration 11

In the shaping material supply device, the cutting portion may have a blade or a wire for cutting the shaping material.

In this configuration, it is possible to cut the shaping material with a simple configuration.

Configuration 12

The shaping material supply device may further include a control section that controls the flow rate regulation mechanism and the rotating body, in which the control section changes the rotating body from the first rotational position to the second rotational position after causing the flow rate regulation mechanism to close the second flow path so that flow of the shaping material in the second flow path is stopped.

In this configuration, it is possible to execute control to operate the rotating body operates after the second flow path is closed by the flow rate regulation mechanism. Therefore, it is possible to operate the rotating body after flow of the shaping material on a nozzle side (that is, on a downstream side) of the flow rate regulation mechanism is stopped. Therefore, it is possible to control a shape of an end of the shaping material to a certain shape, and it is possible to increase shaping accuracy of a three-dimensional shaped object. In addition, it is possible to more reliably suppress occurrence of stringing that, between a shaping material delivered to an outside of the nozzle and a shaping material remaining at a delivery port of the nozzle, the shaping material extends in a thread shape.

Configuration 13

According to yet another aspect of the invention, there is provided a three-dimensional shaping apparatus including the shaping material supply device.

Configuration 14

The three-dimensional shaping apparatus may further include a shaping material production section that melts at least a part of a material to produce a shaping material, in which the shaping material production section includes a facing portion that has a communication hole communicating with the first flow path and having a heater, and a flat screw that faces the facing portion, is rotated to send the material to the communication hole while melting at least a part of the material to produce the shaping material, and includes a groove portion for supplying the shaping material to the communication hole, and at least a part of the material supplied between the flat screw and the facing portion is melted due to rotation of the flat screw and heating by the heater, and the shaping material is produced.

In this configuration, since at least a part of the material is melted by the flat screw and the heater to produce the shaping material, it is possible to decrease a size of the entire apparatus.

Configuration 15

According to yet another aspect of the invention, there is provided a shaping material supply device for use in a three-dimensional shaping apparatus. The shaping material supply device includes a shaping material production section in which at least a part of a material is melted to produce a shaping material, a nozzle that injects the shaping material, a flow path through which the shaping material produced by the shaping material production section is supplied to the nozzle, a closure member at least a part of which is disposed in the nozzle and is capable of closing the nozzle, and a drive portion that displaces the closure member to open and close the nozzle. The closure member and the drive portion are configured so that an end surface of a first opening which is an opening of the nozzle is closed by the closure member.

In this configuration, in a case where disposition of the shaping material is ended, it is possible to end supply of the shaping material without leaving a shaping material, that is connected to a shaping material outside the nozzle, in the nozzle due to the closure member. Therefore, there is a low possibility that the shaping material remaining in the nozzle and the shaping material already disposed outside the nozzle are connected to each other in an elongated manner and then separated from each other. Accordingly, it is possible to form an object having a three-dimensional shape with a highly accurate shape.

Configuration 16

In the shaping material supply device, the shaping material production section may include an outflow path through which the shaping material, at least a part of which is melted, flows out to the flow path, a groove portion which is provided on a surface disposed in a direction facing a second opening which is an opening of an entrance end portion of the outflow path, and allows the material to be transported so that an angular position is changed with respect to the second opening while approaching the second opening, and supplied to the outflow path, and a first heating portion which is disposed at a position facing the groove portion and heats the material transported in the groove portion.

In this configuration, it is possible to miniaturize a configuration of a shaping material supply device, as compared with a shaping material supply device in which a groove portion for transporting a material is provided on a columnar side surface of a rotating shaft.

Configuration 17

In the shaping material supply device, the nozzle may include a first partial flow path in which a cross-sectional shape of an internal space becomes smaller as it goes downstream in a transport direction of the shaping material, in which the closure member and the drive portion are configured so that, in the first partial flow path, a tip of the closure member can be displaced with respect to the transport direction of the shaping material.

In this configuration, by displacing the tip of the closure member in the first partial flow path, it is possible to change flow resistance of the shaping material in the first partial flow path. As a result, it is possible to control a supply amount of the shaping material per unit time from the nozzle.

Configuration 18

In the shaping material supply device, the nozzle may include, on a downstream side of the first partial flow path, a second partial flow path in which a cross-sectional shape of an internal space is constant in a transport direction of the shaping material, and the closure member may include a first closure portion in which a cross-sectional shape of an internal space is constant with respect to a transport direction of the shaping material, in which the closure member and the drive portion are configured so that the first closure portion can be inserted into and close the second partial flow path.

In this configuration, before stopping supply of the shaping material, the shaping material in a discharge amount corresponding to a displacement speed of the closure member is supplied from the second partial flow path of the nozzle. Therefore, a shape of a tail end of the shaping material supplied to an outside of the nozzle is properly controlled.

Configuration 19

In the shaping material supply device, the closure member may include a second closure portion in which a cross-sectional shape of an internal space becomes smaller as it goes downstream in the transport direction of the shaping material, in which the closure member and the drive portion are configured so that, in the first partial flow path of the nozzle, the second closure portion can be displaced with respect to the transport direction of the shaping material, and the first partial flow path of the nozzle can be closed by the second closure portion.

In this configuration, by displacing the second closure portion in a flow direction in the first partial flow path, it is possible to change a cross-sectional area of a space in the first partial flow path. As a result, it is easy to quantitatively control the flow resistance of the shaping material.

Configuration 20

The shaping material supply device may further include a second heating portion for heating the closure member.

In a part where a space through which the material flows becomes narrowed due to the closure member, resistance in a case of flowing the melted material becomes large. However, in this configuration, the shaping material around the closure member positioned in the flow path is heated by the second heating portion, and fluidity thereof is increased. Therefore, clogging of the shaping material is unlikely to occur even in a part where the space through which the shaping material flows becomes narrowed due to the closure member.

Configuration 21

The shaping material supply device may further include a cooling portion which can cause a tip portion including the first opening of the nozzle to have a temperature lower than a body portion positioned on an upstream side of the tip portion in the transport direction of the shaping material.

In this configuration, by cooling the tip portion of the nozzle with the cooling portion, it is possible to control a viscosity of the shaping material pushed out of the nozzle.

Configuration 22

In the shaping material supply device, the flow path may include a downstream part extending from the nozzle to a side opposite to a side having the first opening, and an upstream part connected to the downstream part at an angle of less than 90 degrees, in which the drive portion and the closure member are connected through a wall portion that constitutes the upstream part and is positioned on a side opposite to the first opening.

In this configuration, it is possible to connect the drive portion and the closure member with each other while disposing the drive portion outside the flow path. Meanwhile, it is possible to dispose the upstream part of the flow path so as to avoid the drive portion while making resistance at the connection part between the upstream part and the downstream part small, as compared with a mode in which the upstream part and the downstream part are connected to each other at 90 degrees.

Configuration 23

According to yet another aspect of the invention, there is provided a three-dimensional shaping apparatus for shaping a member having a three-dimensional shape, including the shaping material supply device.

Configuration 24

According to yet another aspect of the invention, there is provided a three-dimensional shaping apparatus for shaping a member having a three-dimensional shape. The three-dimensional shaping apparatus includes the shaping material supply device; a shaping pedestal for receiving a shaping material supplied from the shaping material supply device; a movement mechanism for transporting at least one of the shaping material supply device and the shaping pedestal; and a control section that controls the shaping material supply device and the movement mechanism. The control section can synchronize a supply speed for supplying the shaping material from the shaping material supply device to an outside and a transport speed caused by the movement mechanism.

In this configuration, it is possible to dispose a certain amount of the shaping material at each position while changing a transport speed of the shaping material supply device.

Configuration 25

According to yet another aspect of the invention, there is provided a three-dimensional shaping apparatus for manufacturing a three-dimensional shaped object by using a thermoplastic material having thermoplastic properties. The three-dimensional shaping apparatus includes a plasticization section for plasticizing at least a part of the material to be converted into a shaping material; a first flow path to which the shaping material is supplied from the plasticization section; a second flow path capable of communicating with the first flow path; and a rotating body having an injection port communicating with the second flow path, in which, in a case where the rotating body is at a first rotational position, the first flow path and the second flow path are brought into a communication state, and the shaping material is injected from the injection port, and, in a case where the rotating body is at a second rotational position that is rotated by a predetermined angle or more from the first rotational position, the first flow path and the second flow path are brought into a non-communicating state, and injection of the shaping material from the injection port is stopped.

In this configuration, since the injection of the shaping material can be stopped by rotating the rotating body having the injection port, it is possible to stop the injection of the shaping material with good response.

Configuration 26

The three-dimensional shaping apparatus may further include a cutting portion on a direction side of the injection port being moved in a case where the rotating body rotates from the first rotational position to the second rotational position, rather than a position of the injection port in a case where the rotating body is at the first rotational position, in which the shaping material injected from the injection port is cut by the cutting portion due to rotation of the rotating body from the first rotational position to the second rotational position.

In this configuration, since a shape of an end of the shaping material can be adapted to a certain shape, it is possible to increase shaping accuracy of a three-dimensional shaped object.

Configuration 27

In the three-dimensional shaping apparatus, the cutting portion may include a blade or a wire for cutting the shaping material. In this configuration, it is possible to cut the shaping material with a simple configuration.

Configuration 28

In the three-dimensional shaping apparatus, the plasticization section may include a flat screw that has a scroll groove forming surface, on which a scroll groove is formed, and is rotated by a drive motor, and a screw facing portion that faces the scroll groove forming surface, has a communication hole formed at the center which communicates with the first flow path, and has a heater, in which at least a part of the material supplied between the flat screw and the screw facing portion is plasticized and converted into a shaping material by rotation of the flat screw and heating by the heater.

In this configuration, since at least a part of the material is plasticized by the flat screw and the heater, it is possible to decrease a size of the entire apparatus.

Not all of a plurality of constituent elements of the respective aspects of the invention as described above are essential. In order to solve a part or all of the problems as described above or to achieve a part or all of the effects described in this specification, it is possible to appropriately make a change, a deletion, a replacement with new other constituent elements, and a partial deletion of limited contents with respect to some constituent elements of the plurality of constituent elements. In addition, in order to solve a part or all of the problems or to achieve a part or all of the effects described in this specification, it is also possible to combine a part or all of the technical features included in one aspect of the invention as described above with a part or all of the technical features included in the other aspects of the invention as described above into one independent aspect of the invention.

The invention can be realized in various aspects other than the shaping material supply device and the three-dimensional shaping apparatus. For example, the invention can be realized in aspects such as a method of discharging a shaping material and a method of shaping a three-dimensional shaped body by using a shaping material. In addition, the invention can be realized in aspects such as a control method of a three-dimensional shaping apparatus, a computer program for controlling a flow rate regulation mechanism, and a non-temporary recording medium in which the computer program is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
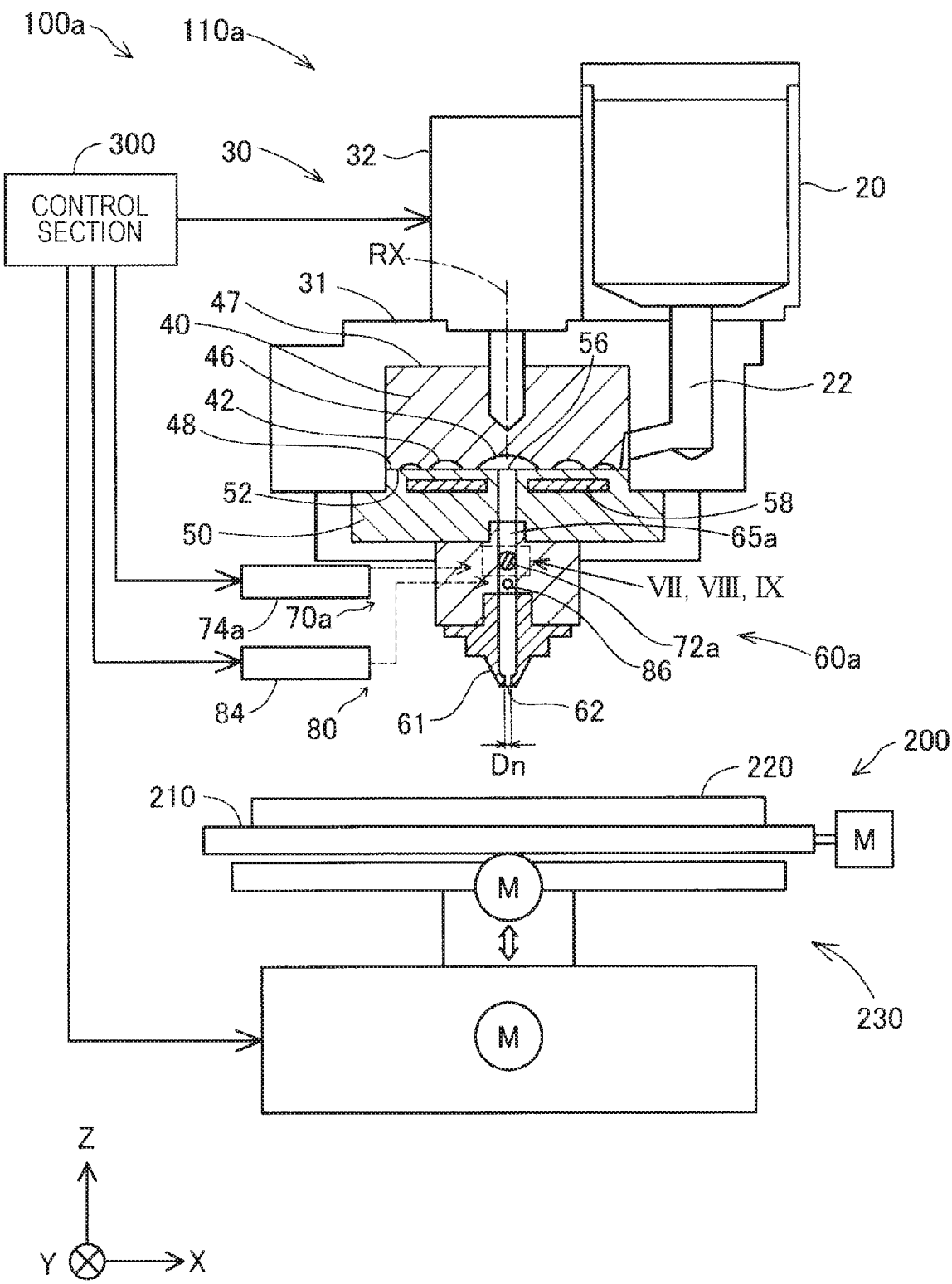
FIG. 1 is a schematic view showing a configuration of a three-dimensional shaping apparatus according to a first embodiment.

Hereinafter, embodiments of the invention will be described with reference to the accompanying drawings. In the following embodiments, the same reference numerals are given to the same constituent members, and explanations thereof are omitted or simplified in some cases.

Further, in the accompanying drawings, arrows indicating X, Y, Z directions orthogonal to one another are shown. The X direction and the Y direction are directions parallel to a horizontal plane, and the Z direction is a direction opposite to a gravity direction. The arrows indicating the X, Y, Z directions are shown, as necessary, to correspond to the respective drawings as well.

Materials and shaping materials used in the following embodiments will be described. In a three-dimensional shaping apparatus, for example, it is possible to shape a shaped object by using a shaping material including, as a main material, various materials such as material having thermoplastic properties, metal material, or ceramic material. Here, the "main material" means a material that becomes a central material in forming a shape of a shaped object, and means a material occupying a content of 50% by weight or more in the shaped object. The above-mentioned shaping materials include those obtained by melting main materials thereof alone, and those obtained by melting of some components contained together with the main material to form paste.

In a case where the material having thermoplastic properties is used as the main material, the material is plasticized to produce a shaping material. "Plasticization" means that a material having thermoplastic properties is heated and melted.

As the material having thermoplastic properties, for example, the following thermoplastic resin materials can be used.

Examples of Thermoplastic Resin Material

General purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate; engineering plastics such as polysulfone, polyethersulfone, polyphenylene sulfide, polyarylate, polyimide, polyamide imide, polyether imide, and polyether ether ketone.

Into the material having thermoplastic properties, pigment, metal, or ceramic, an additive such as wax, flame retardant, antioxidant, or thermal stabilizer, and the like may be incorporated.

In the three-dimensional shaping apparatus, for example, the following metal material may be used as a main material instead of the above-mentioned material having thermoplastic properties. In this case, it is desirable that a powder material obtained by pulverizing the following metal material is mixed with components that are melted during production of a shaping material, and the mixture is charged into a shaping material production section.

Examples of Metal Material

A single metal of magnesium (Mg), iron (Fe), cobalt (Co), chromium (Cr), aluminum (Al), titanium (Ti), copper (Cu), or nickel (Ni), or alloys containing at least one of these metals.

Examples of Alloys

Maraging steel, stainless steel, cobalt chromium molybdenum, titanium alloy, nickel alloy, aluminum alloy, cobalt alloy, cobalt chromium alloy.

In the three-dimensional shaping apparatus, it is possible to use a ceramic material as a main material instead of the above-mentioned metal material. As the ceramic material, for example, oxide ceramics such as silicon dioxide, titanium dioxide, aluminum oxide, and zirconium oxide, non-oxide ceramics such as aluminum nitride, and the like can be used. In a case where the above-mentioned metal material or ceramic material is used as the main material, a shaping material disposed on a shaping pedestal may be hardened by sintering.

A powder material of the metal material or the ceramic material used as the main material may be a mixed material obtained by mixing a plurality of types of single metal powder, alloy powder, and ceramic material powder. In addition, the powder material of the metal material or the ceramic material may be coated with, for example, the above-mentioned thermoplastic resin or other thermoplastic resin. In this case, the thermoplastic resin may be melted in the shaping material production section to develop fluidity.

To the powder material of the metal material or the ceramic material used as the main material, for example, the following solvent may be added. As the solvent, one type selected from the following can be used, or two or more types selected therefrom can be used in combination.

Examples of Solvent

Water, (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl n-butyl ketone, diisopropyl ketone, and acetylacetone, alcohols such as ethanol, propanol, and butanol, tetraalkylammonium acetates, sulfoxide type solvents such as dimethylsulfoxide and diethylsulfoxide, pyridine type solvents such as pyridine, γ-picoline and 2,6-lutidine, ionic liquids such as tetraalkylammonium acetate (for example, tetrabutylammonium acetate) and butyl carbitol acetate, and the like.

Besides, to the powder material of the metal material or the ceramic material used as the main material, for example, the following binder may be added.

Examples of Binder

Acrylic resin, epoxy resin, silicone resin, cellulosic resin or other synthetic resin, or polylactic acid (PLA), polyamide (PA), polyphenylene sulfide (PPS), polyether ether ketone (PEEK), or other thermoplastic resin.

In the shaping material supply device and the three-dimensional shaping apparatus in each of the following embodiments, an aspect in which a shaped object is shaped by using a shaping material including a material having thermoplastic properties as a main material will be described as an example.

First Embodiment

FIG. 1 is a schematic view showing a configuration of a three-dimensional shaping apparatus 100a according to a first embodiment.

The three-dimensional shaping apparatus 100a includes a discharge unit 110a, a shaping stage section 200, and a control section 300. In the three-dimensional shaping apparatus 100a, under control of the control section 300, a three-dimensional shaped object is shaped by discharging a shaping material from the nozzle 61 of the discharge unit 110a onto the shaping pedestal 220 of the shaping stage section 200.

The discharge unit 110a includes a material supply portion 20, a shaping material production section 30, and a shaping material supply device 60a. The material supply portion 20 is constituted by a hopper, and a lower outlet port is connected to the shaping material production section 30 via a communication path 22. The material supply portion supplies a material having thermoplastic properties to the shaping material production section 30.

As the material to be charged into the material supply portion 20, the above-mentioned materials can be used. These materials are charged into the material supply portion 20 in a state of solid materials such as pellets and powders. In addition, as described above, into the material having thermoplastic properties to be charged into the material supply portion 20, pigments, metals, ceramics, or the like may be incorporated.

The shaping material production section 30 melts the material supplied from the material supply portion 20 and causes it to flow into the shaping material supply device 60a. The shaping material production section 30 includes a screw case 31, a drive motor 32, a flat screw 40, and a facing portion 50.

The flat screw 40 is a substantially columnar screw of which a height in an axial direction (direction along the center axis) is smaller than a diameter thereof, and in which a groove portion 42 is formed on the lower surface 48 that is a surface intersecting with a rotation axis RX thereof. The communication path 22 of the above-described material supply portion 20 is connected to the groove portion 42 from a side surface of the flat screw 40. A specific shape of the flat screw 40 will be described later.

The flat screw 40 is disposed so that an axial direction thereof is parallel to the Z direction and rotates along a circumferential direction. In FIG. 1, the rotation axis RX of the flat screw 40 is indicated by a dot-and-dash line. In the first embodiment, the center axis of the flat screw 40 and the rotation axis RX thereof coincide with each other.

The flat screw 40 is housed in the screw case 31. An upper surface 47 of the flat screw 40 is connected to the drive motor 32. The flat screw 40 is rotated in the screw case 31 by a rotational driving force generated by the drive motor 32. The drive motor 32 is driven under control of the control section 300.

The lower surface 48 of the flat screw 40 faces the upper surface 52 of the facing portion 50. A space is formed between the groove portion 42 provided on the lower surface 48 and the upper surface 52 of the facing portion 50. In the discharge unit 110a, the material having thermoplastic properties supplied from the material supply portion 20 flows through this space.

The facing portion 50 is a substantially columnar member of which a height in the axial direction (direction along the center axis) is smaller than a diameter thereof. One circular surface of the facing portion 50 faces the lower surface 48 of the flat screw 40, and the other circular surface is connected to the shaping material supply device 60a. A heater 58 for heating the material is embedded in the facing portion 50.

The material having thermoplastic properties supplied into the groove portion 42 flows along the groove portion 42 by rotation of the flat screw 40 while being melted by the rotation of the flat screw 40 and heating by the heater 58 and converted into a shaping material, and guided to a central portion 46 of the flat screw 40 as described later. The shaping material flowing into the central portion 46 is supplied to the shaping material supply device 60a via a communication hole 56 provided at the center of the facing portion 50.

In the shaping material supply device 60a, the shaping material supplied from the facing portion 50 flows in an internal flow path and is discharged from the nozzle 61. The shaping material supply device 60a has the nozzle 61, a first flow path 65a, the flow rate regulation mechanism 70a, and a purge section 80.

The nozzle 61 discharges the shaping material from the discharge port 62 at a tip. The discharge port 62 is an opening having a hole diameter Dn formed in the nozzle 61, and is connected to the communication hole 56 through the first flow path 65a. The first flow path 65a is a flow path of the shaping material between the flat screw 40 and the nozzle 61. In the first embodiment, a shape of a cross section perpendicular to a flow direction of the shaping material in the first flow path 65a is a circular shape having a diameter Wd (see FIG. 7). The shaping material melted in the shaping material production section 30 flows from the communication hole 56 to the first flow path 65a and is discharged from the discharge port 62 of the nozzle toward the shaping pedestal 220 of the shaping stage section 200.

A shaping material including a material having thermoplastic properties as a main material is heated to a temperature equal to or higher than a glass transition point thereof and is injected from the nozzle 61 in a completely melted state. For example, ABS resin has a glass transition point of about 120° C. and is at about 200° C. at the time of being injected from the nozzle 61. In order to inject the shaping material in such a high temperature state, a heater may be provided around the nozzle 61.

Further, the shaping material produced by heating is cured by a decrease in temperature after being discharged from the nozzle 61.

The flow rate regulation mechanism 70a is provided in the first flow path 65a and controls a flow rate of the shaping material flowing through the first flow path 65a. The flow rate regulation mechanism 70a includes the butterfly valve 72a, a valve drive portion 74a, and a drive shaft 76a (see FIG. 7). The valve drive portion 74a is driven under control of the control section 300. A mechanism for modulating a flow rate of the first flow path 65a by the flow rate regulation mechanism 70a will be described later.

The purge section 80 is connected to the first flow path 65a and includes a mechanism for delivering gas into the first flow path 65a. The purge section 80 has a delivery path 82 (see FIG. 6), a purge drive portion 84, and a delivery port 86. In the first embodiment, the purge section 80 is provided close to the nozzle 61 (that is, on a downstream side) as compared with a position where the flow rate regulation mechanism 70a is provided in the first flow path 65a. The gas delivered to the first flow path 65a by the purge section 80 pressure-feeds the shaping material in the first flow path 65a to the discharge port 62. The mechanism for delivering the gas to the first flow path 65a by the purge section 80 will be described later.

The shaping stage section 200 is provided at a position facing the nozzle 61 of the shaping material supply device 60a. The shaping stage section 200 includes a table 210, a shaping pedestal 220 placed on the table 210, and a movement mechanism 230 for displacing the shaping pedestal 220. The movement mechanism 230 includes three motors as denoted "M" in FIG. 1. The movement mechanism 230 is constituted by a triaxial positioner that moves the shaping pedestal 220 in three axial directions, which are X, Y, and Z directions, by driving forces of the three motors. The shaping stage section 200 changes a relative positional relationship between the nozzle 61 and the shaping pedestal 220 under control of the control section 300.

The control section 300 can be realized by, for example, a computer including a processor such as a CPU, a main memory, and a nonvolatile memory. In the nonvolatile memory in the control section 300, a computer program for controlling the three-dimensional shaping apparatus 100a is stored. The control section 300 drives the discharge unit 110a to discharge the shaping material to a position of coordinates on the shaping pedestal 220 depending on a shaping data, thereby executing a shaping process of shaping a three-dimensional shaped object.

Figure 2:
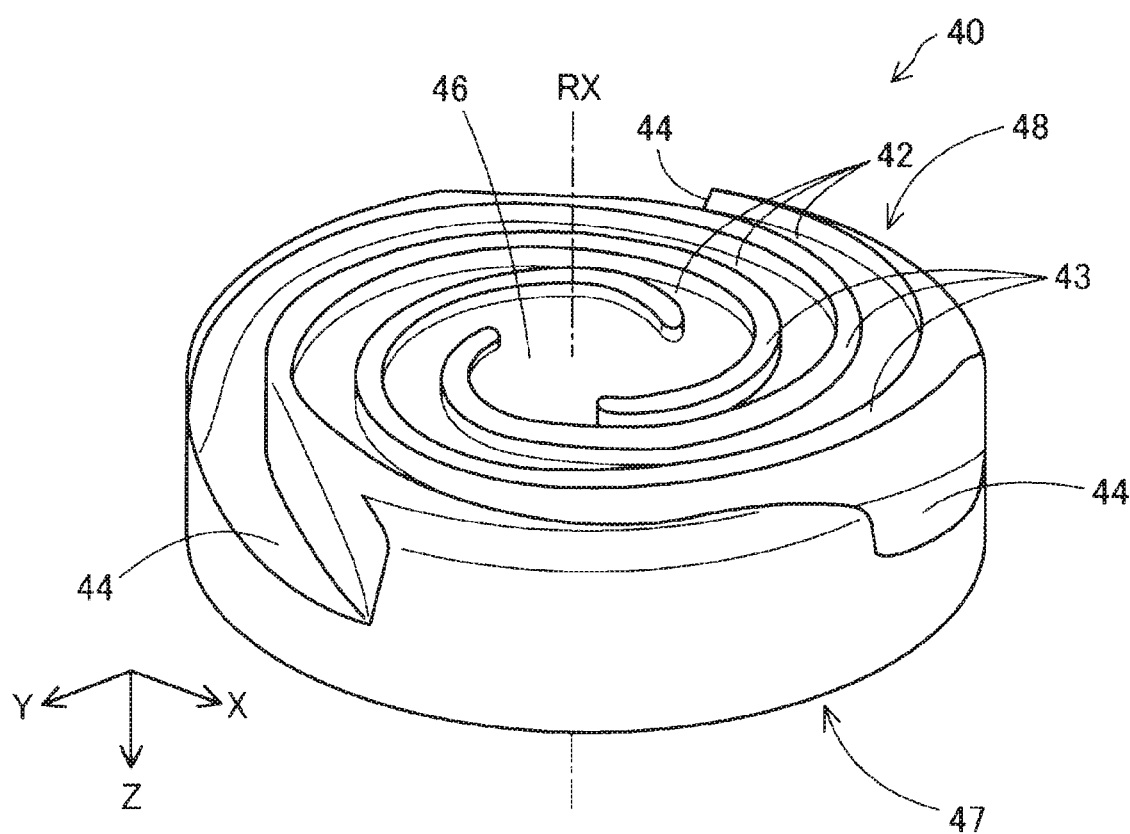
FIG. 2 is a schematic perspective view showing a configuration of a flat screw on a lower surface side.

FIG. 2 is a schematic perspective view showing a configuration of the flat screw 40 on the lower surface 48 side. In FIG. 2, a position of the rotation axis RX of the flat screw 40 in a case of rotating in the shaping material production section 30 is indicated by a dot-and-dash chain line. As described above, the groove portion 42 is provided on the lower surface 48 of the flat screw 40 facing the facing portion 50 (FIG. 1). Hereinafter, the lower surface 48 is also referred to as a "groove forming surface 48".

The central portion 46 of the groove forming surface 48 of the flat screw 40 is configured as a recessed portion to which one end of the groove portion 42 is connected. The central portion 46 faces the communication hole 56 (FIG. 1) of the facing portion 50. In the first embodiment, the central portion 46 intersects with the rotation axis RX.

The groove portion 42 of the flat screw 40 extends swirlingly to draw an arc from the central portion 46 toward an outer periphery of the flat screw 40. The groove portion 42 may be configured to extend in a spiral shape. FIG. 2 shows an example of the flat screw 40 which constitutes side wall portions of the three groove portions 42 and has three convex portions 43 extending along the respective groove portions 42. A number of groove portions 42 and convex portions 43 provided in the flat screw 40 is not limited to three. In the flat screw 40, only one groove portion 42 may be provided, or two or more groove portions 42 may be provided. In addition, any number of convex portions 43 may be provided depending on the number of groove portions 42.

The groove portion 42 is continued up to a material inlet port 44 formed on a side surface of the flat screw 40. The material inlet port 44 is a part for receiving the material supplied via the communication path 22 of the material supply portion 20. FIG. 2 shows an example of the flat screw 40 in which the material inlet port 44 is formed in three locations. A number of the material inlet ports 44 provided in the flat screw 40 is not limited to the three locations. In the flat screw 40, the material inlet port 44 may be provided at only one location, or may be provided at a plurality of locations which are two or more locations.

As the flat screw 40 rotates, the material supplied from the material inlet port 44 is melted while being heated by the heater 58 of the facing portion 50 in the groove portion 42, and converted into a shaping material. The shaping material flows through the groove portion 42 to the central portion 46.

Figure 3:
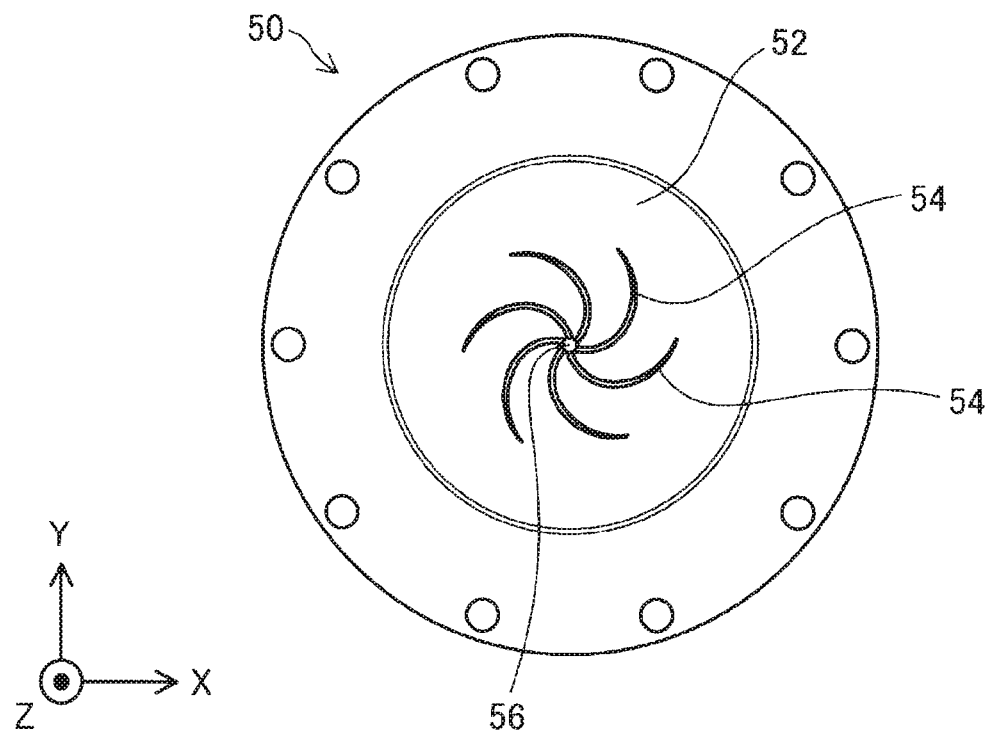
FIG. 3 is a schematic plan view showing an upper surface side of a facing portion.

FIG. 3 is a schematic plan view showing the upper surface 52 side of the facing portion 50. The upper surface 52 of the facing portion 50 faces the groove forming surface 48 of the flat screw 40, as described above. Hereinafter, the upper surface 52 is also referred to as "screw facing surface 52". In the center of the screw facing surface 52, a communication hole 56 for supplying the shaping material to the first flow path 65a is formed.

In the screw facing surface 52, a plurality of guide grooves 54 connected to the communication hole 56 and extending swirlingly from the communication hole 56 toward an outer circumference are formed. The plurality of guide grooves 54 has a function of guiding the shaping material to the communication hole 56. As described above, in the facing portion 50, a heater 58 for heating the material is embedded (see FIG. 1). Melting of the material in the shaping material production section 30 is realized due to heating by the heater 58 and rotation of the flat screw 40. As described above, according to the three-dimensional shaping apparatus 100a of the first embodiment, by using the flat screw 40, miniaturization of the apparatus and enhancement of shaping accuracy are realized.

Figure 4:
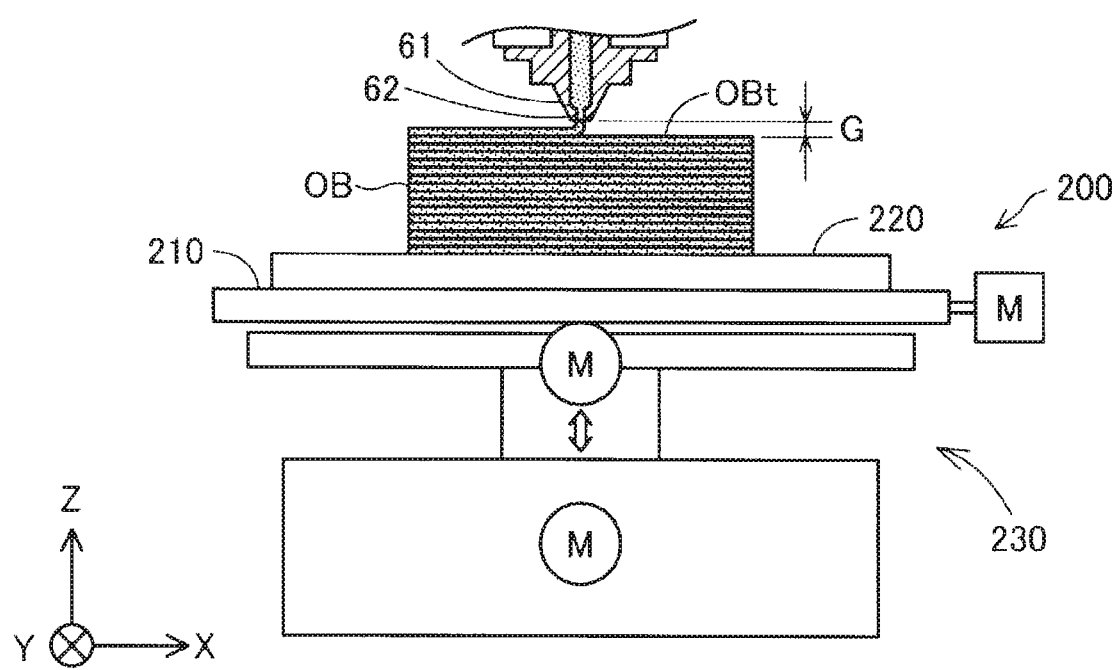
FIG. 4 is an explanatory diagram showing a positional relationship between a three-dimensional shaped object and a discharge port at a tip of a nozzle.

FIG. 4 is an explanatory diagram showing a positional relationship between the three-dimensional shaped object OB and the discharge port 62 at the tip of the nozzle 61. FIG. 4 schematically shows a situation where the three-dimensional shaped object OB is being shaped on the shaping pedestal 220.

In the three-dimensional shaping apparatus 100a, a gap G is held between the discharge port 62 at the tip of the nozzle 61 and an upper surface OBt of the three-dimensional shaped object OB being shaped. Here, "the upper surface OBt of the three-dimensional shaped object OB" means a predetermined site where the shaping material discharged from the nozzle 61 is deposited in the vicinity of a position immediately below the nozzle 61.

A size of the gap G is preferably equal to or greater than the hole diameter Dn (see FIG. 1) in the discharge port 62 of the nozzle 61, and more preferably 1.1 times or more the hole diameter Dn. In this way, the shaping material discharged from the discharge port 62 of the nozzle 61 is deposited on the upper surface OBt of the three-dimensional shaped object OB in a free state of not being pressed against the upper surface OBt of the three-dimensional shaped object OB being manufactured. As a result, it is possible to prevent a transverse cross-sectional shape of the shaping material discharged from the nozzle 61 from collapsing, and it is possible to reduce a surface roughness of the three-dimensional shaped object OB. In addition, in a configuration in which a heater is provided around the nozzle 61, by forming the gap G, it is possible to prevent overheating of the shaping material by the heater, and to suppress discoloration or deterioration due to overheating of the shaping material deposited on the three-dimensional shaped object OB.

On the other hand, a size of the gap G is preferably 1.5 times or less of the hole diameter Dn, and particularly preferably 1.3 times or less thereof. In this manner, deterioration of accuracy with respect to a predetermined site where the shaping material is to be disposed and deterioration of adhesiveness of the shaping material with respect to the upper surface OBt of the three-dimensional shaped object OB being manufactured are suppressed.

Figure 5:
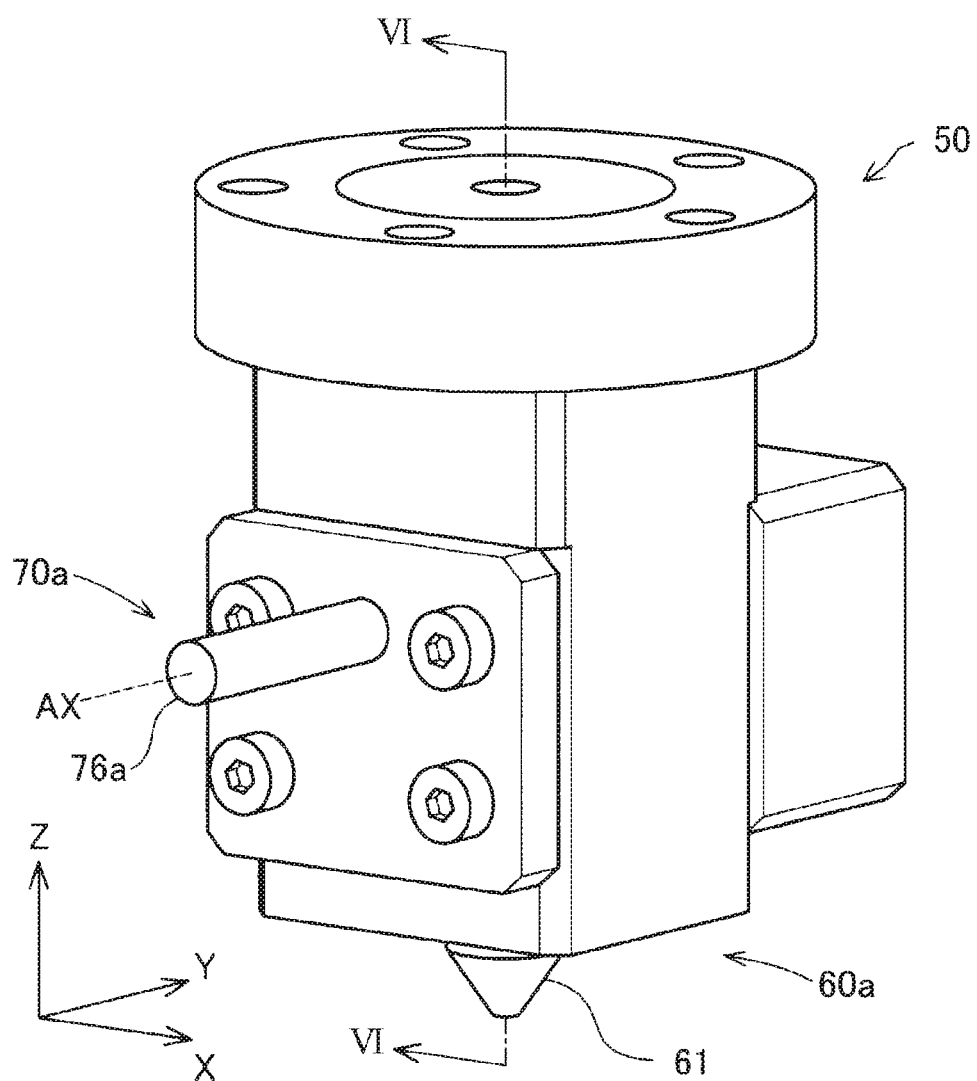
FIG. 5 is a schematic perspective view showing a configuration of an appearance of a shaping material supply device including a flow rate regulation mechanism.

FIG. 5 is a schematic perspective view showing a configuration of an appearance of the shaping material supply device 60a including the flow rate regulation mechanism 70a. In FIG. 5, a position of the center axis AX of the drive shaft 76a in a case where the drive shaft 76a rotates is indicated by a broken line. The drive shaft 76a is passed through a part of an outer surface of the shaping material supply device 60a in the Y direction.

Figure 6:
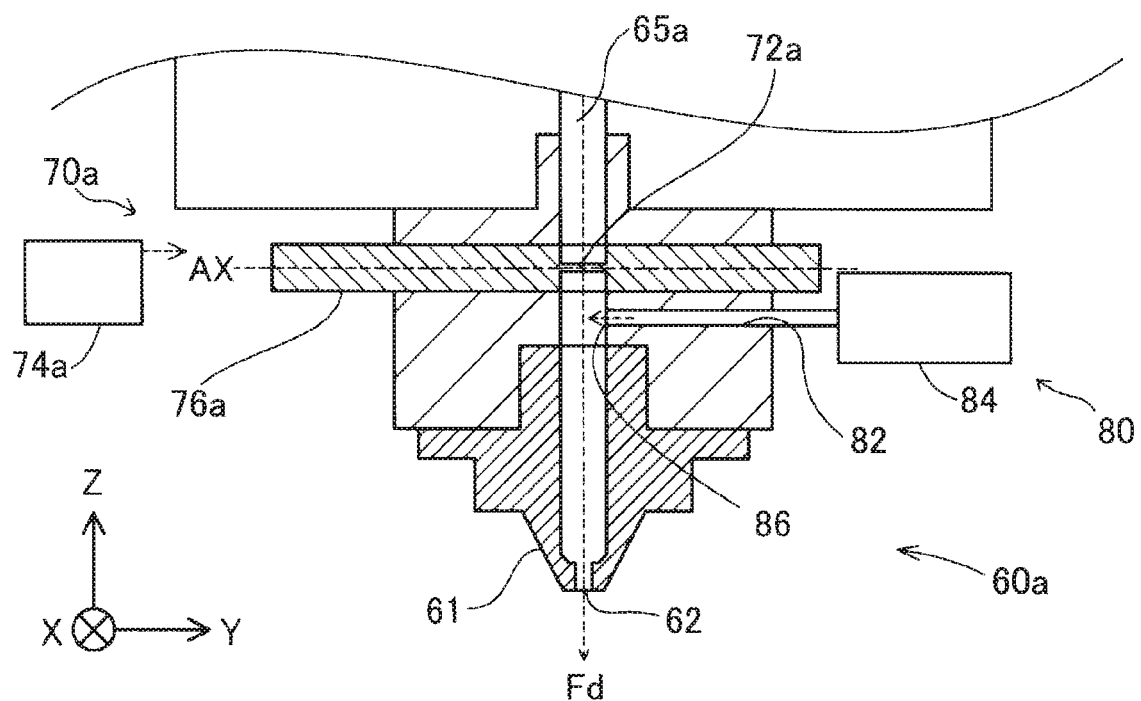
FIG. 6 is a cross-sectional view of the shaping material supply device at a position VI-VI in FIG. 5.

FIG. 6 is a cross-sectional view of the shaping material supply device 60a at the position VI-VI in FIG. 5. In the first embodiment, the shaping material supply device 60a has the nozzle 61, the first flow path 65a, the flow rate regulation mechanism 70a, and the purge section 80.

The flow rate regulation mechanism 70a includes the butterfly valve 72a, the valve drive portion 74a, and the drive shaft 76a. The flow rate regulation mechanism 70a is provided in the first flow path 65a and controls a flow rate of the shaping material flowing through the first flow path 65a. The butterfly valve 72a is a plate-like member in which a part of the drive shaft 76a is processed into a plate shape. The butterfly valve 72a is rotatably disposed in the first flow path 65a. In FIG. 6, a flow direction Fd of the shaping material flowing through the first flow path 65a is shown.

The drive shaft 76a is a shaft-like member provided so as to perpendicularly intersect with the flow direction Fd of the shaping material in the first flow path 65a. In the first embodiment, the drive shaft 76a perpendicularly intersects with the first flow path 65a. The drive shaft 76a is provided so that a position of the butterfly valve 72a is at a position where the drive shaft 76a and the first flow path 65a intersect with each other.

The valve drive portion 74a is a drive portion having a mechanism for rotating the drive shaft 76a about the center axis AX. The butterfly valve 72a is rotated by a rotational driving force of the drive shaft 76a generated by the valve drive portion 74a. Specifically, the butterfly valve 72a is rotated so as to be at any position among a first position where the flow direction Fd of the shaping material in the first flow path 65a is substantially perpendicular to a surface direction of the butterfly valve 72a as the drive shaft 76a is rotated, a second position where the flow direction Fd of the shaping material in the first flow path 65a is substantially parallel to the surface direction of the butterfly valve 72a, and a third position where the flow direction Fd of the shaping material in the first flow path 65a and the surface direction of the butterfly valve 72a form any angle among angles larger than 0 degree and smaller than 90 degrees. In FIG. 6, a state where a position of the butterfly valve 72a is at the first position is shown.

By rotation of the butterfly valve 72a, an area of an opening formed in a flow path of the first flow path 65a is regulated. By regulating the area of opening, a flow rate of the shaping material flowing through the first flow path 65a is regulated. In addition, by setting the area of the opening to a state of zero (state where the butterfly valve 72a closes the flow path of the first flow path 65a), it is possible to set a flow rate of the shaping material flowing through the first flow path 65a to a zero state. That is, the flow rate regulation mechanism 70a can control initiation and stopping of flow of the shaping material flowing through the first flow path 65a and regulation of a flow rate of the shaping material. In this specification, the expression "stopping discharge of shaping material" is used in a state where a flow rate of the shaping material is in a state of zero (that is, a flow path of the shaping material is closed). Unless otherwise specified, the expression "changing flow rate" does not include changing a flow rate of the shaping material to a state of zero.

The purge section 80 is connected to the first flow path 65a and has a mechanism for delivering gas into the first flow path 65a. The purge section 80 has a delivery path 82, a purge drive portion 84, and a delivery port 86. In the purge drive portion 84, various pumps capable of delivering gas, for example, a pump that delivers gas by reciprocating motion, such as a plunger pump, a piston pump, and a diaphragm pump, a gear pump, a syringe pump, or the like can be applied. The purge drive portion 84 is driven under control of the control section 300.

The delivery port 86 is an opening provided in the first flow path 65a. The delivery path 82 is constituted by a through-hole extending in a linear shape and intersecting with the first flow path 65a. The delivery path 82 is a gas flow path connected to the purge drive portion 84 and the delivery port 86. The gas delivered from the purge drive portion 84 passes through the delivery path 82 and is sent from the delivery port 86 into the first flow path 65a. As gas is also continuously supplied from the purge drive portion 84, the gas supplied into the first flow path 65a pressure-feeds the shaping material remaining in the first flow path 65a to the nozzle 61 side. The pressure-fed shaping material is discharged from the discharge port 62 of the nozzle 61.

In this manner, it is possible to quickly discharge the shaping material remaining in the flow path from the nozzle 61. Therefore, it is possible to quickly stop discharge of the shaping material from the nozzle 61. A shape of an opening of the delivery port 86 connected to the first flow path 65a is smaller than a shape of a cross section perpendicular to the flow direction Fd of the shaping material flowing through the first flow path 65a. This prevents the shaping material flowing through the first flow path 65a from flowing in from the delivery port 86 and flowing backward inside the delivery path 82.

Figure 7:
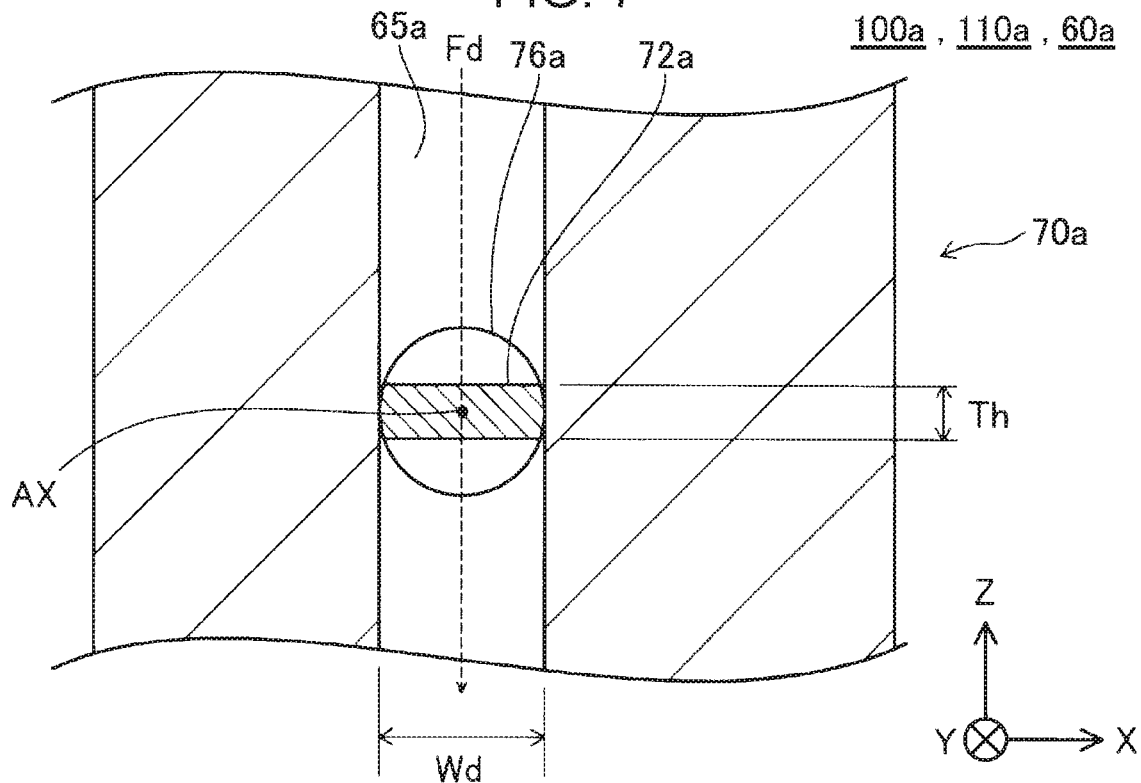
FIG. 7 is an enlarged cross-sectional view showing the flow rate regulation mechanism in a state where a butterfly valve is at a first position in a region in FIG. 1.

FIG. 7 is an enlarged cross-sectional view showing the flow rate regulation mechanism 70a in a state where the butterfly valve 72a is at the first position in the region VII in FIG. 1. Specifically, FIG. 7 is a cross-sectional view taken along a plane perpendicular to the center axis AX of the drive shaft 76a, including the center axis of the flow direction Fd of the shaping material in the first flow path 65a. In FIG. 7, in addition to the respective members, the center axis AX of the drive shaft 76a, a thickness Th of the butterfly valve 72a, the flow direction Fd of the shaping material flowing through the first flow path 65a, and a diameter Wd of a cross section of the first flow path 65a in a direction substantially perpendicular to the flow direction Fd are schematically shown. In FIG. 7, the valve drive shaft 76a is rotated by the valve drive portion 74a with respect to the center axis AX, so that the butterfly valve 72a is disposed at a position (first position) where a surface direction thereof is substantially perpendicular to the flow direction Fd.

The butterfly valve 72a is a substantially square plate-like member having a thickness Th that is one-third of the diameter Wd of the first flow path 65a. A length of one side of the butterfly valve 72a in the surface direction is substantially the same as the diameter Wd of the cross section of the first flow path 65a. That is, by disposing the butterfly valve 72a at a position (first position) where the surface direction of the butterfly valve 72a is substantially perpendicular to the flow direction Fd of the shaping material, a flow path of the shaping material in the first flow path 65a is closed by a surface of the butterfly valve 72a.

Figure 8:
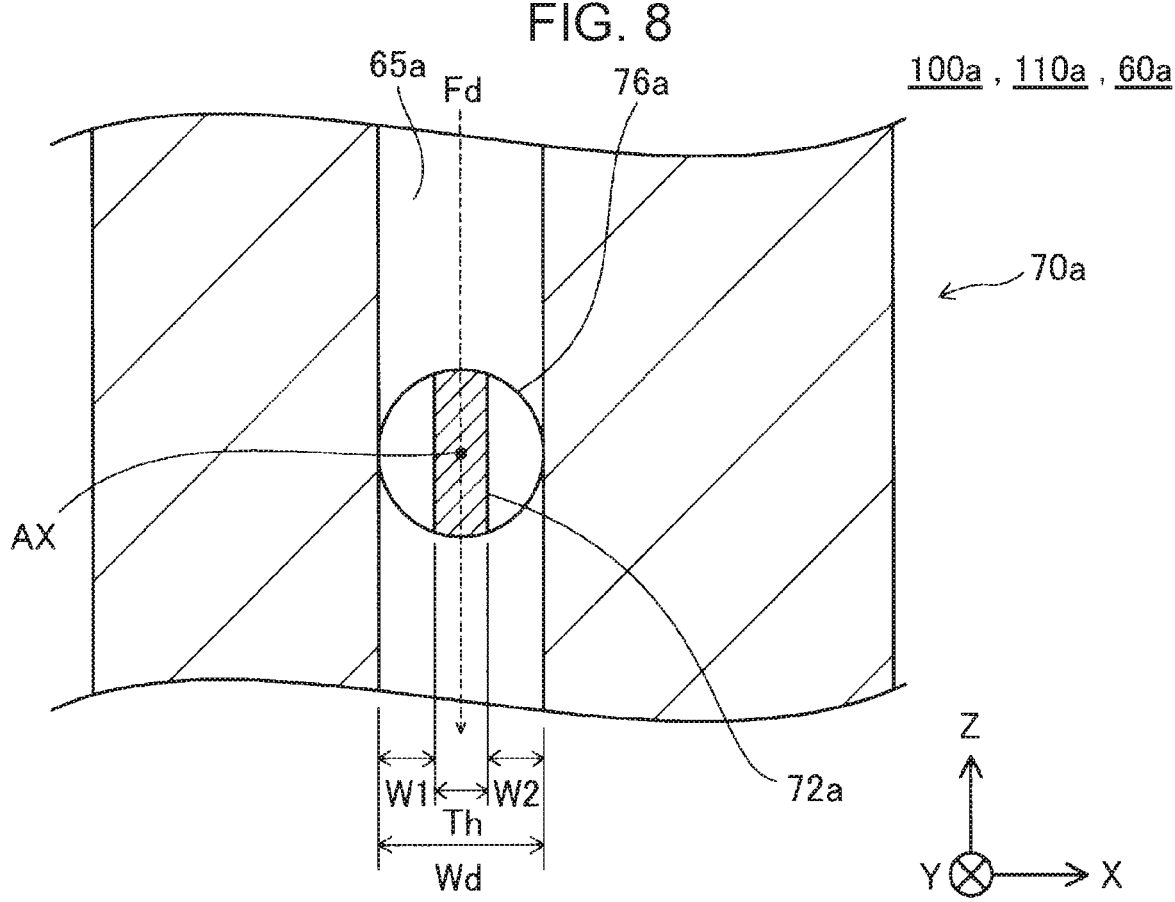
FIG. 8 is an enlarged cross-sectional view showing the flow rate regulation mechanism in a state where the butterfly valve is at a second position in the region in FIG. 1.

FIG. 8 is an enlarged cross-sectional view showing the flow rate regulation mechanism 70a in a state where the butterfly valve 72a is at the second position in the region VIII in FIG. 1. Specifically, FIG. 8 is a cross-sectional view taken along a plane perpendicular to the center axis AX of the drive shaft 76a, including the center axis of the flow direction Fd of the shaping material in the first flow path 65a. In FIG. 8, in addition to the respective members, the center axis AX of the drive shaft 76a, a thickness Th of the butterfly valve 72a, the flow direction Fd of the shaping material in the first flow path 65a, a diameter Wd of the cross section of the first flow path 65a in a direction substantially perpendicular to the flow direction Fd, a width W1 in the X direction of a flow path sandwiched between one surface of the butterfly valve 72a and an inner wall of the first flow path 65a, and a width W2 in the X direction of a flow path sandwiched between the other surface of the butterfly valve 72a and the inner wall of the first flow path 65a are schematically shown. In FIG. 8, the drive shaft 76a is rotated by the valve drive portion 74a with respect to the center axis AX, so that the butterfly valve 72a is disposed at a position (second position) where a surface direction thereof is substantially parallel to the flow direction Fd.

In a case where the butterfly valve 72a is projected along the flow direction Fd on the plane substantially perpendicular to the flow direction Fd in a state where the butterfly valve 72a is disposed at the second position, an area of the butterfly valve 72a is the smallest. Conversely, in the first flow path 65a, the flow path of the shaping material is the largest. That is, the state where the butterfly valve 72a is at the second position is a state where a flow rate in the first flow path 65a is maximized by the flow rate regulation mechanism 70a.

Figure 9:
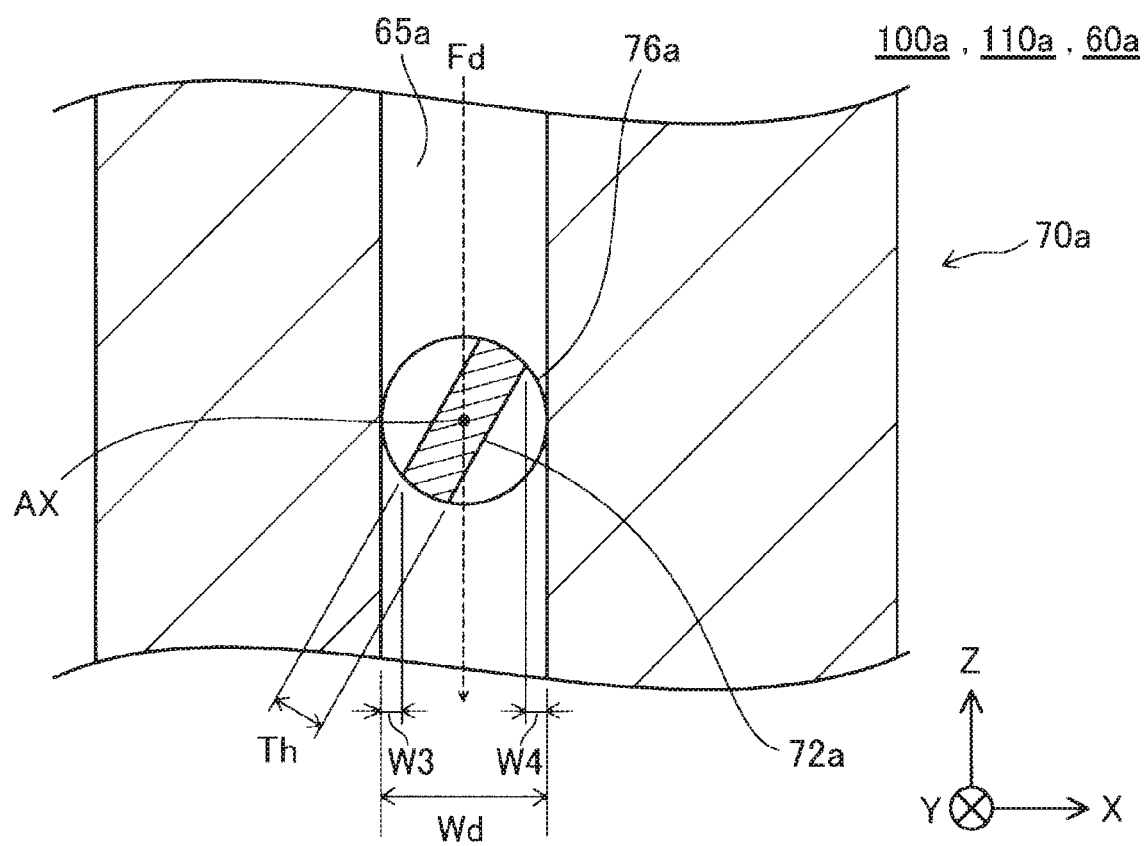
FIG. 9 is an enlarged cross-sectional view showing the flow rate regulation mechanism in a state where the butterfly valve is at a third position in the region in FIG. 1.

FIG. 9 is an enlarged cross-sectional view showing the flow rate regulation mechanism 70a in a state where the butterfly valve 72a is at the third position in the region IX in FIG. 1. Specifically, FIG. 9 is a cross-sectional view taken along a plane perpendicular to the center axis AX of the drive shaft 76a, including the center axis of the flow direction Fd of the shaping material in the first flow path 65a. In FIG. 9, in addition to the respective members, the center axis AX of the drive shaft 76a, a thickness Th of the butterfly valve 72a, the flow direction Fd of the shaping material in the first flow path 65a, a diameter Wd of a cross section of the first flow path 65a in a direction substantially perpendicular to the flow direction Fd, a width W3 which is the smallest among widths in the X direction of a flow path sandwiched between one surface of the butterfly valve 72a and the inner wall of the first flow path 65a, and a width W4 which is the smallest among widths in the X direction of the flow path sandwiched between the other surface of the butterfly valve 72a and the inner wall of the first flow path 65a are schematically shown. In FIG. 9, the drive shaft 76a is rotated by the valve drive portion 74a with respect to the center axis AX, so that the butterfly valve 72a is disposed at a position (third position) where an angle formed by the flow direction Fd of the shaping material flowing through the first flow path 65a and the surface direction of the butterfly valve 72a becomes any angle among angles larger than 0 degree and smaller than 90 degrees.

The width W3 and the width W4 are varied as the butterfly valve 72a is rotated. Relationships between the width W1 and the width W2 (see FIG. 8) at the second position and between the widths W3 and W4 at the third position are 0<W3<W1, 0<W4<W2. In a state where the butterfly valve 72a is disposed at the third position, in a case where the butterfly valve 72a is projected along the flow direction Fd on a plane substantially perpendicular to the flow direction Fd, an area of the butterfly valve 72a is larger than an area in a case of being disposed at the second position and smaller than an area in a case of being disposed at the first position. In addition, the area of the butterfly valve 72a varies with variations of the above-mentioned width W3 and the width W4. That is, by adjusting the angle formed by the flow direction Fd of the shaping material flowing through the first flow path 65a and the surface direction of the butterfly valve 72a to be an angle larger than 0 degree and smaller than 90 degrees, it is possible to regulate an area of a flow path at a position where the butterfly valve 72a in the first flow path 65a is provided to be within a range that is larger than the area in a case of being disposed at the first position and smaller than the area in a case of being disposed at the second position. That is, by regulating a flow rate in the first flow path 65a by the flow rate regulation mechanism 70a, it is possible to control an amount of the shaping material discharged from the nozzle 61.

As described above, according to the shaping material supply device 60a of the first embodiment, it is possible to control initiation and stopping of discharge of the shaping material from the nozzle 61 and an amount of the shaping material discharged from the nozzle 61 by the butterfly valve 72*a* provided in the first flow path 65*a* through which the shaping material flows. Therefore, it is possible to control initiation timing and stopping timing of discharge of the shaping material from the nozzle 61, and a discharge amount of the shaping material with higher accuracy than a mode in which the flow rate regulation mechanism 70*a* is not provided.

Figure 10:
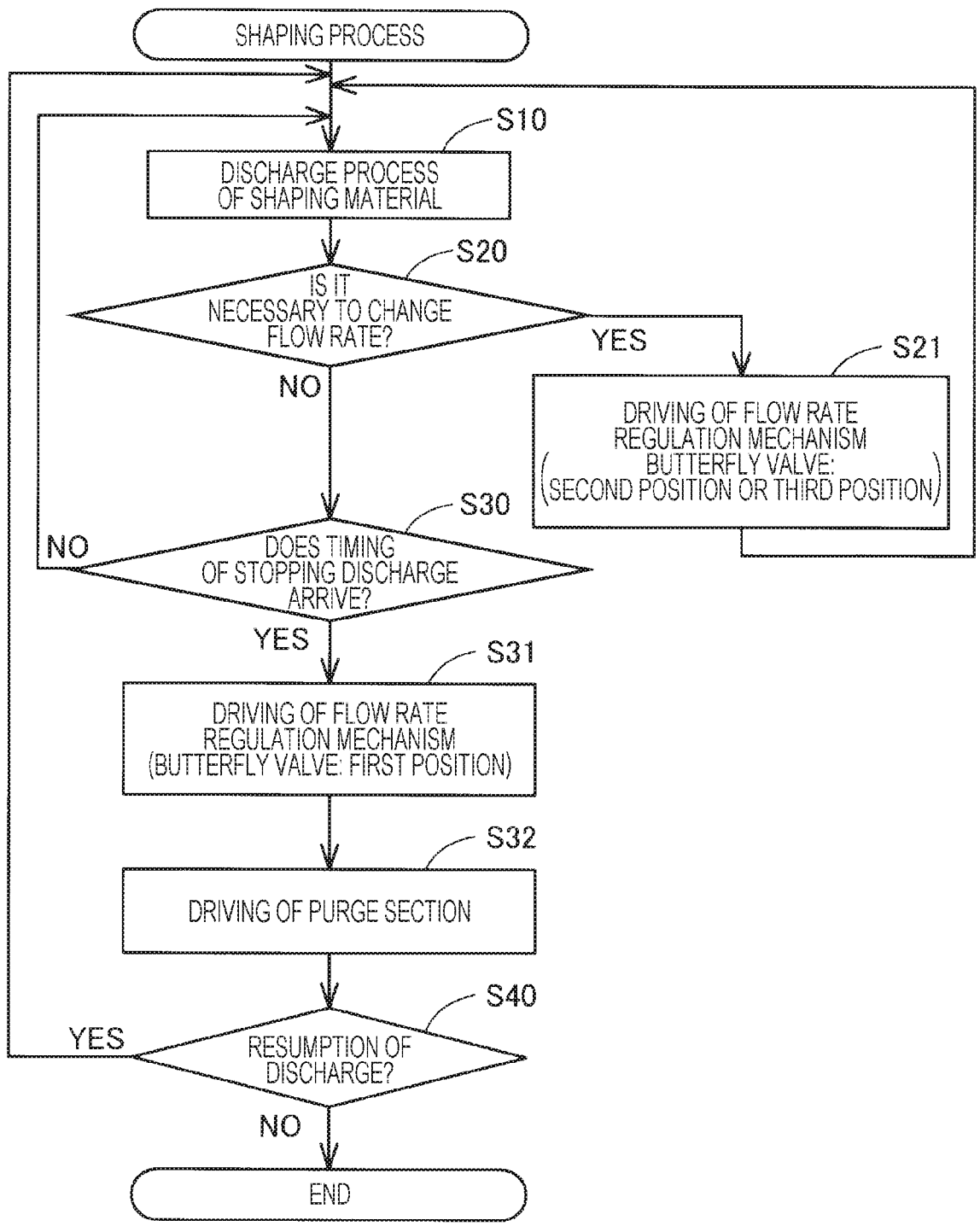
FIG. 10 is an explanatory diagram showing an example of a flow of shaping process executed by a control section.

FIG. 10 is an explanatory diagram showing an example of a flow of shaping process executed by the control section 300.

Step S10 is a discharge step of discharging the shaping material from the nozzle 61. In step S10, the control section 300 executes a discharge process of continuously discharging the shaping material from the nozzle 61 toward the shaping pedestal 220 by driving the drive motor 32 of the shaping material production section 30 to rotate the flat screw 40. At this time, the control section 300 executes a process of reading a set value of a flow rate of the shaping material at the initiation of the discharge process, thereby driving the flow rate regulation mechanism 70*a*, and of moving the butterfly valve 72*a* to a predetermined position of the second position or the third position.

While the discharge process is executed, the control section 300 controls the movement mechanism 230 of the shaping stage section 200 so that the shaping pedestal 220 is displaced in three axial directions of the X, Y, and Z directions depending on a shaping data. In this manner, the shaping material is deposited at a target position on the shaping pedestal 220.

The control section 300 determines whether or not it is necessary to change a flow rate of the shaping material in the middle of the discharge process in step S10 (step S20). For example, the control section 300 may make this determination based on a shaping data.

In a case where it is necessary to change the flow rate of the shaping material (step S20: YES), the control section 300 executes a process of controlling the flow rate regulation mechanism 70*a* so that the butterfly valve 72*a* is moved to a predetermined position of the second position or the third position (step S21). In this manner, the flow rate of the shaping material in the first flow path 65*a* is changed. Thereafter, the discharge process of the shaping material continues by returning to step S10.

For example, in order to shape a complicated part or fine portion of a shaped object, in a case of shaping a three-dimensional shaped object after reducing a movement speed of the shaping pedestal 220, the control section 300 makes a determination to reduce a discharge amount of the shaping material from the nozzle 61. The control section 300 changes the flow rate of the shaping material by moving the butterfly valve 72*a* from the second position of the butterfly valve 72*a* set to shape a part having a simple structure of the shaped object to the third position. Alternatively, the control section 300 may determine that it is necessary to change the flow rate of the shaping material from the nozzle 61 in a case of receiving an interrupt command for changing a flow rate from a user or higher-order control section.

On the other hand, in a case where it is not necessary to change the flow rate of the shaping material (step S20: NO), the control section 300 determines whether or not a timing of temporarily discontinuing discharge of the shaping material arrives in the middle of the discharge process of step S10 (step S30). The control section 300 may make this determination based on a shaping data. For example, in a case where the shaping material is separately deposited at a position separated by a predetermined distance from the position at which the shaping material has been discharged until that time, the control section 300 determines that the timing of temporarily discontinuing discharge of the shaping material from the nozzle 61 arrives. Alternatively, the control section 300 may determine that the timing of temporarily discontinuing discharge of the shaping material from the nozzle 61 arrives in a case of receiving a temporary stop command from a user or higher-order control section.

In a case where the timing of discontinuing discharge of the shaping material does not arrive (step S30: NO), the control section 300 continues the discharge process of the shaping material being executed from step S10. On the other hand, in a case where the timing of discontinuing discharge of the shaping material arrives (step S30: YES), the control section 300 executes processes of steps S31 to S40.

Steps S31 to S32 are discharge stopping steps for controlling outflow of the shaping material from the nozzle 61. In the discharge stopping steps, the control section 300 controls the flow rate regulation mechanism 70*a* so that the butterfly valve 72*a* is moved to the first position. In this manner, a position of the butterfly valve 72*a* in the first flow path 65*a* is closed, and flow of the shaping material to the nozzle 61 side (that is, downstream side) of the flow rate regulation mechanism 70*a* is stopped (step S31).

The control section 300 causes the flow rate regulation mechanism 70*a* to close the first flow path 65*a* in step S31, and then drives the purge section 80 provided on a downstream side of the flow rate regulation mechanism 70*a* so that gas is supplied into the first flow path 65*a* (step S32). According to this discharge stopping step, in a case where the butterfly valve 72*a* closes the first flow path 65*a*, it is possible to pressure-feed the shaping material remaining on the downstream side of the flow rate regulation mechanism 70*a* by the gas supplied from the purge section 80, thereby discharging the shaping material from the discharge port 62 of the nozzle 61.

As described above, the control section 300 is capable of executing control to operate the purge section 80 after causing the flow rate regulation mechanism 70*a* to close the first flow path 65*a*. Therefore, it is possible to control stopping of discharge of the shaping material from the nozzle 61 with higher accuracy. In addition, in a case where the gas is sent into the first flow path 65*a* by the purge section 80, it is possible to prevent the shaping material in the first flow path 65*a* from flowing backward to a flow path on an upstream side of the flow rate regulation mechanism 70*a*.

In the purge section 80, there may a case where the shaping material remaining on an upstream side of the delivery port 86 connected to the first flow path 65*a*, which is a downstream side of the flow rate regulation mechanism 70*a*, is not discharged from the nozzle 61 by delivery of gas by the purge section 80. Therefore, a mode in which the delivery port 86 connected to the first flow path 65*a* is provided at a position which is a downstream side of the flow rate regulation mechanism 70*a* in the first flow path 65*a* and is as close as possible to the flow rate regulation mechanism 70*a* is preferable.

Further, in a case where, while stopping the outflow of the shaping material from the nozzle 61, for example, the nozzle 61 should resume next discharge of the shaping material, the control section 300 may change a position of the nozzle 61 with respect to the shaping pedestal 220 so that the nozzle 61 is positioned at coordinates of the shaping pedestal 220.

The control section 300 determines whether or not a timing of resuming discharge of the shaping material from the nozzle 61 arrives (step S40). In a case where the timing of resuming discharge of the shaping material arrives, outflow of the shaping material from the nozzle 61 is initiated (step S40: YES). Specifically, the control section 300 executes a process of reading a set value of a flow rate of the shaping material at the resumption of the discharge process, thereby driving the flow rate regulation mechanism 70a, and of moving the butterfly valve 72a to a predetermined position of the second position or the third position. On the other hand, in a case where discharge of the shaping material from the nozzle 61 is not resumed (step S40: NO), that is, in a case where the shaping process is completed, the control section 300 ends the shaping process.

In step S31, in a case where the first flow path 65a is closed by the butterfly valve 72a and discharge of the shaping material from the nozzle 61 is temporarily discontinued, it is desirable that the control section 300 keeps rotation of the flat screw 40 being continued without being stopped. In this manner, in step S40, it is possible to more quickly resume discharge of the shaping material from the nozzle 61.

Second Embodiment

Figure 11:
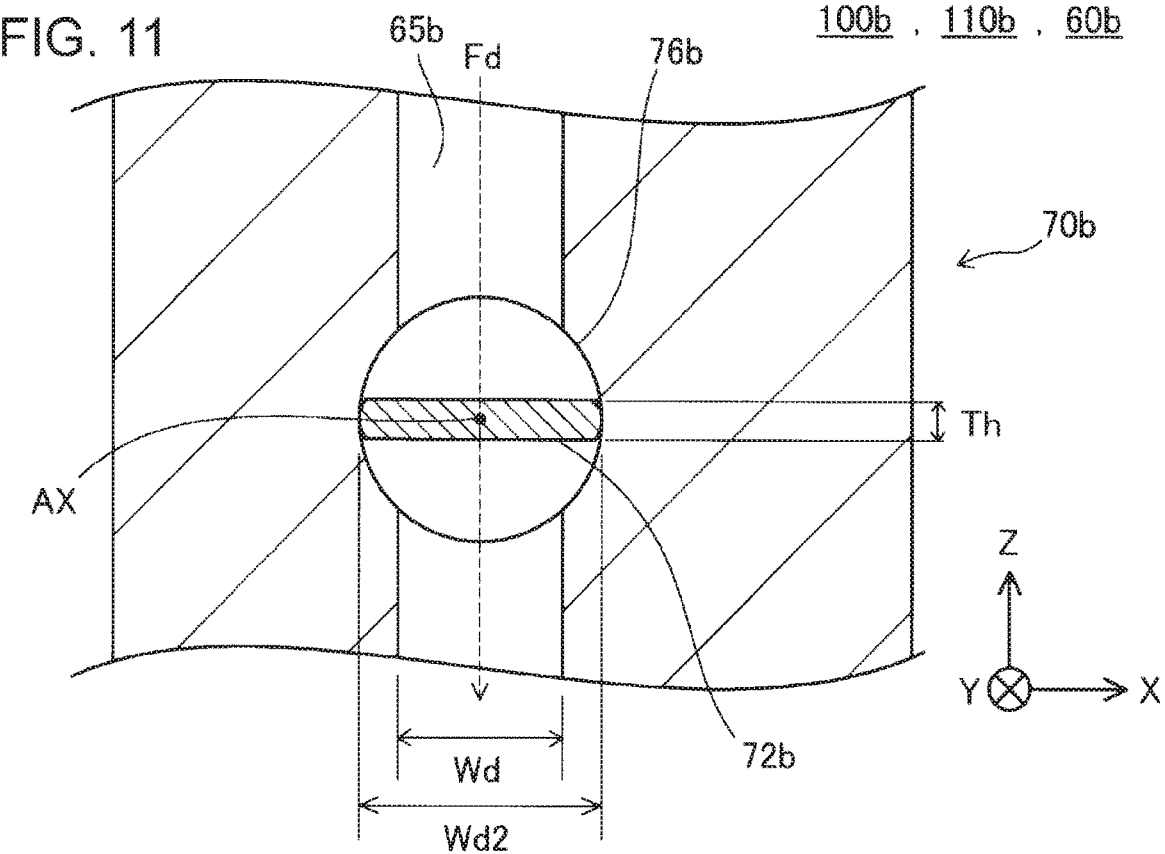
FIG. 11 is a schematic view showing a configuration of a flow rate regulation mechanism included in a shaping material supply device of a three-dimensional shaping apparatus according to a second embodiment.

FIG. 11 is a schematic diagram showing a configuration of a flow rate regulation mechanism 70b included in a shaping material supply device 60b of a three-dimensional shaping apparatus 100b according to a second embodiment. Specifically, FIG. 11 is a cross-sectional view taken along a plane perpendicular to the center axis AX of a drive shaft 76b, including the center axis of the flow direction Fd of the shaping material in a first flow path 65b. A configuration of the three-dimensional shaping apparatus 100b of the second embodiment is almost the same as that of the three-dimensional shaping apparatus 100a of the first embodiment except that the flow rate regulation mechanism 70b of the second embodiment is provided instead of the flow rate regulation mechanism 70a of the first embodiment.

The flow rate regulation mechanism 70b of the second embodiment includes a butterfly valve 72b, a valve drive portion 74b (not shown), and a drive shaft 76b. A length of one side of the butterfly valve 72b in a surface direction is larger than a diameter Wd of a cross section of the first flow path 65b. A space where the butterfly valve 72b is provided in the first flow path 65b includes a flow path having, as the maximum width, a width Wd2 which is substantially the same as a length of one side of the butterfly valve 72b in a surface direction. The width Wd2 is larger than the diameter Wd of the cross section of the first flow path 65b. That is, a cross section in a plane perpendicular to the flow direction Fd of the shaping material in the space including the butterfly valve 72b which is a plate-like member in the first flow path 65b is larger than a cross section in a plane perpendicular to the flow direction Fd of the shaping material at a part in the first flow path 65b which does not include the butterfly valve 72b.

In FIG. 11, the butterfly valve 72b is disposed at a position (first position) where a surface direction thereof is substantially perpendicular to the flow direction Fd of the shaping material flowing through the first flow path 65b. In this manner, a flow path of the shaping material in the first flow path 65b is closed by a surface of the butterfly valve 72b.

Figure 12:
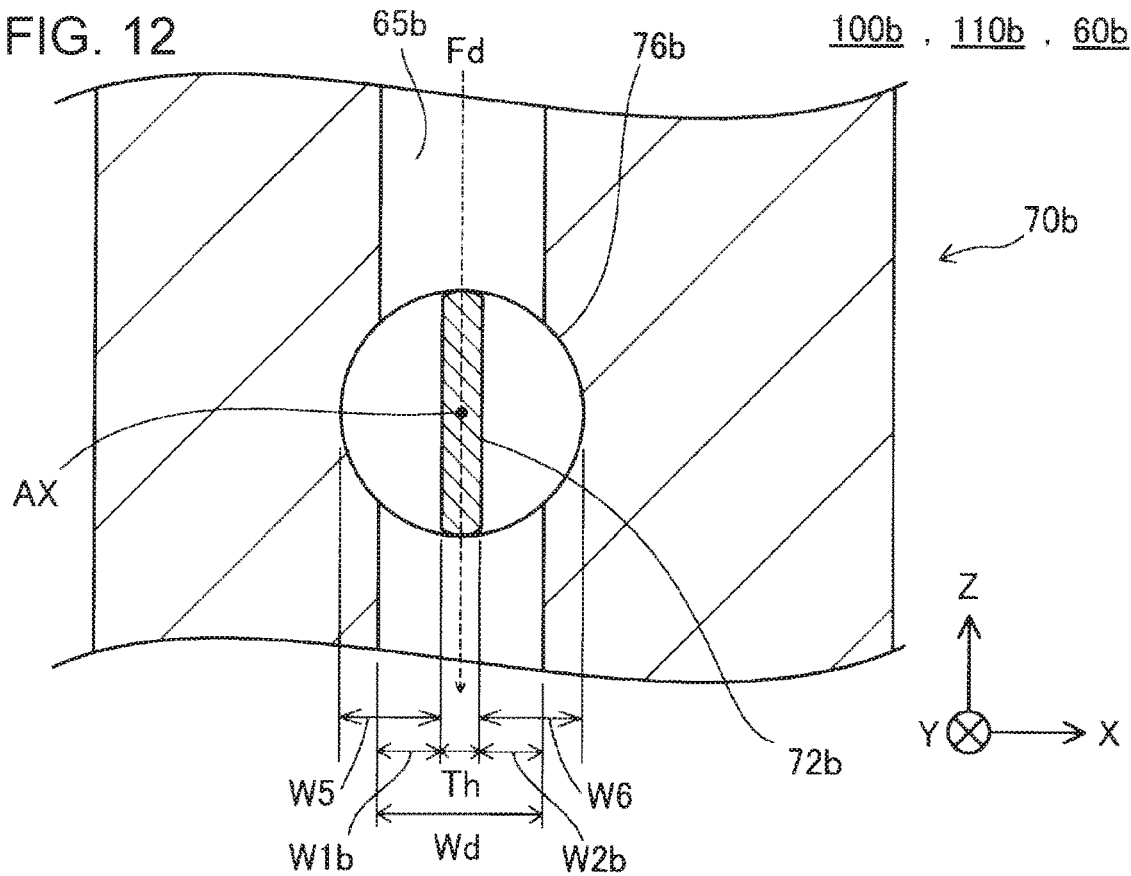
FIG. 12 is an enlarged cross-sectional view showing the flow rate regulation mechanism in a state where a butterfly valve is at the second position.

FIG. 12 is an enlarged cross-sectional view showing the flow rate regulation mechanism 70a in a state where the butterfly valve 72b is at the second position. Specifically, FIG. 12 is a cross-sectional view taken along a plane perpendicular to the center axis AX of the drive shaft 76b, including the center axis of the flow direction Fd of the shaping material in the first flow path 65b. In FIG. 12, the butterfly valve 72b is disposed at a position (second position) where a surface direction thereof is substantially parallel to the flow direction Fd of the shaping material flowing through the first flow path 65b. That is, this is a state where a flow rate in the first flow path 65b is maximized by the flow rate regulation mechanism 70b.

In FIG. 12, in addition to the respective members, the center axis AX of the drive shaft 76b, a thickness Th of the butterfly valve 72b, the flow direction Fd of the shaping material in the first flow path 65b, a diameter Wd of a cross section of the first flow path 65b in a direction perpendicular to the flow direction Fd, a width W1b in the X direction between one surface of the butterfly valve 72b and an inner wall of the first flow path 65b, a width W2b in the X direction between the other surface of the butterfly valve 72b and the inner wall of the first flow path 65b, a width W5 in the X direction between one surface of the butterfly valve 72b and an inner wall of a space where the butterfly valve 72b is provided, and a width W6 in the X direction between the other surface of the butterfly valve 72b and the inner wall of the space where the butterfly valve 72b is provided are schematically shown. The respective widths are formed so that W5>W1b, W6>W2b. That is, in the space where the butterfly valve 72b is provided in the first flow path 65b, flow paths in which a flow path on one surface side of the butterfly valve 72b and a flow path on the other surface side have an enlarged width are provided, as compared with a mode in which the butterfly valve 72a is provided.

In this manner, it is possible to enlarge a flow path around the flow rate regulation mechanism 70b. That is, it is possible to make the flow rate around the butterfly valve 72b larger than in a mode in which an enlarged flow path is not provided. Therefore, in a case where the surface direction of the butterfly valve 72b becomes parallel to the flow direction Fd of the shaping material (the second position), as compared with a mode in which the flow rate regulation mechanism 70b is not provided, it is possible to prevent the flow rate of the first flow path 65b from being greatly limited by the butterfly valve 72b.

Third Embodiment

Figure 13:
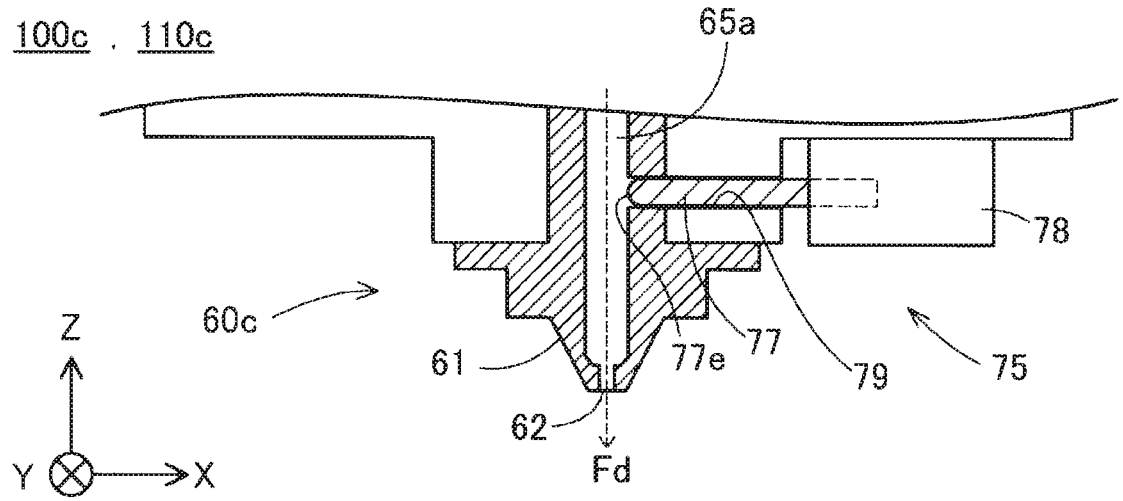
FIG. 13 is a schematic cross-sectional view showing a shaping material supply device according to a third embodiment which includes a suction section.
Figure 14:
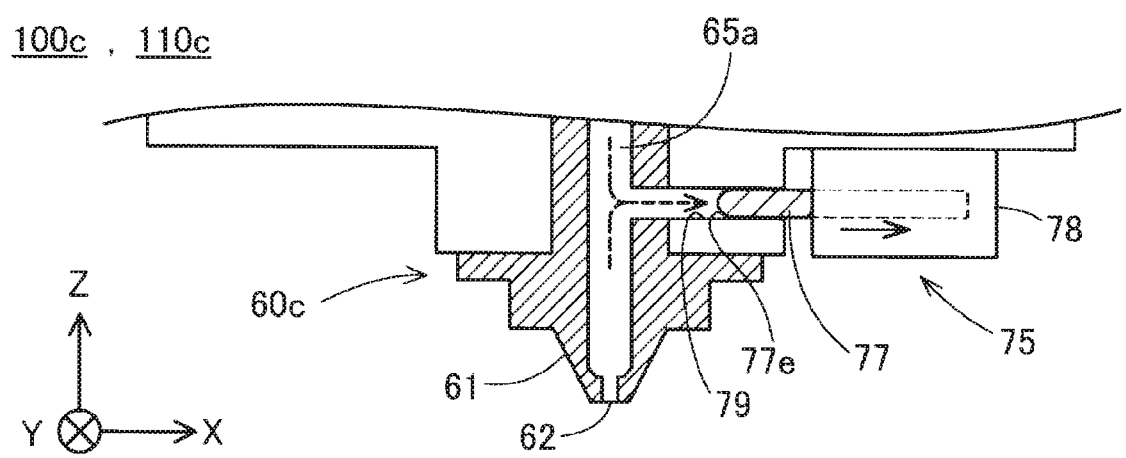
FIG. 14 is an explanatory diagram schematically showing operation of the suction section included in the shaping material supply device according to the third embodiment.

With reference to FIGS. 13 and 14, a configuration of a suction section 75 included as a shaping material supply device 60c in a three-dimensional shaping apparatus 100c of a third embodiment will be described. A configuration of the three-dimensional shaping apparatus 100c of the third embodiment is almost the same as that of the three-dimensional shaping apparatus 100a of the first embodiment except that the shaping material supply device 60c of the third embodiment is provided instead of the shaping material supply device 60a of the first embodiment.

FIG. 13 is a schematic cross-sectional view showing the shaping material supply device 60c according to the third embodiment which includes the suction section 75. The suction section 75 has a function of changing a pressure in the first flow path 65a. The suction section 75 includes a branched flow path 79, a rod 77, and a rod drive portion 78. The branched flow path 79 is a flow path into which a part of the shaping material of the first flow path 65a flows. The branched flow path 79 is constituted by a through-hole extending in a linear shape and intersecting with the first flow path 65a. The rod 77 is a shaft-like member disposed in the branched flow path 79 and extending in the X direction. Under control of the control section 300 (not shown), the rod drive portion 78 generates a driving force for instantaneously reciprocating the rod 77 in the branched flow path 79. The rod drive portion 78 is constituted by, for example, a solenoid mechanism, or an actuator such as a piezo element and a motor.

While the shaping material is being discharged from the nozzle 61, the suction section 75 of the shaping material supply device 60c positions the rod 77 at an initial position where a tip portion 77e thereof is positioned at a connection part between the first flow path 65a and the branched flow path 79. In FIG. 13, a state where a position of the rod 77 is the initial position is shown.

FIG. 14 is an explanatory diagram schematically showing operation of the suction section 75 included in the shaping material supply device 60c of the third embodiment. In a case where discharge of the shaping material from the nozzle 61 is temporarily discontinued, the rod 77 is instantaneously drawn by the rod drive portion 78 into the branched flow path 79 from the above-mentioned initial position so that the tip portion 77e of the rod 77 is positioned at a deep position in the branched flow path 79. In this manner, the suction section 75 is capable of sucking a part of the shaping material of the first flow path 65a into the branched flow path 79 and generating a negative pressure in the first flow path 65a, thereby temporarily stopping outflow of the shaping material from the nozzle 61.

In a case where discharge of the shaping material from the nozzle 61 is resumed, the control section 300 causes the rod 77 to be returned to the initial position by the rod drive portion 78. In this manner, the shaping material in the branched flow path 79 flows out to the first flow path 65a, and a pressure in the first flow path 65a is increased. Therefore, it is possible to quickly resume the outflow of the shaping material from the nozzle 61.

As described above, according to the three-dimensional shaping apparatus 100c of the third embodiment, it is possible to stop discharge of the shaping material from the nozzle 61 more quickly than generation of a negative pressure by the suction section 75 in the first flow path 65a. In addition, in a case where outflow of the shaping material from the nozzle 61 is resumed, since the suction section 75 increases a pressure in the first flow path 65a, accuracy of timing of initiating discharge of the shaping material, and accuracy of a discharge amount at the initiation of discharge of the shaping material.

Fourth Embodiment

Figure 15:
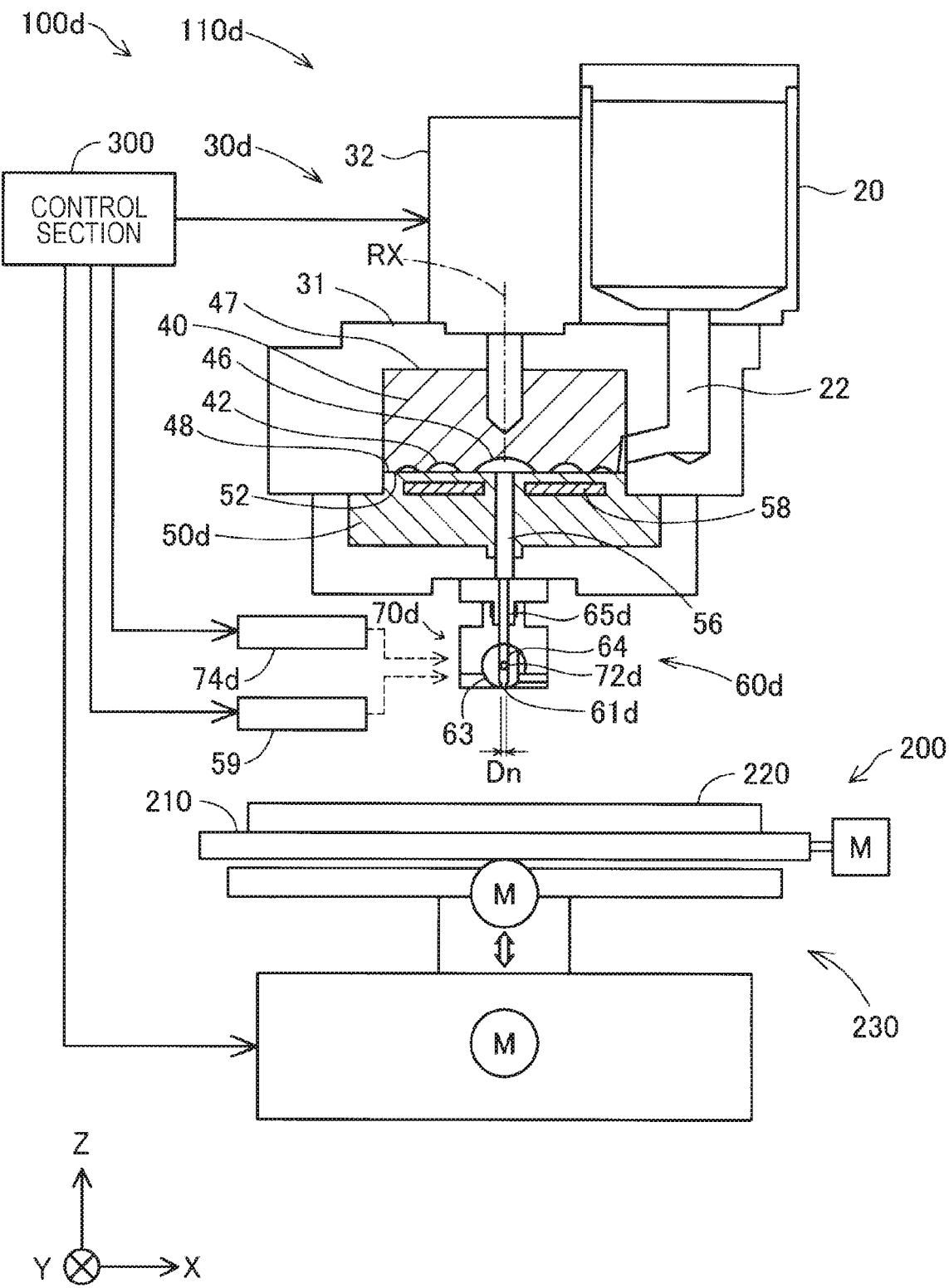
FIG. 15 is a schematic view showing a configuration of a three-dimensional shaping apparatus according to a fourth embodiment.

FIG. 15 is a schematic view showing a configuration of a three-dimensional shaping apparatus 100d according to a fourth embodiment.

The three-dimensional shaping apparatus 100d includes a delivery unit 110d, a shaping stage section 200, and a control section 300. Under control of the control section 300, the three-dimensional shaping apparatus 100d shapes a three-dimensional shaped object by delivering the shaping material from the nozzle 61d of the delivery unit 110d onto a shaping pedestal 220 of the shaping stage section 200.

The delivery unit 110d includes a material supply portion 20, a shaping material production section 30d, and a shaping material supply device 60d. The material supply portion 20 is constituted by a hopper, and a lower outlet port is connected to the shaping material production section 30d via a communication path 22. The material supply portion 20 supplies a material having thermoplastic properties to the shaping material production section 30d.

As the material to be charged into the material supply portion 20, the above-described materials can be used. These materials are charged into the material supply portion 20 in a state of solid materials such as pellets and powders. In addition, as described above, into the material having thermoplastic properties to be charged into the material supply portion 20, pigments, metals, ceramics, or the like may be incorporated.

The shaping material production section 30d melts the material supplied from the material supply portion 20 and causes it to flow into the shaping material supply device 60d. The shaping material production section 30d includes a screw case 31, a drive motor 32, a flat screw 40, and a facing portion 50d.

The flat screw 40 is a substantially columnar screw of which a height in an axial direction (direction along the center axis) is smaller than a diameter thereof, and in which a groove portion 42 is formed on the lower surface 48 that is a surface intersecting with a rotation axis RX thereof. The communication path 22 of the above-described material supply portion 20 is connected to the groove portion 42 from a side surface of the flat screw 40. A specific shape of the flat screw 40 will be described later.

The flat screw 40 is disposed so that an axial direction thereof is parallel to the Z direction and rotates along a circumferential direction. In FIG. 15, the rotation axis RX of the flat screw 40 is indicated by a dot-and-dash line. In the fourth embodiment, the center axis of the flat screw 40 coincides with the rotation axis RX thereof.

The flat screw 40 is housed in the screw case 31. An upper surface 47 of the flat screw 40 is connected to the drive motor 32. The flat screw 40 is rotated in the screw case 31 by a rotational driving force generated by the drive motor 32. The drive motor 32 is driven under control of the control section 300.

The lower surface 48 of the flat screw 40 faces the upper surface 52 of the facing portion 50d. A space is formed between the groove portion 42 provided on the lower surface 48 and the upper surface 52 of the facing portion 50d. In the delivery unit 110d, the material having thermoplastic properties supplied from the material supply portion 20 flows through this space.

The facing portion 50d is a substantially columnar member of which a height in the axial direction (direction along the center axis) is smaller than a diameter thereof. One circular surface of the facing portion 50d faces the lower surface 48 of the flat screw 40, and the other circular surface is connected to the shaping material supply device 60d. A heater 58 for heating the material is embedded in the facing portion 50d.

The material having thermoplastic properties supplied into the groove portion 42 flows along the groove portion 42 by rotation of the flat screw 40 while being melted by the rotation of the flat screw 40 and heating by the heater 58 and converted into a shaping material, and guided to a central portion 46 of the flat screw 40 as described later. The shaping material flowing into the central portion 46 is supplied to the shaping material supply device 60d via a communication hole 56 provided at the center of the facing portion 50d.

The shaping material supply device 60d is a supply device of the shaping material which is connected to the shaping material production section 30d. The shaping material supply device 60d includes a first flow path 65d and a rotating body 63. The first flow path 65d is a space provided inside the shaping material supply device 60d and is a flow path of the shaping material between the communication hole 56 and the rotating body 63. In this embodiment, the first flow path 65d is configured in a linear shape along a gravity direction. In the shaping material supply device 60d, the shaping material supplied from the facing portion 50d via the communication hole 56 flows through the first flow path 65d and the second flow path 64 provided inside the rotating body 63 as described later, and is delivered from the nozzle 61d.

The rotating body 63 includes a mechanism for controlling delivery and stopping of the shaping material supplied from the first flow path 65d. The rotating body 63 has the nozzle 61d, the second flow path 64, and the flow rate regulation mechanism 70d. The rotating body 63 is driven by a rotary drive portion 59 constituted by a rotary air cylinder, an electric motor, or the like. Details of the rotating body 63 will be described later.

The nozzle 61d is a delivery port provided at one end of the second flow path 64 and used for delivering the shaping material. The nozzle 61d has an opening with a hole diameter Dn and is connected to the communication hole 56 through the first flow path 65d and the second flow path 64 provided inside the rotating body 63.

The second flow path 64 is a space provided inside the rotating body 63 and is a flow path of the shaping material between the first flow path 65d and the nozzle 61d. The second flow path 64 is rotated by the rotating body 63 and controlled to a position where it is connected to the first flow path 65d and a position where it is not connected to the first flow path 65d. In FIG. 15, the second flow path 64 is disposed at a position where it is connected to the first flow path 65d (that is, position where it can communicate with the first flow path 65d). The shaping material melted in the shaping material production section 30d flows from the communication hole 56 to the first flow path 65d and is delivered from the nozzle 61d toward the shaping pedestal 220 of the shaping stage section 200 through the second flow path 64.

In the fourth embodiment, a shape of a cross section perpendicular to each flow direction of the shaping material in the first flow path 65d and the second flow path 64 is a circular shape having a diameter Wd (see FIG. 23), and the shapes coincide with each other. That is, in this embodiment, a shape of an inner diameter of a flow path in the second flow path 64 coincides with a shape of an inner diameter of a flow path in the first flow path 65d.

A shaping material including a material having thermoplastic properties as a main material is heated to a temperature equal to or higher than a glass transition point thereof and is delivered from the nozzle 61d in a completely melted state. For example, ABS resin has a glass transition point of about 120° C. and is at about 200° C. at the time of being delivered from the nozzle 61d. In order to deliver the shaping material in such a high temperature state, a heater may be provided around the nozzle 61d.

The flow rate regulation mechanism 70d is provided in the second flow path 64 and controls a flow rate of the shaping material flowing through the second flow path 64. The flow rate regulation mechanism 70d includes a butterfly valve 72d, a valve drive portion 74d, and a valve drive shaft 76d (see FIG. 23). The valve drive portion 74d is driven under control of the control section 300. A mechanism for modulating a flow rate of the second flow path by the flow rate regulation mechanism 70d will be described later.

The shaping stage section 200 is a pedestal for shaping a three-dimensional shaped object which includes a mechanism that moves in three axial directions. The shaping stage section 200 is provided at a position facing the nozzle 61d of the shaping material supply device 60d. The shaping stage section 200 includes a table 210, a shaping pedestal 220 placed on the table 210, and a movement mechanism 230 for displacing the shaping pedestal 220. The movement mechanism 230 includes three motors as denoted "M" in FIG. 15. The movement mechanism 230 is constituted by a triaxial positioner that moves the shaping pedestal 220 in three axial directions, which are X, Y, and Z directions, by driving forces of the three motors. The shaping stage section 200 changes a relative positional relationship between the nozzle 61d and the shaping pedestal 220 under control of the control section 300.

The control section 300 can be realized by, for example, a computer including a processor such as a CPU, a main memory, and a nonvolatile memory. In the nonvolatile memory in the control section 300, a computer program for controlling the three-dimensional shaping apparatus 100d is stored. The control section 300 drives the delivery unit 110d to deliver the shaping material to a position of coordinates on the shaping pedestal 220 depending on a shaping data, thereby executing a shaping process of shaping a three-dimensional shaped object.

Figure 16:
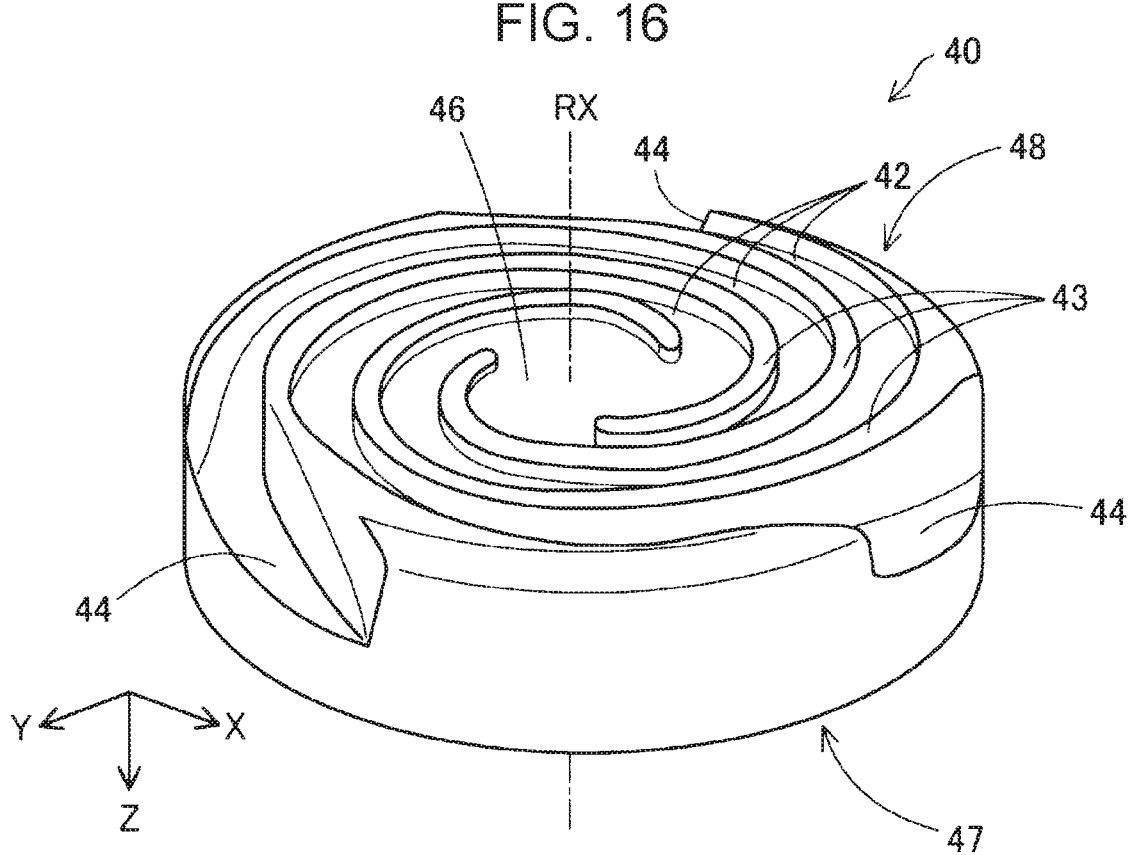
FIG. 16 is a schematic perspective view showing a configuration of the flat screw on a lower surface side.

FIG. 16 is a schematic perspective view showing a configuration of the flat screw 40 on the lower surface 48 side. In FIG. 16, a position of the rotation axis RX of the flat screw 40 in a case of rotating in the shaping material production section 30d is indicated by a dot-and-dash chain line. As described above, the groove portion 42 is provided on the lower surface 48 of the flat screw 40 facing the facing portion 50d (FIG. 15). Hereinafter, the lower surface 48 is also referred to as a "groove forming surface 48".

The central portion 46 of the groove forming surface 48 of the flat screw 40 is configured as a recessed portion to which one end of the groove portion 42 is connected. The central portion 46 faces the communication hole 56 (FIG. 15) of the facing portion 50d. In the fourth embodiment, the central portion 46 intersects with the rotation axis RX.

The groove portion 42 of the flat screw 40 extends swirlingly to draw an arc from the central portion 46 toward an outer periphery of the flat screw 40. The groove portion 42 may be configured to extend in a spiral shape. FIG. 16 shows an example of the flat screw 40 which constitutes side wall portions of the three groove portions 42 and has three convex portions 43 extending along the respective groove portions 42. A number of groove portions 42 and convex portions 43 provided in the flat screw 40 is not limited to three. In the flat screw 40, only one groove portion 42 may be provided, or two or more plurality of groove portions 42 may be provided. In addition, any number of convex portions may be provided depending on the number of groove portions 42.

The groove portion 42 is continued up to a material inlet port 44 formed on a side surface of the flat screw 40. The material inlet port 44 is a part for receiving the material supplied via the communication path 22 of the material supply portion 20. FIG. 16 shows an example of the flat screw 40 in which the material inlet port 44 is formed in three locations. A number of the material inlet ports 44 provided in the flat screw 40 is not limited to the three locations. In the flat screw 40, the material inlet port 44 may be provided at only one location, or may be provided at a plurality of locations which are two or more locations.

As the flat screw 40 rotates, the material supplied from the material inlet port 44 is melted while being heated by the heater 58 of the facing portion 50d in the groove portion 42, and converted into a shaping material. The shaping material flows through the groove portion 42 to the central portion 46.

Figure 17:
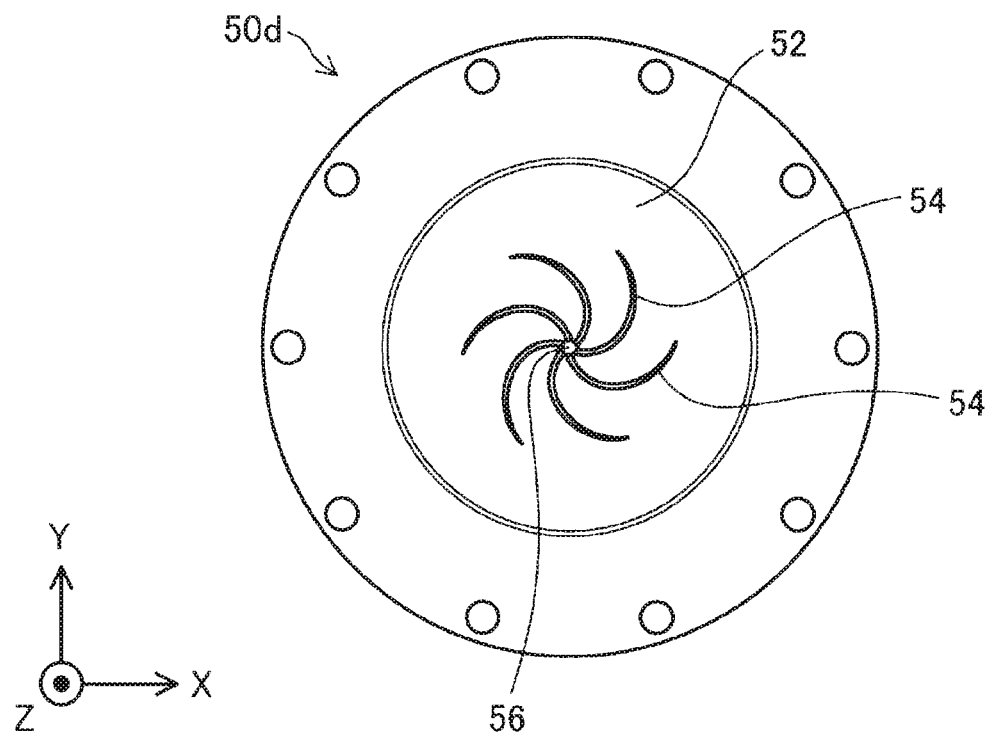
FIG. 17 is a schematic plan view showing an upper surface side of a facing portion.

FIG. 17 is a schematic plan view showing the upper surface 52 side of the facing portion 50d. The upper surface 52 of the facing portion 50d faces the groove forming surface 48 of the flat screw 40, as described above. Hereinafter, the upper surface 52 is also referred to as "screw facing surface 52". In the center of the screw facing surface 52, a communication hole 56 for supplying the shaping material to the first flow path 65d is formed.

In the screw facing surface 52, a plurality of guide grooves 54 connected to the communication hole 56 and extending swirlingly from the communication hole 56 toward an outer circumference are formed. The plurality of guide grooves 54 has a function of guiding the shaping material to the communication hole 56. As described above, in the facing portion 50d, a heater 58 for heating the material is embedded (see FIG. 15). Melting of the material in the shaping material production section 30d is realized due to heating by the heater 58 and rotation of the flat screw 40. As described above, according to the three-dimensional shaping apparatus 100d of the fourth embodiment, by using the flat screw 40, miniaturization of the apparatus and enhancement of shaping accuracy are realized.

Figure 18:
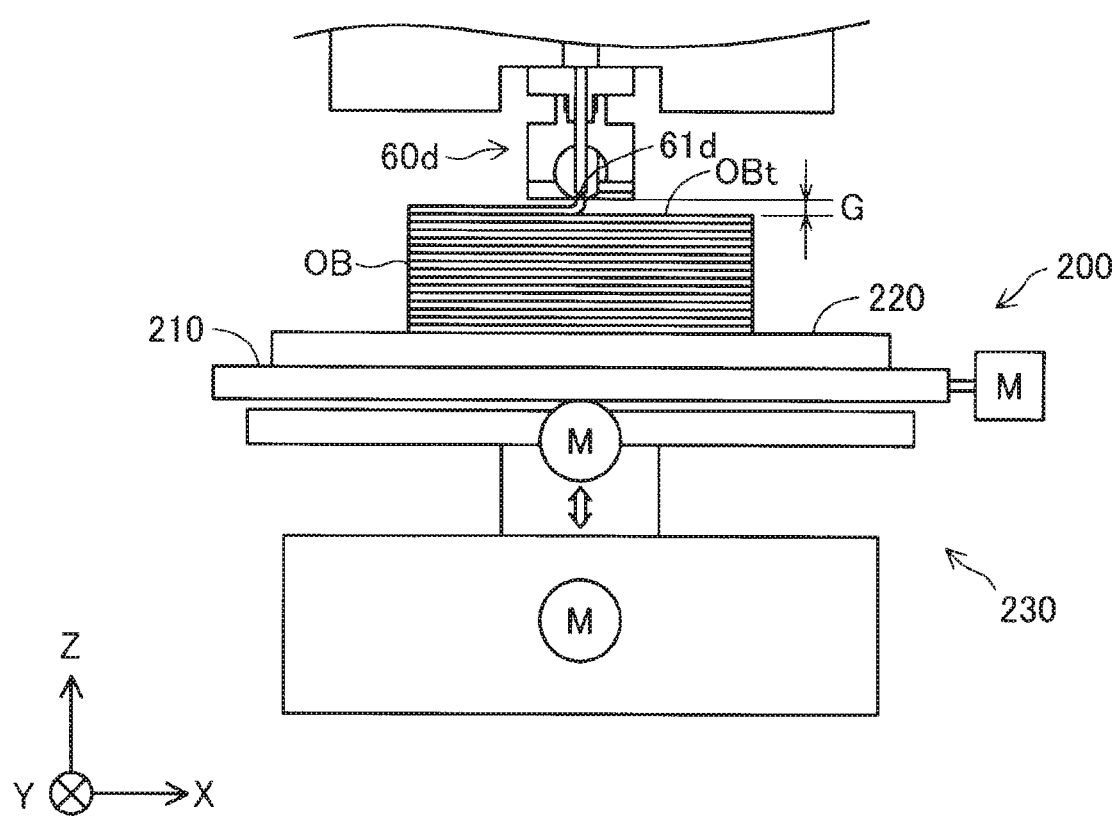
FIG. 18 is an explanatory diagram showing a positional relationship between a three-dimensional shaped object and a nozzle.

FIG. 18 is an explanatory diagram showing a positional relationship between the three-dimensional shaped object OB and the nozzle 61d. FIG. 18 schematically shows a situation where the three-dimensional shaped object OB is being shaped on the shaping pedestal 220.

In the three-dimensional shaping apparatus 100d, a gap G is held between the nozzle 61d and an upper surface OBt of the three-dimensional shaped object OB being shaped. Here, "the upper surface OBt of the three-dimensional shaped object OB" means a predetermined site where the shaping material delivered from the nozzle 61d is deposited in the vicinity of a position immediately below the nozzle 61d.

A size of the gap G is preferably equal to or greater than the hole diameter Dn (see FIG. 15) of the nozzle 61d, and more preferably 1.1 times or more the hole diameter Dn. In this way, the shaping material delivered from the nozzle 61d is deposited on the upper surface OBt of the three-dimensional shaped object OB in a free state of not being pressed against the upper surface OBt of the three-dimensional shaped object OB being manufactured. As a result, it is possible to prevent a transverse cross-sectional shape of the shaping material delivered from the nozzle 61d from collapsing, and it is possible to reduce a surface roughness of the three-dimensional shaped object OB. In addition, in a configuration in which a heater is provided around the nozzle 61d, by forming the gap G, it is possible to prevent overheating of the shaping material by the heater, and to suppress discoloration or deterioration due to overheating of the shaping material deposited on the three-dimensional shaped object OB.

On the other hand, a size of the gap G is preferably 1.5 times or less of the hole diameter Dn, and particularly preferably 1.3 times or less thereof. In this manner, deterioration of accuracy with respect to a predetermined site where the shaping material is to be disposed and deterioration of adhesiveness of the shaping material with respect to the upper surface OBt of the three-dimensional shaped object OB being manufactured are suppressed.

Figure 19:
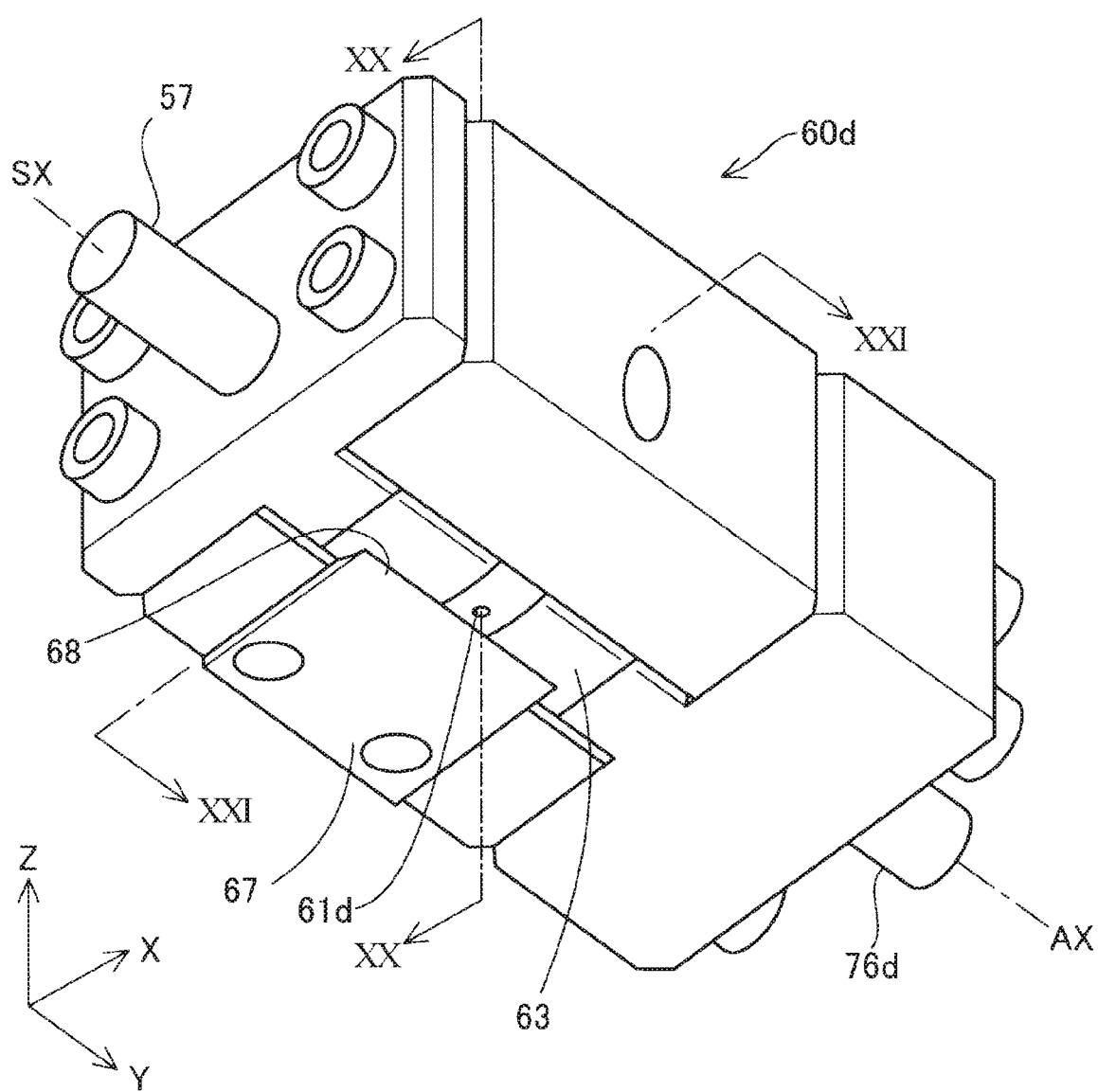
FIG. 19 is a schematic perspective view of a shaping material supply device including a flow rate regulation mechanism as viewed from a lower surface side.

FIG. 19 is a schematic perspective view of the shaping material supply device 60d including the flow rate regulation mechanism 70d as viewed from a lower surface side. A rotary drive shaft 57 is passed through from an outer surface of one surface of the shaping material supply device 60d in the Y direction. Further, the valve drive shaft 76d is inserted from an outer surface of the other surface of the shaping material supply device 60d in the Y direction. In FIG. 19, in addition to the respective members, the center axis AX of the valve drive shaft 76d in a case where the valve drive shaft 76d is rotated, and the center axis SX of the rotary drive shaft 57 in a case where the rotary drive shaft 57 is rotated are indicated by broken lines.

Figure 20:
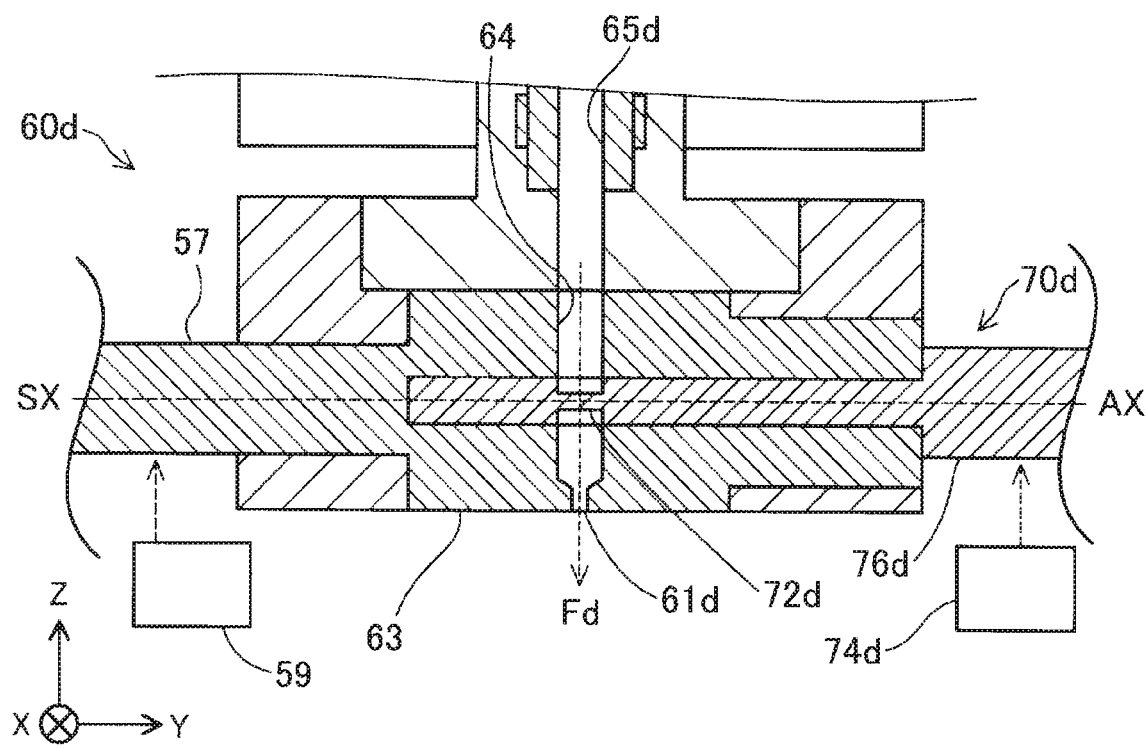
FIG. 20 is a cross-sectional view of the shaping material supply device at a position XX-XX in FIG. 19.

FIG. 20 is a cross-sectional view of the shaping material supply device 60d at the position XX-XX of FIG. 19. Specifically, FIG. 20 is a cross-sectional view taken along a plane perpendicular to the center axis SX of the rotary drive shaft 57, including the center axis of the flow direction Fd of the shaping material in the second flow path 64. The shaping material supply device 60d includes a first flow path 65d and a rotating body 63. In FIG. 20, in addition to the respective members, the flow direction Fd of the shaping material flowing through the second flow path 64, the center axis AX of the valve drive shaft 76d, and the center axis SX of the rotary drive shaft 57 are indicated by broken lines. In this embodiment, a position of the rotating body 63 and a position of the valve drive shaft 76d are configured so that the center axis SX of the rotating body 63 and the center axis AX of the valve drive shaft 76d coincide with each other. In addition, the center axis SX of the rotating body 63 and the flow direction Fd of the shaping material in the second flow path 64 are configured to perpendicularly intersect with each other.

The rotating body 63 is a substantially columnar member having the center axis SX. The rotating body 63 has the second flow path 64, a nozzle 61d, and a flow rate regulation mechanism 70d. The second flow path 64 is a flow path of a shaping material which is provided inside the rotating body 63 and is configured in a linear shape. In FIG. 20, an upper end of the second flow path 64 is connected to the first flow path 65d.

The rotary drive shaft 57 is a shaft-like member provided so that the center axis thereof perpendicularly intersects with the flow direction Fd of the shaping material in the second flow path 64. In this embodiment, the center axis of the rotary drive shaft 57 coincides with the center axis SX of the rotating body 63. Hereinafter, the expression "center axis SX" includes the center axis of the rotating body 63 and the center axis of the rotary drive shaft 57. The rotary drive shaft 57 is driven by a rotary drive portion 59 constituted by a rotary air cylinder, an electric motor, or the like. The rotating body 63 is rotated by a rotational driving force of the rotary drive shaft 57.

The flow rate regulation mechanism 70d includes a butterfly valve 72d, a valve drive portion 74d, and a valve drive shaft 76d. The flow rate regulation mechanism 70d is provided in the second flow path 64 and controls a flow rate of the shaping material flowing through the second flow path 64.

The valve drive shaft 76d is a shaft-like member provided so that the center axis AX perpendicularly intersects with the flow direction Fd of the shaping material in the second flow path 64. A part of the valve drive shaft 76d having a predetermined length from a tip thereof is provided inside the rotating body 63 by being inserted from one circular surface of the rotating body 63. At this time, the part of the valve drive shaft 76d is provided inside the rotating body 63 so that a position where the valve drive shaft 76d and the second flow path 64 intersect with each other coincides with a position of the butterfly valve 72d.

The valve drive portion 74d is a drive portion which is constituted by a rotary air cylinder, an electric motor, or the like, and has a mechanism for rotating the valve drive shaft 76d about the center axis AX. The butterfly valve 72d is rotated by a rotational driving force of the valve drive shaft 76d generated by the valve drive portion 74d.

The butterfly valve 72d is a plate-like member in which a part of the valve drive shaft 76d is processed into a plate shape. As described above, the position of the butterfly valve 72d is provided so as to coincide with the position where the valve drive shaft 76d and the second flow path 64 intersect with each other. In this manner, the butterfly valve 72d constitutes a part of a flow path of the second flow path 64 and is rotatably disposed in the second flow path 64.

The butterfly valve 72d is rotated by the valve drive shaft 76d so that the butterfly valve 72d is rotated to be at any position among a first position where the flow direction Fd of the shaping material in the second flow path substantially perpendicularly intersects with a surface direction of the butterfly valve 72d, a second position where the flow direction Fd of the shaping material in the second flow path 64 is substantially parallel to the surface direction of the butterfly valve 72d, and a third position where the flow direction Fd of the shaping material in the second flow path 64 and the surface direction of the butterfly valve 72d form any angle of angles larger than 0 degree and smaller than 90 degrees. FIG. 20 shows a state where the position of the butterfly valve 72d is at the first position.

Due to rotation of the butterfly valve 72d, an area of an opening formed in a flow path of the second flow path 64 is regulated. The "area of an opening" refers to an area of a remaining second flow path 64 obtained by excluding an area of a projected butterfly valve 72d from a projected area of the second flow path 64, in a case where the second flow path 64 and the butterfly valve 72d are projected along the flow direction Fd on a plane substantially perpendicular to the flow direction Fd of the shaping material. By regulating the area of the opening, a flow rate of the shaping material flowing through the second flow path 64 is regulated. In addition, by setting the area of the opening to zero, that is, by setting the butterfly valve 72d to close a flow path of the second flow path 64, it is possible to set a flow rate of the shaping material flowing through the second flow path 64 to a state of zero.

That is, the flow rate regulation mechanism 70d can control initiation and stopping of flow of the shaping material flowing through the second flow path 64 and regulation of a flow rate of the shaping material. In this specification, the expression "stopping delivery of shaping material" is used in a state where a flow rate of the shaping material is in a state of zero, that is, a flow path of the shaping material is closed. Unless otherwise specified, the expression "changing flow rate" does not include changing a flow rate of the shaping material to a state of zero.

Figure 21:
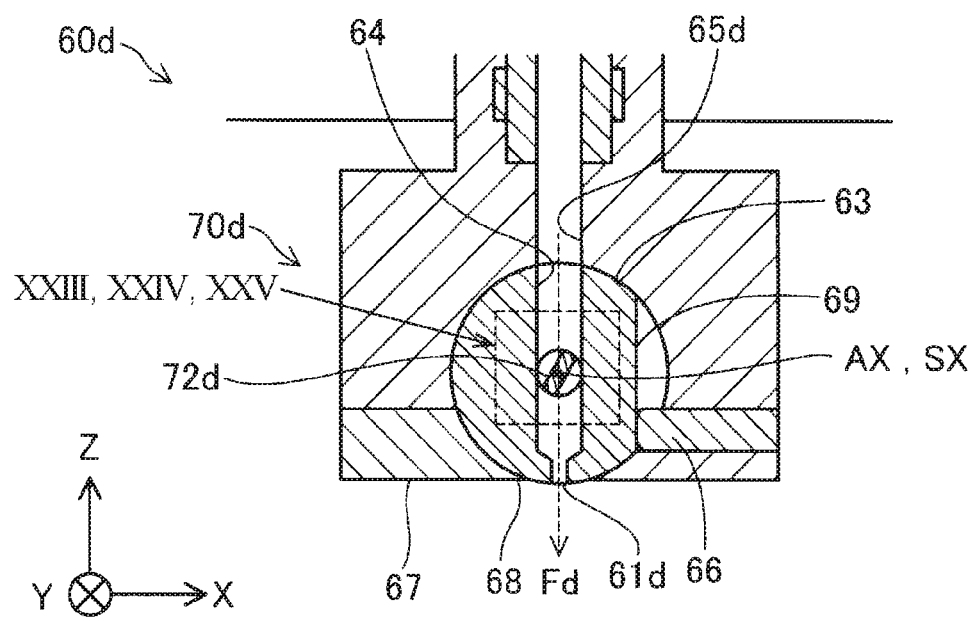
FIG. 21 is a cross-sectional view of the shaping material supply device at a position XXI-XXI in FIG. 19.

FIG. 21 is a cross-sectional view of the shaping material supply device 60d at a position XXI-XXI in FIG. 19. The shaping material supply device 60d includes a first flow path 65d and a rotating body 63. The first flow path 65d communicates with the communication hole 56, and the shaping material is supplied from the shaping material production section 30d (FIG. 15).

The rotating body 63 has a substantially columnar shape having the center axis SX. The rotating body 63 is configured to be rotatable within a predetermined angular range about the center axis SX in the shaping material supply device 60d. Rotation of the rotating body 63 is controlled by the control section 300 that drives the rotary drive portion 59 to rotate the rotary drive shaft 57.

The rotating body 63 has a nozzle 61d, a second flow path 64, and a flow rate regulation mechanism 70d. The nozzle 61d is a delivery port provided at one end of the second flow path 64 and used for delivering the shaping material. A hole diameter Dn of the nozzle 61d is smaller than a diameter of the flow path in the second flow path 64.

The second flow path 64 is a flow path of the shaping material between the first flow path 65d and the nozzle 61d. The rotating body 63 is provided at a reference position of the rotating body 63 by control of the control section 300. In this embodiment, the reference position of the rotating body 63 is a position where the first flow path 65d is connected to the other end side of the second flow path 64 which does not include the nozzle 61d. That is, the second flow path 64 is configured in a linear shape together with the first flow path 65d along a gravity direction at the reference position of the rotating body 63. The nozzle 61d is positioned at one end side of the second flow path 64 so as to face downward along the gravity direction. In this manner, in a case where the rotating body 63 is at the reference position, the first flow path 65d and the second flow path 64 are brought into a communicating state, and the shaping material is delivered from the nozzle 61d. The reference position of the rotating body 63 is also referred to as a "first rotational position". In FIGS. 20 and 21, a state where the rotating body 63 is at the first rotational position is shown.

In this embodiment, on a part of the rotating body 63, a flat portion 69 is provided. The flat portion 69 is a surface formed on an outer periphery of the rotating body 63, and is formed parallel to the center axis SX and parallel to the flow direction Fd. In addition, in this embodiment, the shaping material supply device 60d includes a pin 66. The pin 66 is a plate-like member extending along the center axis SX. The pin 66 is provided at a position capable of coming in contact with the flat portion 69 in the shaping material supply device 60d so that a plate-like surface thereof is parallel to a horizontal direction.

In a case where the rotating body 63 is at the first rotational position, in the flat portion 69, a surface of the pin 66 on a rotating body 63 side comes into contact with a lower end side of the flat portion 69 on a nozzle 61d side. On the other hand, in a case where the rotating body 63 is at a position that is rotated by a predetermined angle or more from the first rotational position, the surface of the pin 66 on the rotating body 63 side comes into contact with an upper end side opposite to the surface of the flat portion 69 on the side of the nozzle 61d side. Due to the contact between the flat portion 69 and the pin 66, a rotatable position of the rotating body 63 is restricted within a range of a predetermined position of the first rotational position to the second rotational position. By adjusting a protrusion amount of the pin 66 toward the flat portion 69 side, it is possible to adjust a rotation angle of the rotating body 63 to be restricted. In this manner, it is possible to finely adjust a delivery direction of the shaping material from the nozzle 61d.

Figure 22:
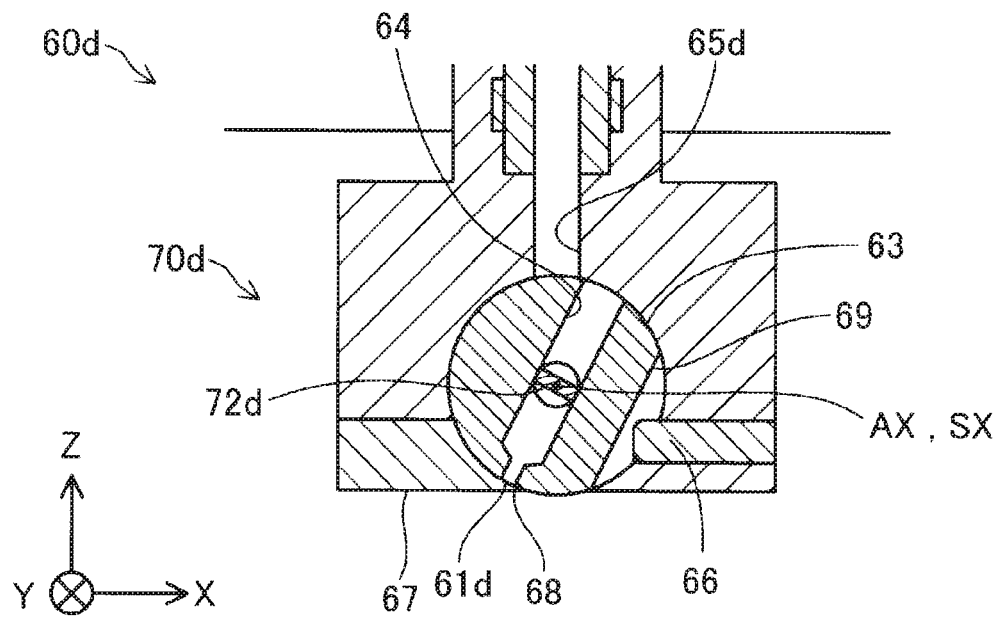
FIG. 22 is a cross-sectional view of the shaping material supply device showing a state where a rotating body is rotated from a first rotational position.

FIG. 22 is a cross-sectional view of the shaping material supply device 60d showing a state where the rotating body 63 is rotated from the first rotational position. FIG. 22 shows a state where the rotating body 63 is at a position that is rotated by a predetermined angle or more from the first rotational position. At this position, the first flow path 65d and the second flow path 64 are brought into a non-communicating state. That is, this is a position where the rotating body 63 is rotated from the first rotational position by an angle equal to or greater than an angle at which the first flow path 65d and the second flow path 64 are brought into a non-communicating state. The position of the rotating body 63 where the first flow path 65d and the second flow path 64 are brought into a non-communicating state is also referred to as a "second rotational position".

The second rotational position is a state where the first flow path 65d and the second flow path 64 do not communicate with each other and supply of the shaping material from the first flow path 65d to the second flow path 64 is stopped. Therefore, delivery of the shaping material from the nozzle 61d is stopped. The control section 300 is capable of stopping the delivery of the shaping material by driving the rotary drive portion 59 to rotate the rotating body 63 to the second rotational position. A rotation angle from the first rotational position to the second rotational position is determined depending on a length of the second flow path 64 and diameters of flow paths of the first flow path 65d and the second flow path 64. For example, it is possible to set the rotation angle to 30 degrees or less.

As shown in FIGS. 21 and 22, in this embodiment, the shaping material supply device 60d further includes a cutting portion 67 in addition to the respective members. The cutting portion 67 is disposed on a side where the nozzle 61d moves in a case where the rotating body 63 rotates from the first rotational position to the second rotational position with respect to a position of the nozzle 61d in a case where the rotating body 63 is at the first rotational position. Positions of the cutting portion 67 and the rotating body 63 are configured so that the cutting portion 67 is positioned to transverse an opening of the nozzle 61d in a relative manner in a case where the rotating body 63 rotates from the first rotational position to the second rotational position.

The cutting portion 67 includes a blade 68 for cutting the shaping material. A cutting edge of the blade faces a nozzle 61d side in a state where the rotating body 63 is provided at the first rotational position. Therefore, in a case where the rotating body 63 is rotated from the first rotational position to the second rotational position, the cutting edge of the blade 68 traverses the opening of the nozzle 61d in a relative manner, and thus the shaping material delivered from the nozzle 61d is cut. The cut shaping material is deposited on an upper surface OBt of the three-dimensional shaped object OB.

In this manner, it is possible to control a shape of an end of the shaping material delivered to an outside of the nozzle 61d to a certain shape, as compared with a mode in which the blade 68 is not provided. Therefore, it is possible to increase shaping accuracy of the three-dimensional shaped object. In addition, it is possible to suppress occurrence of stringing that, between the shaping material delivered to an outside of the nozzle 61d and the shaping material remaining at a delivery port of the nozzle 61d, a melted resin extends in a thread shape.

Further, at the second rotational position, the nozzle 61d is closed by an inner surface of the cutting portion 67 facing the rotating body 63. In a case of resuming delivery of the shaping material, the control section 300 drives the rotary drive portion 59 to rotate the rotating body 63 from the second rotational position to the first rotational position. By doing so, the first flow path 65d and the second flow path 64 are brought into a communicating state again and delivery of the shaping material from the nozzle 61d is resumed.

As described above, according to the three-dimensional shaping apparatus 100d of this embodiment, it is possible to stop delivery of the shaping material by rotating the rotating body 63 having the nozzle 61d, so that the delivery of the material is stopped with good response. In addition, by rotating the rotating body 63, it is possible to resume the delivery, so that responsiveness of delivery initiation can also be increased. Therefore, according to this embodiment, it is possible to suppress excessive delivery of the shaping material and delayed delivery, so that shaping accuracy and shaping speed of the three-dimensional shaped object OB is increased.

Further, in this embodiment, since the shaping material delivered from the nozzle 61d can be cut by the cutting portion 67, a shape of an end of the shaping material can be adapted to a certain shape. Therefore, it is possible to further increase shaping accuracy of the three-dimensional shaped object OB. Furthermore, in a case where delivery of the shaping material is stopped, since the nozzle 61d is closed by the cutting portion 67, it is possible to suppress leakage of the shaping material remaining in the second flow path 64 from the nozzle 61d. Therefore, it is possible to further increase shaping accuracy of the three-dimensional shaped object OB.

Figure 23:
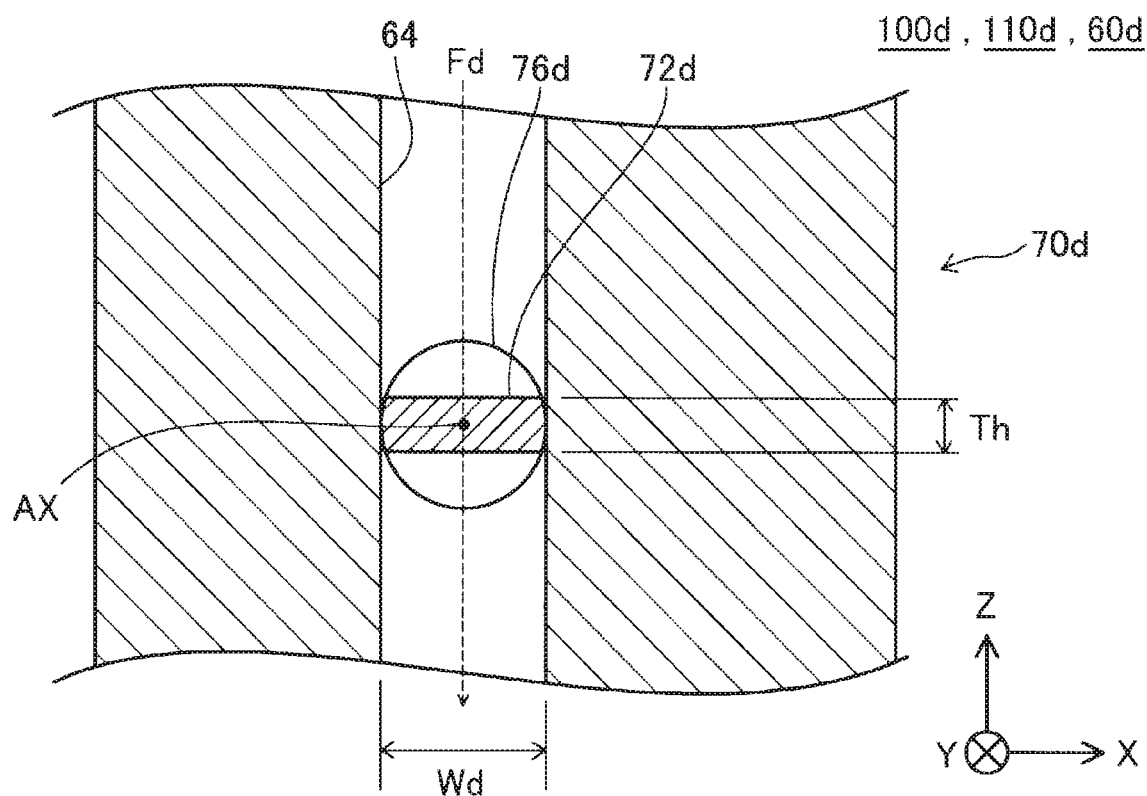
FIG. 23 is an enlarged cross-sectional view showing the flow rate regulation mechanism in a state where a butterfly valve is at a first position in a region shown in FIG. 21.

FIG. 23 is an enlarged cross-sectional view showing the flow rate regulation mechanism 70d in a state where the butterfly valve 72d is at the first position in the region XXIII shown in FIG. 21. Specifically, FIG. 23 is a cross-sectional view taken along a plane perpendicular to the center axis AX of the valve drive shaft 76d, including the center axis of the flow direction Fd of the shaping material in the second flow path 64. In FIG. 23, in addition to the respective members, the center axis AX of the valve drive shaft 76d, a thickness Th of the butterfly valve 72d, the flow direction Fd of the shaping material flowing through the second flow path 64, and a diameter Wd of a cross section of the second flow path 64 in a direction substantially perpendicularly intersecting with the flow direction Fd are schematically shown. In FIG. 23, in the butterfly valve 72d, the valve drive shaft 76d is rotated by the valve drive portion 74d (see FIG. 20) with respect to the center axis AX. In this manner, the butterfly valve 72d is disposed at a position (first position) where a surface direction thereof substantially perpendicularly intersects with the flow direction Fd.

In the fourth embodiment, the butterfly valve 72d is a substantially square plate-like member of which a thickness Th is one-third of the diameter Wd of the second flow path 64. A length of one side of the butterfly valve 72d in the surface direction is substantially the same as the diameter Wd of the cross section of the second flow path 64. That is, by disposing the butterfly valve 72d at a position (first position) where the surface direction of the butterfly valve 72d substantially perpendicularly intersects with the flow direction Fd of the shaping material, a flow path of the shaping material in the second flow path 64 is closed by a surface of the butterfly valve 72d.

Figure 24:
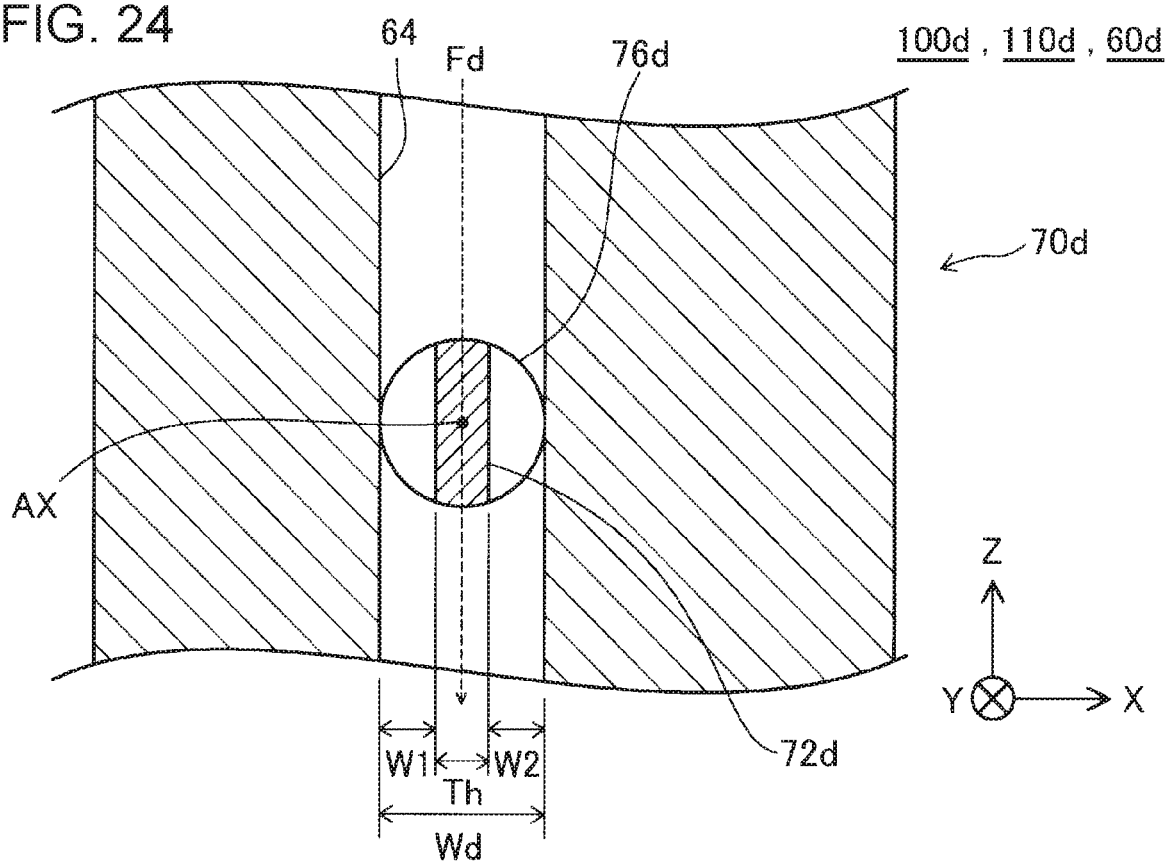
FIG. 24 is an enlarged cross-sectional view showing the flow rate regulation mechanism in a state where the butterfly valve is at a second position in the region shown in FIG. 21.

FIG. 24 is an enlarged cross-sectional view showing the flow rate regulation mechanism 70d in a state where the butterfly valve 72d is at the second position in the region XXIV shown in FIG. 21. Specifically, FIG. 24 is a cross-sectional view taken along a plane perpendicular to the center axis AX of the valve drive shaft 76d, including the center axis of the flow direction Fd of the shaping material in the second flow path 64. In FIG. 24, in addition to the respective members, the center axis AX of the valve drive shaft 76d, a thickness Th of the butterfly valve 72d, the flow direction Fd of the shaping material in the second flow path 64, a diameter Wd of a cross section of the second flow path 64 in a direction substantially perpendicularly intersecting with the flow direction Fd, a width W1 in the X direction of a flow path sandwiched between one surface of the butterfly valve 72d and an inner wall of the second flow path 64, and a width W2 in the X direction of a flow path sandwiched between the other surface of the butterfly valve 72d and the inner wall of the second flow path 64 are schematically shown. In FIG. 24, the valve drive shaft 76d is rotated by the valve drive portion 74d with respect to the center axis AX, so that the butterfly valve 72d is disposed at a position (second position) where a surface direction thereof is substantially parallel to the flow direction Fd.

In a case where the butterfly valve 72d is projected along the flow direction Fd on a plane substantially perpendicular to the flow direction Fd in a state where the butterfly valve 72d is disposed at the second position, an area of the butterfly valve 72d is the smallest. Conversely, in the second flow path 64, a flow path of the shaping material is the largest. That is, the state where the butterfly valve 72d is at the second position is a state where a flow rate in the second flow path 64 is maximized by the flow rate regulation mechanism 70d.

Figure 25:
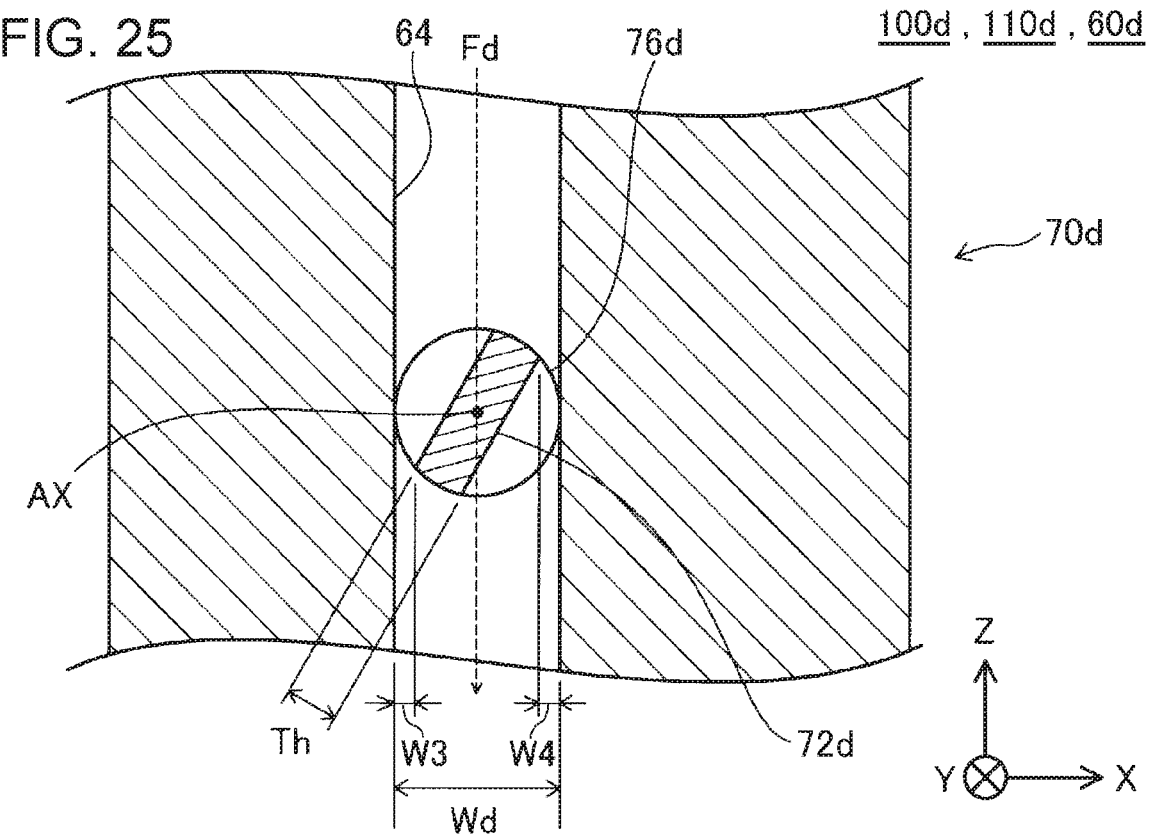
FIG. 25 is an enlarged cross-sectional view showing the flow rate regulation mechanism in a state where the butterfly valve is at a third position in the region shown in FIG. 21.

FIG. 25 is an enlarged cross-sectional view showing the flow rate regulation mechanism 70d in a state where the butterfly valve 72d is at the third position in the region XXV shown in FIG. 21. Specifically, FIG. 25 is a cross-sectional view taken along a plane perpendicular to the center axis AX of the valve drive shaft 76d, including the center axis of the flow direction Fd of the shaping material in the second flow path 64. In FIG. 25, in addition to the respective members, the center axis AX of the valve drive shaft 76d, a thickness Th of the butterfly valve 72d, the flow direction Fd of the shaping material in the second flow path 64, a diameter Wd of a cross section of the second flow path 64 in a direction substantially perpendicularly intersecting with the flow direction Fd, a width W3 which is the smallest among widths in the X direction of a flow path sandwiched between one surface of the butterfly valve 72d and an inner wall of the second flow path 64, and a width W4 which is the smallest among widths in the X direction of the flow path sandwiched between the other surface of the butterfly valve 72d and the inner wall of the second flow path 64 are schematically shown. In FIG. 25, the valve drive shaft 76d is rotated by the valve drive portion 74d (see FIG. 20) with respect to the center axis AX, so that the butterfly valve 72d is disposed at a position (third position) where an angle formed by the flow direction Fd of the shaping material flowing through the second flow path 64 and the surface direction of the butterfly valve 72d becomes any angle among angles larger than 0 degree and smaller than 90 degrees.

The width W3 and the width W4 are varied as the butterfly valve 72d is rotated. Relationships between the width W1 and the width W2 (see FIG. 24) at the second position and between the widths W3 and W4 at the third position are 0<W3<W1, 0<W4<W2. In a state where the butterfly valve 72d is disposed at the third position, in a case where the butterfly valve 72d is projected along the flow direction Fd on a plane substantially perpendicular to the flow direction Fd, an area of the butterfly valve 72d is larger than an area in a case of being disposed at the second position and smaller than an area in a case of being disposed at the first position. In addition, the area of the butterfly valve 72d varies with variations of the above-mentioned width W3 and the width W4. That is, by adjusting the angle formed by the flow direction Fd of the shaping material flowing through the second flow path 64 and the surface direction of the butterfly valve 72d to be an angle larger than 0 degree and smaller than 90 degrees, it is possible to regulate an area of a flow path at a position where the butterfly valve 72d in the second flow path 64 is provided to be within a range that is larger than the area in a case of being disposed at the first position and smaller than the area in a case of being disposed at the second position. That is, by regulating a flow rate in the second flow path 64 by the flow rate regulation mechanism 70d, an amount of the shaping material delivered from the nozzle 61d is controlled.

As described above, according to the shaping material supply device 60d of the fourth embodiment, it is possible to control initiation and stopping of delivery of the shaping material from the nozzle 61d and an amount of the shaping material delivered from the nozzle 61d by the butterfly valve 72d provided in the second flow path 64 through which the shaping material flows. Therefore, it is possible to control initiation timing and stopping timing of delivery of the shaping material from the nozzle 61d, and a delivery amount of the shaping material with higher accuracy than a mode in which the flow rate regulation mechanism 70d is not provided. In addition, in this embodiment, since the material is melted by the shaping material production section 30d including the flat screw 40, it is possible to decrease a size of the entire apparatus.

Figure 26:
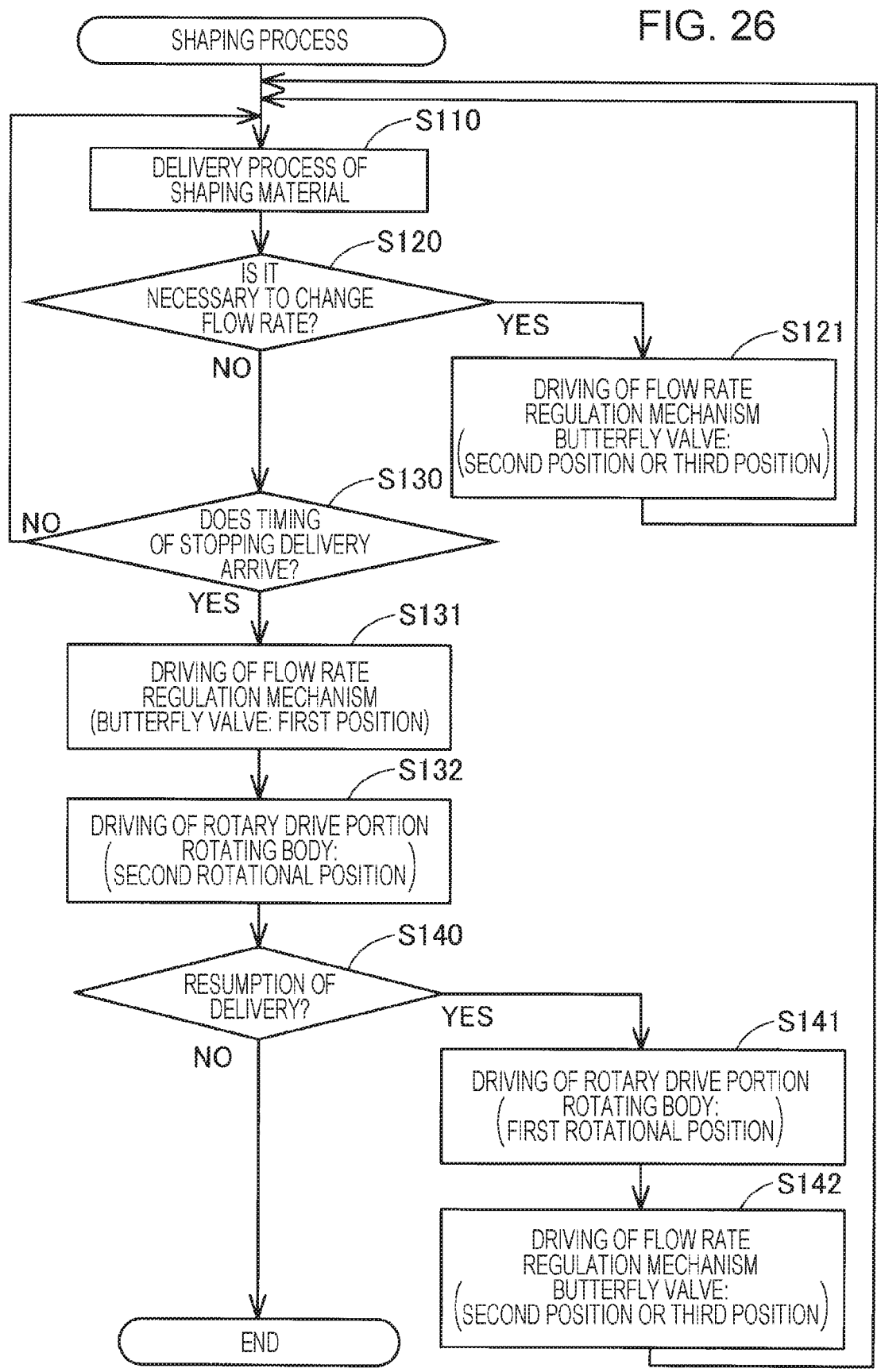
FIG. 26 is an explanatory diagram showing an example of a flow of shaping process executed by the control section.

FIG. 26 is an explanatory diagram showing an example of flow of shaping process executed by the control section 300. Step S110 is a delivery step of delivering the shaping material from the nozzle 61d. In step S110, the control section 300 executes a delivery process of continuously delivering the shaping material from the nozzle 61d toward the shaping pedestal 220 by driving the drive motor 32 of the shaping material production section 30d to rotate the flat screw 40. At this time, the control section 300 executes a process of reading a set value (that is, initial set value at the initiation of delivery) of a flow rate of the shaping material at the initiation of the delivery process, thereby driving the flow rate regulation mechanism 70d, and of moving the butterfly valve 72d to a predetermined position of the second position or the third position, and then executes the delivery process. In addition, the control section 300 executes a process of driving the rotary drive portion 59 so that the rotating body 63 is moved to the first rotational position.

While the delivery process is executed, the control section 300 controls the movement mechanism 230 of the shaping stage section 200 so that the shaping pedestal 220 is displaced in three axial directions of the X, Y, and Z directions depending on a shaping data. In this manner, the shaping material is deposited at a target position on the shaping pedestal 220.

In this embodiment, the control section 300 performs the delivery process for each unit corresponding to one pixel in a case where a shaping data of the three-dimensional shaped object is developed in a plane. In addition, likewise, for each unit corresponding to one pixel, a determination is also made as to whether or not to execute the processes from step S120 to step S142. While the delivery process is executed in step S110, the control section 300 may execute a determination in advance as to the processes from step S110 to step S142 for a unit corresponding to one pixel to be processed next based on the shaping data.

In step S120, the control section 300 determines whether or not it is necessary to change a flow rate of the shaping material. In a case where it is necessary to change the flow rate of the shaping material (step S120: YES), the control section 300 executes a process of controlling the flow rate regulation mechanism 70d so that the butterfly valve 72d is moved to a predetermined position of the second position or the third position (step S121). In this manner, the flow rate of the shaping material in the second flow path 64 is changed.

For example, in order to shape a complicated part or fine portion of a shaped object, in a case of shaping a three-dimensional shaped object after reducing a movement speed of the shaping pedestal 220, the control section 300 makes a determination to reduce a delivery amount of the shaping material from the nozzle 61d. The control section 300 changes the flow rate of the shaping material by moving the butterfly valve 72d from the second position of the butterfly valve 72d set to shape a part having a simple structure of the shaped object to a predetermined position of the third position. Alternatively, the control section 300 may determine that it is necessary to change the flow rate of the shaping material from the nozzle 61d in a case of receiving an interrupt command for changing a flow rate from a user or higher-order control section.

On the other hand, in a case where it is not necessary to change the flow rate of the shaping material (step S120: NO), the control section 300 determines whether or not the timing of stopping delivery of the shaping material arrives (step S130). For example, in a case where the shaping material is separately deposited at a position separated by a predetermined distance from the position at which the shaping material has been delivered until that time, the control section 300 determines that the timing of stopping delivery of the shaping material from the nozzle 61d arrives. Alternatively, the control section 300 may determine that the timing of temporarily discontinuing delivery of the shaping material from the nozzle 61d arrives in a case of receiving a temporary stop command from a user or higher-order control section.

In a case where the timing of stopping delivery of the shaping material does not arrive, the control section 300 continues the delivery process of the shaping material in step S110 (step S130: NO). On the other hand, in a case where the timing of discontinuing delivery of the shaping material arrives (step S130: YES), the control section 300 executes processes of steps S131 to S140.

Steps S131 to S132 are delivery stopping steps for controlling outflow of the shaping material from the nozzle 61d. In the delivery stopping steps, the control section 300 controls the flow rate regulation mechanism 70d so that the butterfly valve 72d is moved to the first position. In this manner, a position of the butterfly valve 72d in the second flow path 64 is closed, and flow of the shaping material to the nozzle 61d side (that is, downstream side) of the flow rate regulation mechanism 70d is stopped (step S131).

The control section 300 causes the flow rate regulation mechanism 70d to close the second flow path 64 in step S131, and then drives the rotary drive portion 59 so that the rotating body 63 is moved to the second rotational position (step S132). According to this delivery stopping step, it is possible to execute control of causing the butterfly valve 72d to close the second flow path 64, and then causing the rotating body 63 to move to the second rotational position. In a case where, while stopping the outflow of the shaping material from the nozzle 61d, for example, the nozzle 61d should resume next delivery of the shaping material, the control section 300 may change a position of the nozzle 61d with respect to the shaping pedestal 220 so that the nozzle 61d is positioned at coordinates of the shaping pedestal 220.

As described above, the control section 300 is capable of stopping flow of the shaping material to a nozzle 61d side (that is, downstream side of the second flow path 64) of the flow rate regulation mechanism 70d, and then move the rotating body 63 to the second rotational position. Therefore, in a case where the delivery of the shaping material is stopped by the flow rate regulation mechanism 70d, pressure-feeding of the shaping material is stopped due to continuous supply of the shaping material on a downstream side of the flow rate regulation mechanism 70d. That is, due to stopping of the delivery of the shaping material on an upstream side of the nozzle 61d by the flow rate regulation mechanism 70d, a flow speed of the shaping material remaining on the downstream side of the flow rate regulation mechanism 70d is reduced. In this manner, as compared with a mode in which the flow rate regulation mechanism 70d is not provided, in the rotating body 63, the shaping material in a state where the speed delivered from the nozzle 61d is reduced can be cut. Therefore, it is possible to control a shape of an end of the shaping material to a certain shape, and it is possible to increase shaping accuracy of the three-dimensional shaped object. In addition, it is possible to more reliably suppress occurrence of stringing that, between the shaping material delivered to an outside of the nozzle 61d and the shaping material remaining at a delivery port of the nozzle 61d, the melted material extends in a thread shape.

The control section 300 determines whether or not the timing of resuming delivery of the shaping material from the nozzle 61d arrives (step S140). In a case where the timing of resuming delivery of the shaping material arrives, control for initiating outflow of the shaping material from the nozzle 61d is performed (step S140: YES). Specifically, the control section 300 executes a process of driving the rotary drive portion 59, and of moving the rotating body 63 from the second rotational position to the first rotational position (step S141). Next, the control section 300 continues the delivery process of the shaping material in step s110 by executing a process of reading a set value of a flow rate of the shaping material at the resumption of the delivery process, thereby driving the flow rate regulation mechanism 70d, and of moving the butterfly valve 72d to a predetermined position of the second position or the third position (step S142). On the other hand, in a case where delivery of the shaping material from the nozzle 61d is not resumed (that is, shaping process is completed), the control section 300 ends the process (step S140: NO).

In step S131, in a case where the second flow path 64 is closed by the butterfly valve 72d and delivery of the shaping material from the nozzle 61d is stopped, it is desirable that the control section 300 keeps rotation of the flat screw 40 being continued without being stopped. In this manner, in step S140, it is possible to more quickly resume delivery of the shaping material from the nozzle 61d.

Fifth Embodiment

Figure 27:
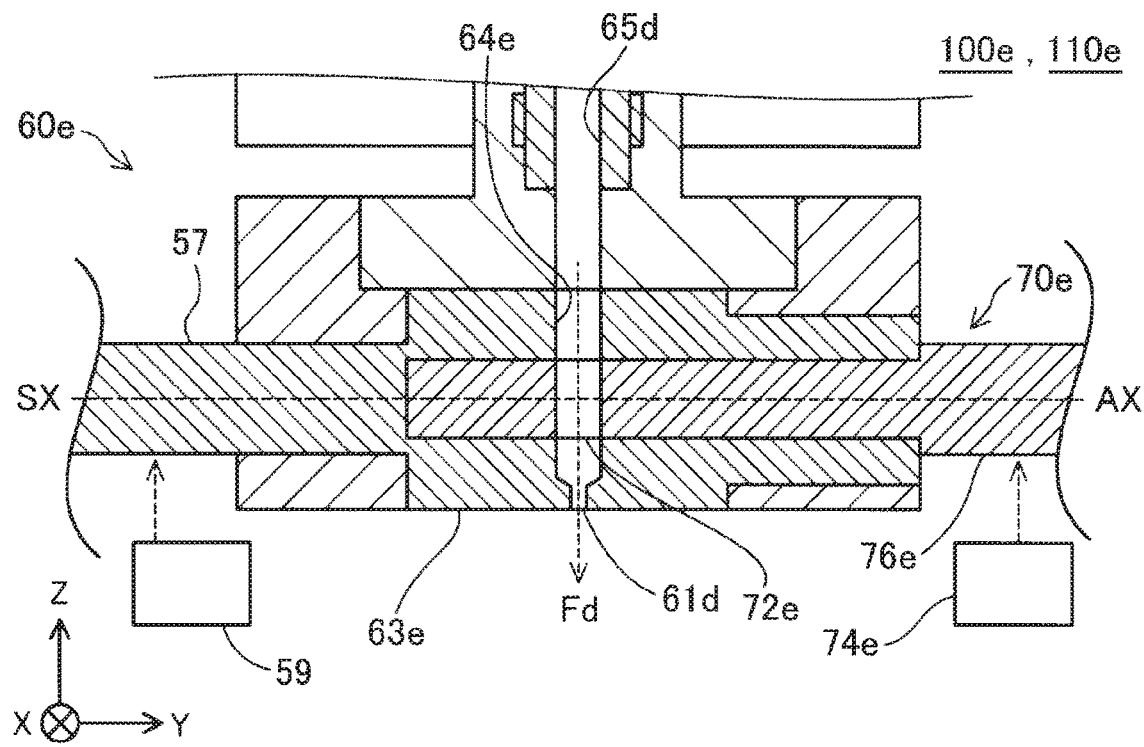
FIG. 27 is a cross-sectional view showing a state where a shutter portion of a flow rate regulation mechanism is provided at the second position.
Figure 28:
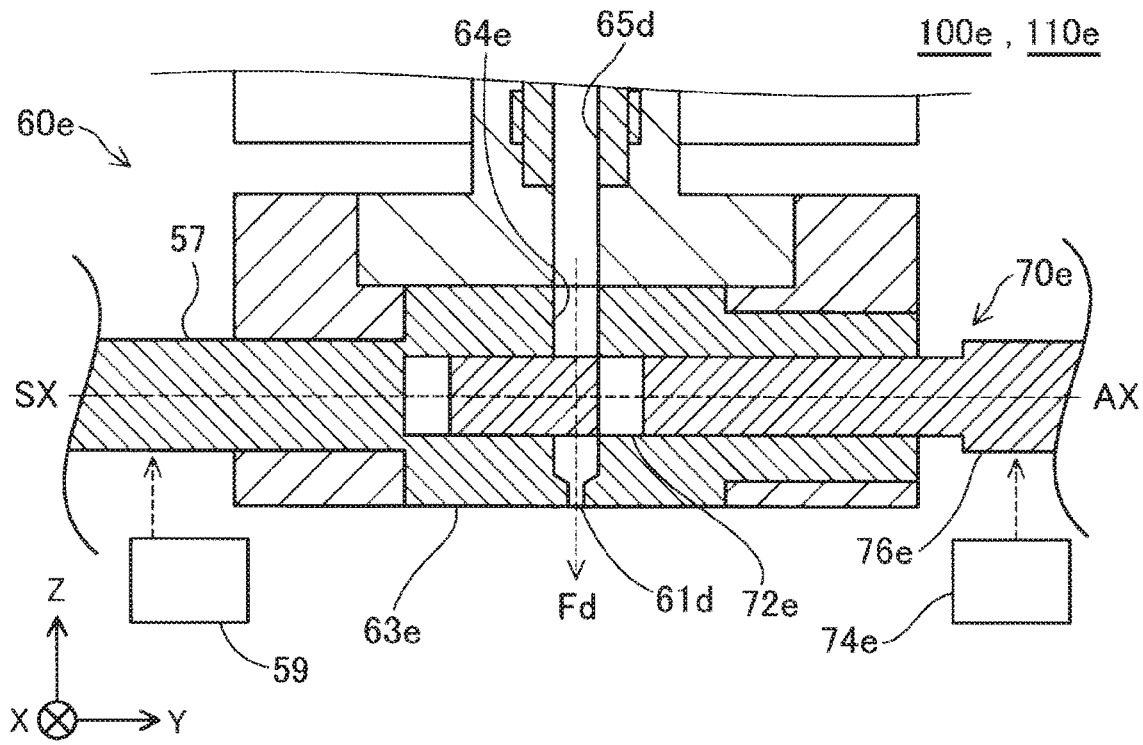
FIG. 28 is a cross-sectional view showing a state where the shutter portion of the flow rate regulation mechanism is provided at the first position.
Figure 29:
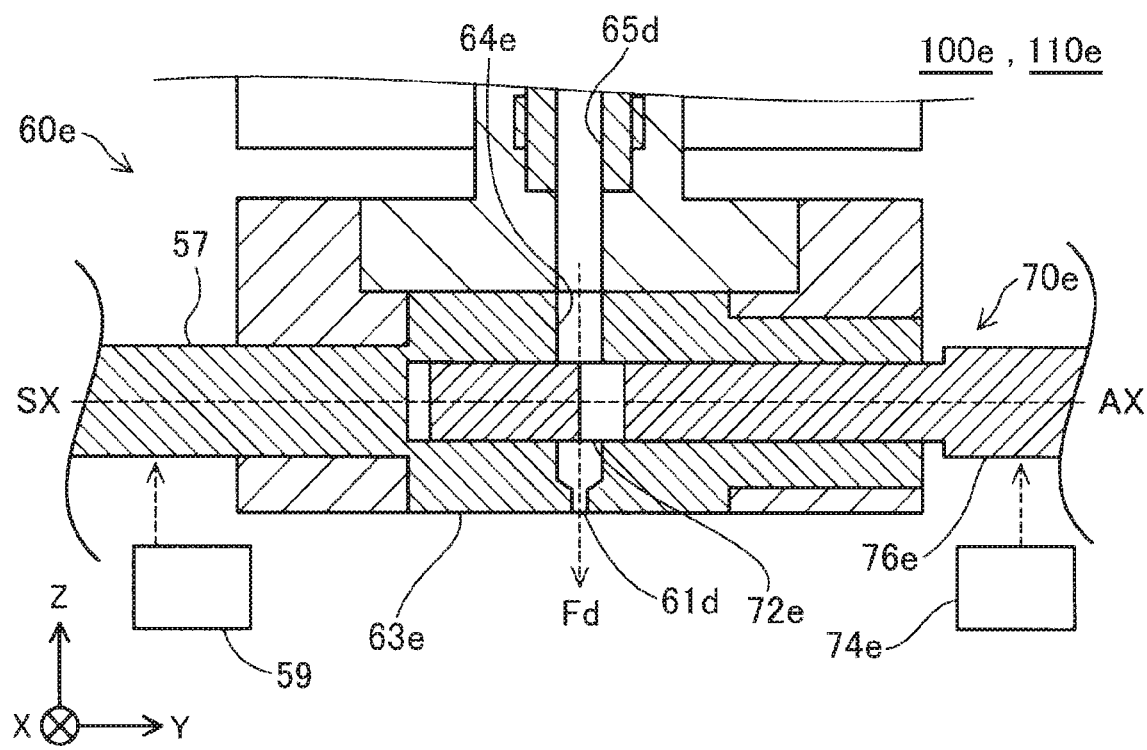
FIG. 29 is a cross-sectional view showing a state where the shutter portion of the flow rate regulation mechanism is provided at the third position.

With reference to FIG. 27 to FIG. 29, a configuration of a flow rate regulation mechanism 70e included as a shaping material supply device 60e in a three-dimensional shaping apparatus 100e of a fifth embodiment will be described. A configuration of the three-dimensional shaping apparatus 100e of the fifth embodiment is the same as that of the three-dimensional shaping apparatus 100d of the fourth embodiment except that the shaping material supply device 60e of the fifth embodiment is provided instead of the shaping material supply device 60d of the fourth embodiment.

FIG. 27 is a cross-sectional view showing a state where the shutter portion 72e of the flow rate regulation mechanism 70e is provided at the second position. The flow rate regulation mechanism 70e includes a shutter portion 72e, a shutter drive portion 74e, and a shutter drive shaft 76e. The flow rate regulation mechanism 70e constitutes a part of a second flow path 64e and controls a flow rate of the shaping material flowing through the second flow path 64e.

The shutter drive portion 74e generates a driving force for reciprocally moving the shutter drive shaft 76e along the center axis AX within a void of a rotating body 63e. By the reciprocating movement of the shutter drive shaft 76e, a position of the shutter portion 72e is reciprocated in parallel with the center axis AX. The position of the shutter portion 72e is moved to any position among a first position where a flow path of the second flow path 64e is closed, a second position where the flow path of the second flow path 64e is maximally opened, and a third position where in a case where the shutter portion 72e and the second flow path 64e are connected to each other and an area obtained by projecting a part where the shutter portion 72e and the second flow path 64e are connected to each other along a flowing direction Fd onto a cross section perpendicular to the flow direction Fd is smaller than an area in a state of the second position.

The shutter drive shaft 76e is a shaft-like member extending along the center axis AX provided inside the rotating body 63e. An outer diameter of a part of the shutter drive shaft 76e provided inside the rotating body 63e is larger than an inner diameter of the second flow path 64e. On a part of the shutter drive shaft 76e, the shutter portion 72e which is a substantially columnar void is provided. An inner diameter of a circular cross section perpendicular to the axial direction of a substantially columnar shape of the shutter portion 72e coincides with the inner diameter of the second flow path 64e.

The shutter drive shaft 76e is connected to the second flow path 64e, and the shutter portion 72e is provided at a position where the shutter drive shaft 76e and the second flow path 64e intersect with each other. At this time, the shutter portion 72e constitutes a part of a flow path of the second flow path 64e by being connected so that the axial direction of the shutter portion 72e and the flow direction Fd of the second flow path 64e coincide with each other. Thus, in a state where the shutter portion 72e is at the second position, it is possible to flow the shaping material into the nozzle 61d through the shutter portion 72e and to deliver the shaping material from the nozzle 61d. In addition, an area of a shape obtained by projecting the part where the shutter portion 72e and the second flow path 64e are connected to each other along the flowing direction Fd onto the cross section perpendicular to the flow direction Fd is the largest. That is, the state where the shutter portion 72e is provided at the second position is a state where a flow rate in the second flow path 64e is maximized.

A through-hole (not shown) is provided in an inner wall on a rotary drive shaft 57 side of an inner wall surrounding the void for providing the shutter drive shaft 76e inside the rotating body 63e. In this manner, the shutter drive shaft 76e can reciprocate in a state where variations of air pressure in a space between the inner wall and the shutter drive shaft 76e are small.

FIG. 28 is a cross-sectional view showing a state where the shutter portion 72e of the flow rate regulation mechanism 70e is provided at the first position. For example, in a case of using flow of the fourth embodiment, in a case where the timing of stopping delivery of the shaping material arrives in step S130 (see FIG. 26), in place of S131 and S132, the shutter drive portion 74e moves the shutter drive shaft 76e along the center axis AX to a position where the second flow path 64e and the shutter portion 72e are brought into a non-communicating state. In this manner, flow of the shaping material from the second flow path 64e into the nozzle 61d is blocked by movement of the shutter portion 72e, and outflow of the shaping material from the nozzle 61d is stopped. That is, the state where the shutter portion 72e is provided at the first position is a state where the flow path of the second flow path 64e is closed.

FIG. 29 is a cross-sectional view showing a state where the shutter portion 72e of the flow rate regulation mechanism 70e is provided at the third position. For example, in the case of using flow of the fourth embodiment, in a case where it is necessary to change a flow rate of the shaping material in step S120 (see FIG. 26), in place of S121, the shutter drive portion 74e moves the shutter drive shaft 76e along the center axis AX to a position where a part of the second flow path 64e and a part of the shutter portion 72e are connected to each other. Specifically, the shutter drive portion 74e moves the shutter drive shaft 76e to a position (third position) where the area obtained by projecting a part where the shutter portion 72e and the second flow path 64e are connected to each other along the flowing direction Fd onto the cross section perpendicular to the flow direction Fd is smaller than an area in a state of the second position. The part where the shutter portion 72e and the second flow path 64e are connected to each other is a flow path of the shaping material from the second flow path 64e to the shutter portion 72e.

The area obtained by projecting a part where the shutter portion 72e and the second flow path 64e are connected to each other along the flowing direction Fd onto the cross section perpendicular to the flow direction Fd is smaller as the shutter portion 72e in the third position is close to a position where the shutter portion 72e is provided at the first position, and is larger as the shutter portion 72e in the third position is close to a position where the shutter portion 72e is provided at the second position. By moving the shutter portion 72e to a predetermined position in the third position, the shutter drive portion 74e is capable of controlling an outer shape of a part (that is, flow path of the shaping material) where the shutter portion 72e and the second flow path 64e are connected to each other to a predetermined outer shape. That is, by causing the shutter drive portion 74e to move the shutter portion 72e in the third position, it is possible to regulate a flow rate of the shaping material.

As described above, according to the shaping material supply device 60e of the fifth embodiment, since the second flow path 64e is opened and closed by movement of a position of the shutter portion 72e, it is possible to perform initiation or stopping of delivery of the shaping material from the nozzle 61d at a more appropriate timing. In addition, due to closing of the second flow path 64e by movement of the shutter portion 72e, leakage of the shaping material from the nozzle 61d during the stopping of delivery of the shaping material from the nozzle 61d is stopped. Furthermore, by adjusting an opening degree of the shutter portion 72e, it is possible to control an amount of shaping material delivered from the nozzle 61d. In addition, since the second flow path 64e is closed by the shutter portion 72e, it is possible to stop delivery of the shaping material from the nozzle 61d even while rotation of the flat screw 40 by the drive motor 32 is continued.

Sixth Embodiment

Figure 30:
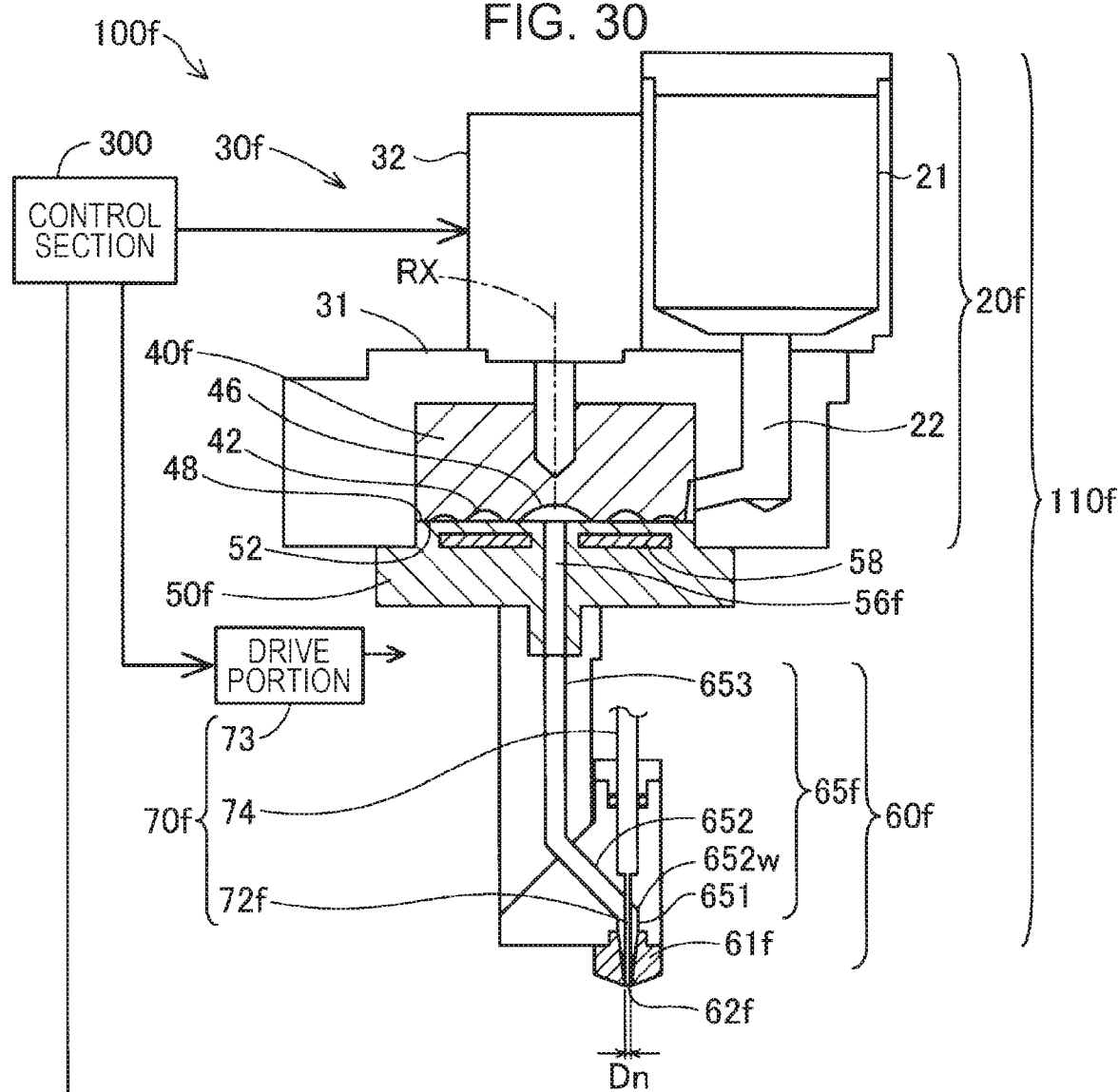
FIG. 30 is a schematic view showing a configuration of a three-dimensional shaping apparatus in a sixth embodiment.
Figure 30:
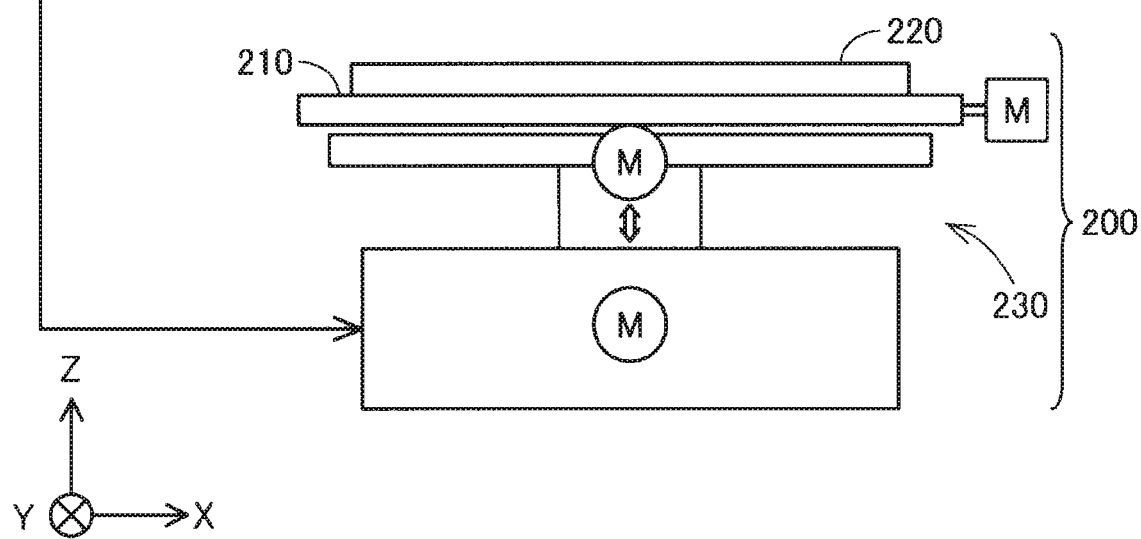

FIG. 30 is a schematic view showing a configuration of a three-dimensional shaping apparatus 100f in a sixth embodiment.

The three-dimensional shaping apparatus 100f is an apparatus for shaping a three-dimensional shaped object by using a shaping material using a thermoplastic resin as a main material. The three-dimensional shaping apparatus 100*f* includes a discharge unit 110*f*, a shaping stage section 200, and a control section 300.

The discharge unit 110*f* is controlled by the control section 300 to supply the shaping material to the shaping stage section 200. The discharge unit 110*f* includes a material supply section 20*f*, a shaping material production section 30*f*, and a head section 60*f*.

The material supply section 20*f* supplies a shaping material having thermoplastic properties to the shaping material production section 30*f*. The material supply section 20*f* includes a hopper 21 and a communication path 22.

The hopper 21 stores pellets of shaping material. The hopper 21 is connected to the communication path 22 via an outlet port provided at a lower portion of the hopper 21. The communication path 22 supplies the pellets of shaping material in the hopper 21 to the shaping material production section 30*f*.

As the shaping material to be charged into the hopper 21, the above-mentioned materials can be used. These materials are charged into the material supply section 20*f* in a state of solid materials such as pellets and powders. In addition, as described above, into the material having thermoplastic properties to be charged into the hopper 21, pigments, metals, ceramics, or the like may be incorporated.

The shaping material production section 30*f* melts the shaping material supplied from the communication path 22 of the material supply section 20*f*. The shaping material production section 30*f* supplies the melted shaping material to the head section 60*f*. The shaping material production section 30*f* includes a screw case 31, a drive motor 32, a flat screw 40*f*, and a screw facing portion 50*f*.

Figure 31:
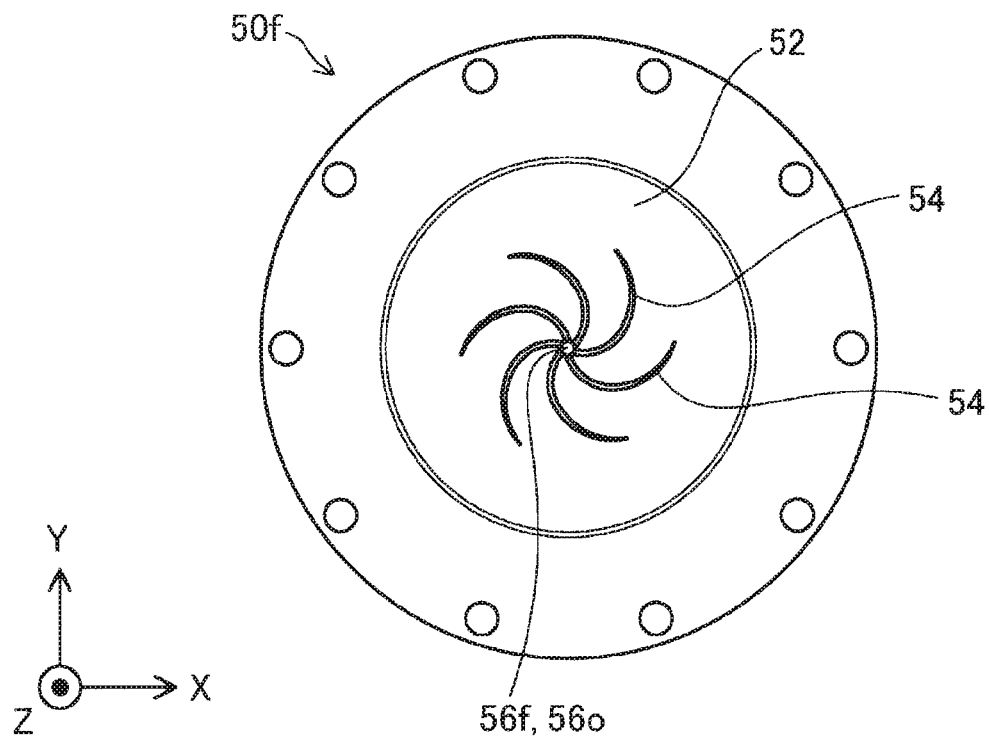
FIG. 31 is a schematic plan view showing a screw facing portion.

FIG. 31 is a schematic plan view showing the screw facing portion 50*f*. The screw facing portion 50*f* has a substantially disk-like shape (see also FIG. 30). In an outer shape of the screw facing portion 50*f*, a thickness of the disk is smaller than a diameter of the circle. The screw facing portion 50*f* includes a plurality of guide grooves 54, an outflow path 56*f*, and a heater 58.

The outflow path 56*f* is provided at the center of the circle of the substantially disk-like screw facing portion 50*f* so as to penetrate the screw facing portion 50*f* in a direction along the center axis direction of the disk. The outflow path 56*f* causes the melted shaping material to flow out to the flow path 65*f* in the head section 60*f*. The guide groove 54 is disposed on one surface 52 of the substantially disk-like screw facing portion 50*f*. The guide groove 54 is a groove extending to draw an arc in the surface 52 from an opening 56*o* of the outflow path 56*f* toward an outer periphery of the circle of the screw facing portion 50*f*. The melted shaping material is guided to the opening 56*o* of the outflow path 56*f* by the plurality of guide grooves 54. Hereinafter, the surface 52 on which the guide groove 54 and the opening 56*o* of the screw facing portion 50*f* are provided is also referred to as an "upper surface 52" of the screw facing portion 50*f*.

The heater 58 is disposed inside a part facing the groove portion 42 of the flat screw 40*f* in the screw facing portion 50*f* (see FIG. 30). More specifically, the heater 58 is provided at a position surrounding the outflow path 56*f*. The heater 58 is supplied with electric power from a power supply which is not shown, and generates heat. A function of the heater 58 will be described later.

The flat screw 40*f* has a substantially disc-like shape (see FIG. 30). In an outer shape of the flat screw 40*f*, a thickness of the disk is smaller than a diameter of the circle. The flat screw 40*f* is disposed so as to face the upper surface 52 of the screw facing portion 50*f*. The flat screw 40*f* includes a plurality of groove portions 42 on a surface 48 that is disposed in a direction facing the opening 56*o* of the screw facing portion 50*f*. Hereinafter, the surface 48 of the flat screw 40*f* disposed in a direction facing the opening 56*o* of the screw facing portion 50*f* is also referred to as a "lower surface 48" of the flat screw 40*f*.

Figure 32:
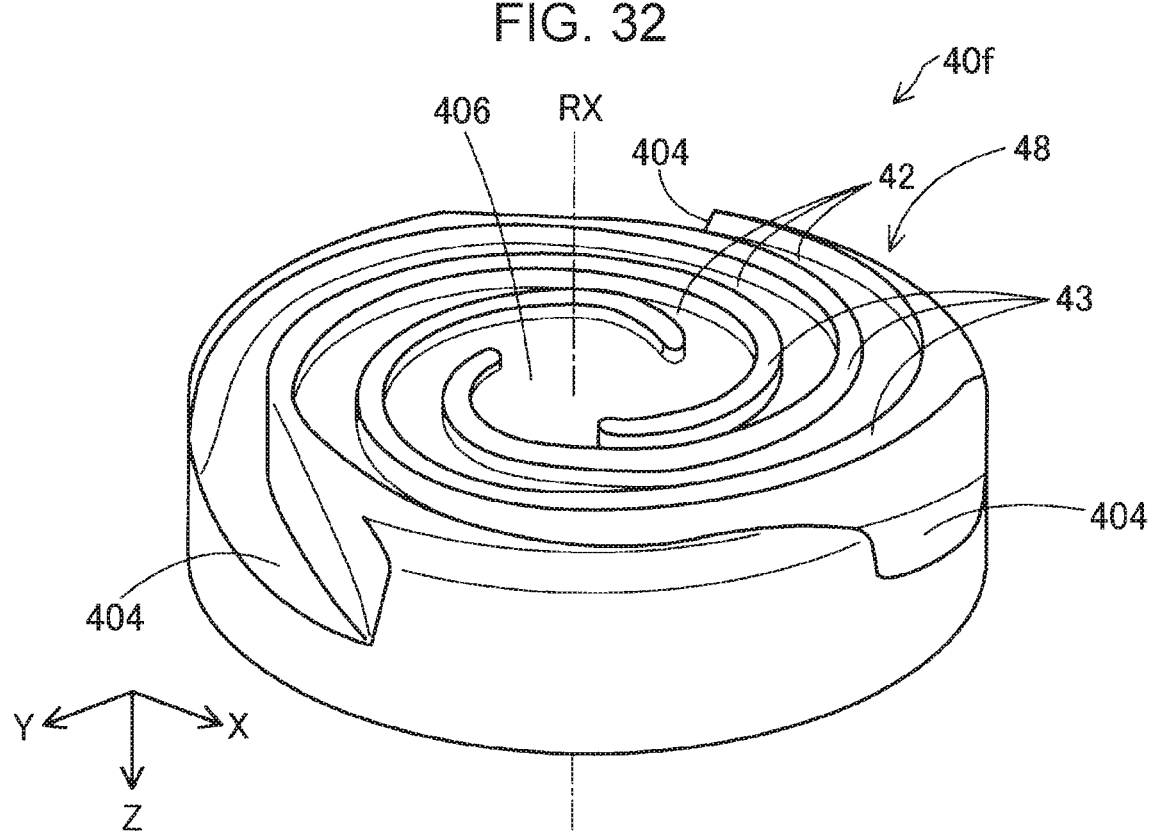
FIG. 32 is a schematic perspective view showing a configuration of a flat screw on a lower surface side.

FIG. 32 is a schematic perspective view showing a configuration of a lower surface 48 side of the flat screw 40*f*. In FIG. 32, the center axis of the disk of the flat screw 40*f* is indicated by a symbol RX. In the sixth embodiment, the center axis of the flat screw 40 coincides with a rotation axis thereof. One end 406 of the groove portion 42 is positioned at the center of the circle of the flat screw 40*f* and is connected to the opening 56*o* of the outflow path 56*f* of the screw facing portion 50*f* (see FIG. 30). One end 406 of the groove portion 42 is shared by the plurality of groove portions 42. The other end 404 of the groove portion 42 is an opening provided on an outer surface of the substantially disk-like flat screw 40*f*. A part of the groove portion 42 which connects the one end 406 and the other end 404 of the groove portion 42 to each other is spirally disposed in the lower surface 48 of the flat screw 40*f*. In an example shown in FIG. 32, three groove portions 42 are provided in the lower surface 48 of the flat screw 40*f*. The groove portion 42 provided in the lower surface 48 of the flat screw 40*f* forms a transport path for transporting the shaping material together with the upper surface 52 of the screw facing portion 50*f*.

The screw case 31 (see FIG. 30) covers the flat screw 40*f* together with the screw facing portion 50*f*. In the screw case 31, the communication path 22 of the material supply section 20*f* is disposed. The communication path 22 of the material supply section 20*f* is connected to the other end 404 of the groove portion 42 which is an opening provided on an outer surface of the flat screw 40*f* of the groove portion 42.

The drive motor 32 penetrates the screw case 31 and is connected to the flat screw 40*f*. The drive motor 32 is capable of rotating the substantially disk-like flat screw 40*f* about the center axis RX thereof in the screw case 31. A direction of the center axis RX of rotation of the flat screw 40*f* coincides with a direction of the Z axis.

In a case where the control section 300 performs control so that the flat screw 40*f* is rotated and the heater generates heat, the shaping material is processed as follows (see FIG. 30). That is, the solid shaping material supplied from the hopper 21 via the communication path 22 is introduced into the groove portion 42 from the other end 404 provided on the outer surface of the flat screw 40*f*. As the flat screw 40*f* rotates, the groove portion 42 allows the shaping material to be transported so that an angular position is changed with respect to the opening 56*o* while approaching the opening 56*o* of the screw facing portion 50*f*. Meanwhile, the shaping material in the groove portion 42 is heated and melted by the heater 58 in the screw facing portion 50*f*. The melted shaping material is guided to the guide groove 54 and supplied to the opening 56*o*. Thereafter, the shaping material is supplied from the outflow path 56*f* to the head section 60*f*.

While the solid and melted shaping material is transported in the groove portion 42 toward the opening 56*o* of the outflow path 56*f* of the screw facing portion 50*f*, gas such as air existing between the solid shaping materials is sent out to an outside from the other end 404 of the groove portion 42.

The head section 60*f* discharges the shaping material supplied from the shaping material production section 30*f* to the shaping stage section 200 (see FIG. 30). A direction in which the shaping material is discharged from the head section 60*f* coincides with a − side direction in the Z axis direction. The head section 60*f* has a nozzle 61*f*, a flow path 65*f*, and a discharge control mechanism 70*f*.

The flow path 65*f* is a flow path that connects the outflow path 56*f* of the shaping material production section 30*f* and the nozzle 61*f* to each other (see FIG. 30). The shaping material melted by the shaping material production section 30*f* is supplied to the nozzle 61*f* via the flow path 65*f*. The flow path 65*f* includes a downstream part 651, an upstream part 652, and a connection part 653.

The downstream part 651 is connected to the nozzle 61*f*. The downstream part 651 is a partial flow path that extends from the nozzle 61*f* toward a side (+ side in the Z axis direction) opposite to a side of the downstream end of the nozzle 61*f* with the opening 62*f*. The upstream part 652 is a partial flow path connected at an angle of 45 degrees with respect to an extending direction of the downstream part 651. The connection part 653 is a partial flow path that is connected at an angle of 45 degrees with respect to the extending direction of the upstream part 652 and extends from the connection part in a direction parallel to the downstream part 651 (in a direction of − side of the Z axis direction). The connection part 653 is connected to the outflow path 56*f* of the shaping material production section 30*f*.

The nozzle 61*f* discharges the melted shaping material from the opening 62*f*, which is an opening at a tip, toward the shaping stage section 200.

Figure 33:
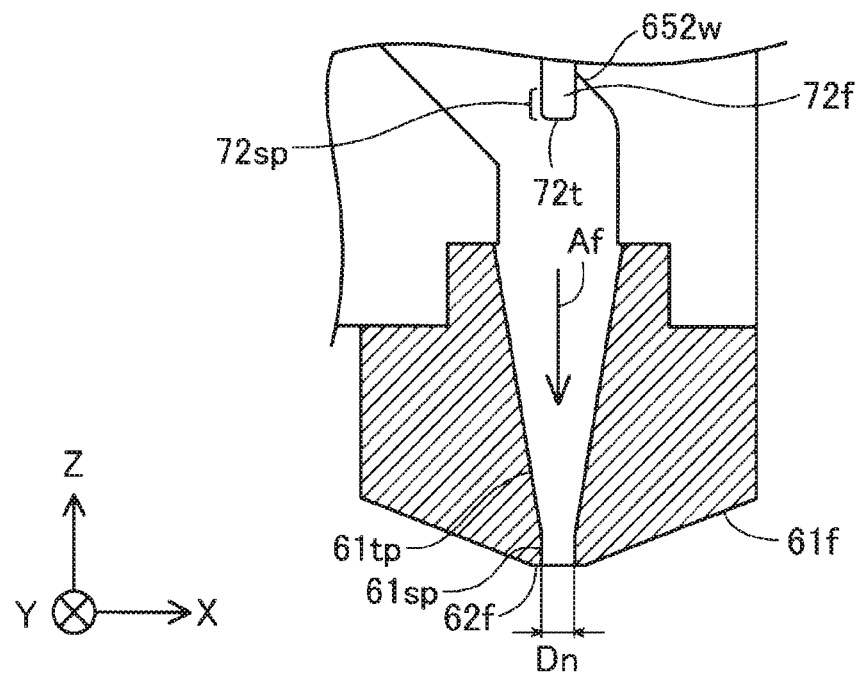
FIG. 33 is a cross-sectional view showing a structure of a nozzle.

FIG. 33 is a cross-sectional view showing a structure of the nozzle 61*f*. The nozzle 61*f* has therein a first partial flow path 61*tp* and a second partial flow path 61*sp* as flow paths for transporting the shaping material. The first partial flow path 61*tp* has a tapered (funnel-like) shape in which a cross-sectional shape of an internal space becomes smaller as it goes downstream in a transport direction Af of the shaping material. The second partial flow path 61*sp* is disposed on a downstream side of the first partial flow path 61*tp* and is connected to the first partial flow path 61*tp*. In the second partial flow path 61*sp*, the cross-sectional shape of the internal space is constant in the transport direction Af of the shaping material. A downstream end of the second partial flow path 61*sp* is the opening 62*f* of the nozzle 61*f*. The opening 62*f* has a circular shape having a hole diameter Dn. In addition, in the first partial flow path 61*tp* and the second partial flow path 61*sp*, a shape in a cross section perpendicular to the Z axis direction is a circular shape.

The melted shaping material is heated to a temperature equal to or higher than a glass transition point thereof and is injected from the nozzle 61*f* in a melted state. For example, the glass transition point of an ABS resin is about 120° C. In a case where the ABS resin is adopted as a main material of the shaping material, the ABS resin is heated so as to be about 200° C. at the time of being injected from the nozzle 61*f*.

The discharge control mechanism 70*f* is a mechanism for performing initiation and stopping of discharge of the shaping material from the nozzle 61*f* and control of a discharge amount (see FIG. 30). The discharge control mechanism 70*f* includes a closure pin 72*f*, a drive portion 73, and a connection rod 74.

Figure 34:
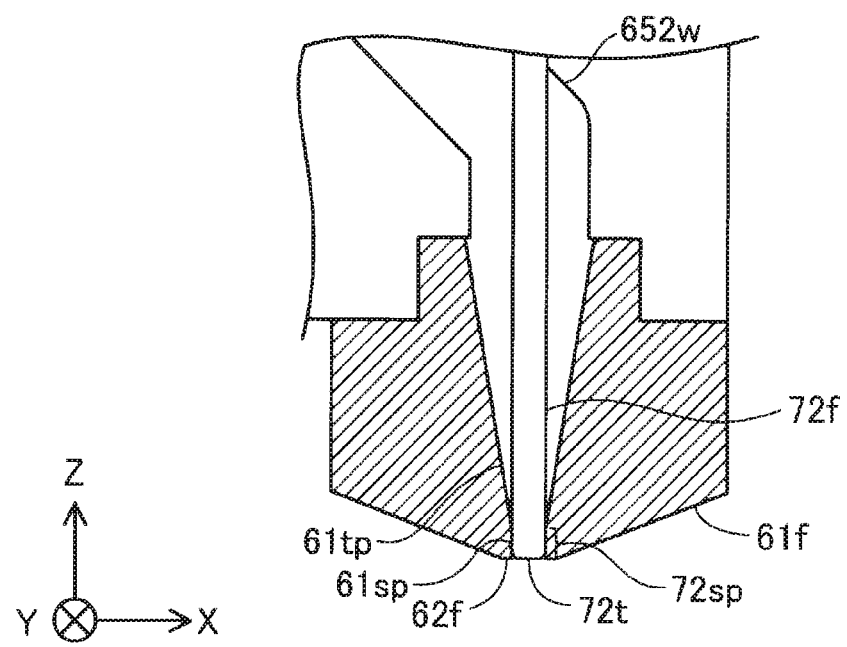
FIG. 34 is a cross-sectional view showing a state where a closure pin closes the nozzle.

FIG. 34 is a cross-sectional view showing a state where the closure pin 72*f* closes the nozzle 61*f*. A part of the closure pin 72*f* is a member that is disposed in the flow path 65*f* and the nozzle 61*f* and is capable of closing the nozzle 61*f* (see also FIG. 30). The closure pin 72*f* has a substantially cylindrical shape. An outer diameter of the closure pin 72*f* is slightly smaller than the hole diameter Dn of the opening 62*f* of the nozzle 61*f* (equal to an inner diameter of the second partial flow path 61*sp*). The closure pin 72*f* penetrates a wall portion 652*w* which is a wall portion constituting the upstream part 652 and is positioned on a side (Z axis direction+side) opposite to the opening 62*f* of the nozzle 61*f* (see also FIG. 30).

The upstream part 652 and the downstream part 651 of the flow path 65*f* are connected to each other at an angle of 45 degrees and the connection part 653 and the upstream part 652 of the flow path 65*f* are connected to each other at an angle of 45 degrees. Thus, it is possible to dispose the connection part 653 and the downstream part 651 in a shifted manner in the X-axis direction (see FIG. 30). In this manner, it is possible to dispose the closure pin 72*f* as described above. In such a configuration, it is possible to connect the drive portion 73 and the closure pin 72*f* in the flow path 65*f* to each other while disposing the drive portion 73 outside the flow path 65*f*. A connection angle between the upstream part 652 and the downstream part 651 of the flow path 65*f* and a connection angle between the connection part 653 and the upstream part 652 are 45 degrees. Thus, the following technical effect can be obtained. That is, it is possible to make resistance at the connection part between the upstream part 652 and the downstream part 651 smaller than a mode in which the upstream part 652 and the downstream part 651 are connected to each other at 90 degrees while disposing the upstream part 652 of the flow path 65*f* so as to avoid the drive portion 73.

The drive portion 73 displaces the closure pin 72*f* to open and close the nozzle 61*f*. The connection rod 74 is a member for connecting a part of the closure pin 72*f* positioned outside the flow path 65*f* and the drive portion 73. In FIG. 30, in order to facilitate understanding of the technology, the drive portion 73 and the connection rod 74 are shown separately from each other. By moving the closure pin 72*f* in the axial direction by the drive portion 73, it is possible to close an end surface of the opening 62*f* of the nozzle 61*f* with the closure pin 72*f*. More specifically, the second partial flow path 61*sp* of the nozzle 61*f* is occupied up to the opening 62*f* by a tip part 72*sp* of the closure pin 72*f* and closed.

In such a configuration, in a case where disposition of the shaping material on a certain part on the shaping stage section 200 is ended, by causing the closure pin 72*f* to occupy an inside of the second partial flow path 61*sp* of the nozzle 61*f*, it is possible to end supply of the shaping material without leaving the shaping material connected to the shaping material outside the nozzle 61*f* in the second partial flow path 61*sp* of the nozzle 61*f*. Therefore, there is a low possibility of occurrence of so-called "stringing" that the shaping material remaining in the nozzle 61*f* and the shaping material already disposed outside the nozzle 61*f* are connected to each other in an elongated manner and then separated from each other. Therefore, in a case of forming an object having a three-dimensional shape, even in a case where supply of the shaping material is temporarily stopped and resumed from another location, it is possible to form an object having a three-dimensional shape with a highly accurate shape.

Further, in a time period immediately before the supply of the shaping material is stopped, the shaping material having a discharge amount corresponding to a displacement speed of the tip part 72*sp* of the closure pin 72*f* is pushed out of the second partial flow path 61*sp* of the nozzle 61*f*. More specifically, a shaping material having a volume equal to [cross-sectional area of second partial flow path 61*sp* of nozzle 61*f*]×[movement speed of tip part 72*sp* of closure pin 72*f*] per unit time is pushed out of the opening 62*f* of the nozzle 61*f*. Therefore, it is possible to appropriately control a shape and a size of a tail end of the shaping material supplied to an outside of the nozzle.

Figure 35:
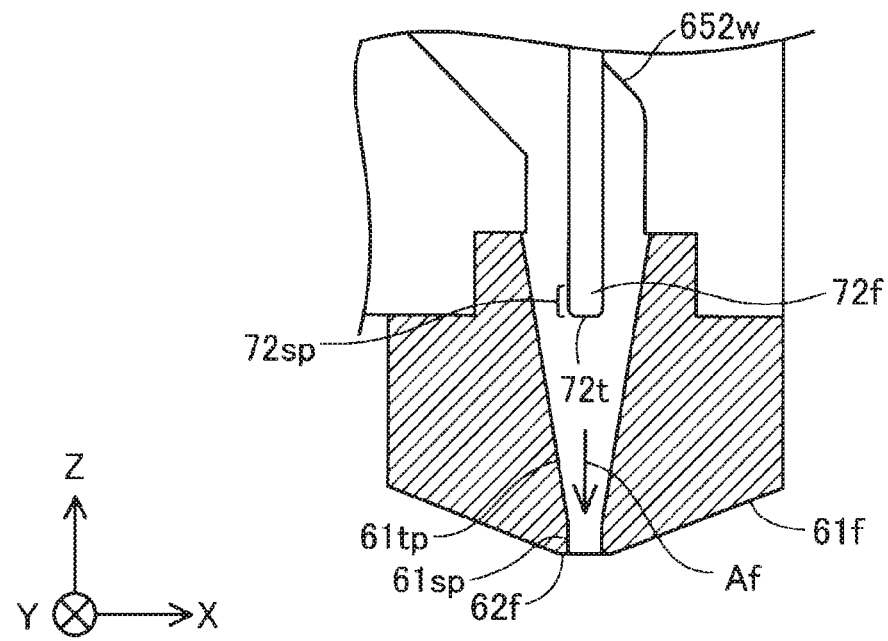
FIG. 35 is a cross-sectional view showing a state where a tip of the closure pin is disposed in a first partial flow path of the nozzle.

FIG. 35 is a cross-sectional view showing a state where a tip 72*t* of the closure pin 72*f* is disposed in a first partial flow path 61*tp* of the nozzle 61*f*. The drive portion 73 is capable of displacing the tip 72*t* of the closure pin 72*f* along the transport direction Af (Z axis direction) of the shaping material in the first partial flow path 61*tp* which is a tapered part in the nozzle 61*f*.

By displacing the tip 72*t* of the closure pin 72*f* in the first partial flow path 61*tp* which is a tapered part, it is possible to change resistance of flow of the shaping material in the first partial flow path 61*tp*. As a result, by understanding, in advance, a relationship between a position of the tip 72*t* of the closure pin 72*f* in the first partial flow path 61*tp* and a supply amount of the shaping material per unit time from the nozzle 61*f*, and appropriately setting a position of the tip 72*t*, it is possible to control the supply amount of the shaping material per unit time from the nozzle 61*f*.

The shaping stage section 200 is disposed at a position facing the nozzle 61*f* of the head section 60*f* (see FIG. 30). The shaping stage section 200 receives the shaping material discharged from the nozzle 61*f*. The shaping stage section 200 includes a table 210, a shaping pedestal 220 placed on the table 210, and a movement mechanism 230 for displacing the shaping pedestal 220.

The shaping pedestal 220 is a flat plate-like structure for receiving the shaping material discharged from the nozzle 61*f*. The movement mechanism 230 is constituted by a three-axis positioner capable of moving the shaping pedestal 220 in the X direction, the Y direction, and the Z direction by three motors. In FIG. 30, a motor for moving the shaping pedestal 220 is indicated by M. Under control of the control section 300, the shaping stage section 200 is capable of changing a relative position between the nozzle 61*f* and the shaping pedestal 220.

The control section 300 controls the discharge unit 110*f* and the shaping stage section 200 (see FIG. 30). The control section 300 can be realized by a computer including a processor such as a CPU, a main memory, and a nonvolatile memory. In the nonvolatile memory in the control section 300, a computer program for controlling the three-dimensional shaping apparatus 100*f* is stored. Due to loading of the computer program stored in the nonvolatile memory on the main memory and execution thereof, the processor controls the discharge unit 110*f* and the shaping stage section 200, thereby shaping a three-dimensional shaped object.

Figure 36:
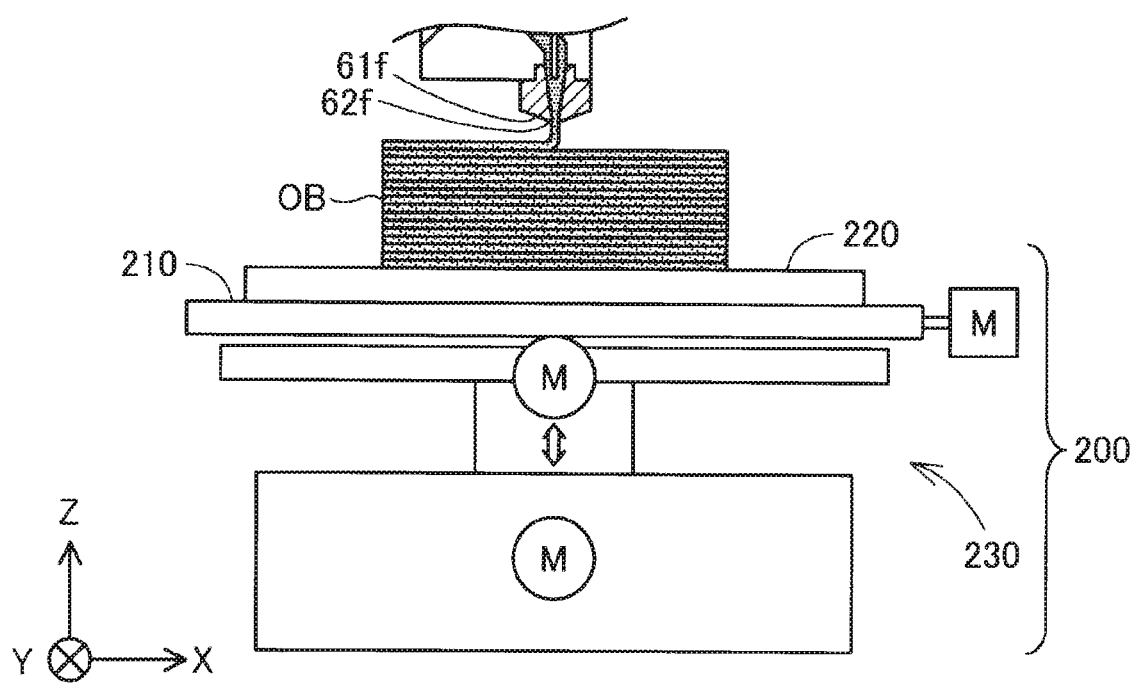
FIG. 36 is an explanatory diagram showing a state where a three-dimensional shaped object is constituted by a shaping material discharged from the nozzle of the three-dimensional shaping apparatus.

FIG. 36 is an explanatory diagram showing a state where a three-dimensional shaped object OB is constituted by a shaping material discharged from the nozzle 61*f* of the three-dimensional shaping apparatus 100*f*. The control section 300 controls the discharge unit 110*f* and the shaping stage section 200 depending on a shaping data, thereby shaping a three-dimensional shaped object OB. More specifically, the control section 300 discharges the shaping material from the nozzle 61*f* while moving the shaping pedestal 220 of the shaping stage section 200 in the X direction and the Y direction, so that the shaping material is disposed at a predetermined position of XY coordinates on the shaping pedestal 220. In a case where a process of disposing the shaping material on one virtual XY plane is completed, the control section 300 moves the shaping pedestal 220 of the shaping stage section 200 in a − side direction in the Z axis direction by a predetermined amount, and performs a process of disposing the shaping material on a virtual XY plane. At that time, a newly disposed shaping material is bonded to the shaping material that has been disposed until that time. By repeating such a process, the shaping material is disposed in a three-dimensional shape. The shaping material disposed in this way is hardened to form a three-dimensional shaped object OB having a desired shape.

Figure 37:
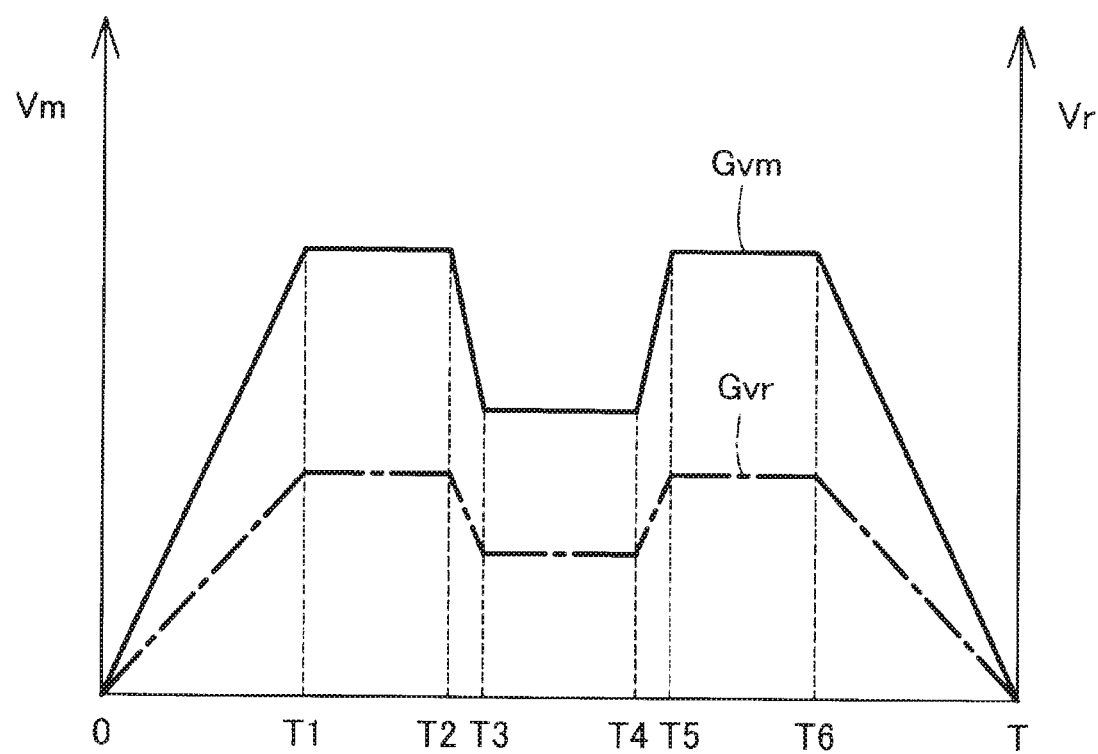
FIG. 37 is a graph showing a transport speed of a shaping pedestal and a supply speed of the shaping material supplied from the discharge unit along with time.

FIG. 37 is a graph showing a transport speed Vm of the shaping pedestal 220 and a supply speed Vr of the shaping material supplied from the discharge unit 110*f* along with time T. A graph Gvm shows a change in the transport speed Vm of the shaping pedestal 220. The transport speed Vm is obtained by the square root of a sum of the square of a transport speed in the X direction and the square of a transport speed in the Y direction. A graph Gvr shows the supply speed Vr of the shaping material supplied from the discharge unit 110*f*. The supply speed Vr of the shaping material is a supply amount (volume) of shaping material per unit time.

The control section 300 is capable of synchronizing the supply speed Vr for supplying the shaping material from the discharge unit 110*f* with the transport speed Vm of the shaping pedestal 220 by the movement mechanism 230. For example, in a case where the transport speed Vm of the shaping pedestal 220 is reduced by 30% from a time T2 to a time T3, the control section 300 similarly reduces the supply speed Vr of the shaping material by 30%. In a case where the transport speed Vm of the shaping pedestal 220 increases from a time T4 to a time T5 and returns to the transport speed Vm from the time T1 to the time T2, the control section 300 similarly increases the supply speed Vr of the shaping material. In addition, the control section 300 causes a rate of change of the supply speed Vr of the shaping material to coincide with a rate of change of the transport speed Vm of the shaping pedestal 220. In a case where the supply speed Vr of the shaping material is constant, the transport speed Vm of the shaping pedestal 220 is also constant (see times T1 to T2, T3 to T4, and T5 to T6).

Meanwhile, "to synchronize" the supply speed of the shaping material and the transport speed of the apparatus means that for a certain time period, the supply speed of the shaping material and the transport speed of the apparatus are controlled so that a change in the supply speed of the shaping material represented along the time axis direction is caused to coincide with a change in the transport speed of the apparatus represented along the time axis direction by increase or decrease of at least one thereof.

In such a configuration, it is possible to dispose a certain amount of shaping material at each position while changing a transport speed of the shaping pedestal 220, in other words, a disposition speed of the shaping material. For example, in a place where the shaping material is disposed in a linear shape, the control section 300 disposes the shaping material while transporting the shaping pedestal 220 at a certain speed V1 (see times T1 to T2 and T5 to T6). On the contrary, in a place where the shaping material is disposed in a curved disposition with a curvature that is equal to or greater than a certain degree, the control section 300 disposes the shaping material while transporting the shaping pedestal 220 at a speed V2 that is 30% lower than the speed V1 (see times T3 to T4). At that time, the control section 300 also reduces the supply speed Vr of the shaping material by 30%. By performing such a process, it is possible to dispose a certain amount of shaping material at each position while improving accuracy of disposition of the shaping material at each position.

In this embodiment, the discharge unit 110f for supplying the melted shaping material to the head section 60f is also referred to as a "shaping material supply device". The opening 62f at the downstream end of the nozzle 61f is also referred to as a "first opening". The opening 56o of the outflow path 56f is also referred to as a "second opening". The closure pin 72f is also referred to as a "closure member". The heater 58 is also referred to as a "first heating portion". The tip part 72sp of the closure pin 72f which is inserted into the second partial flow path 61sp and closes the second partial flow path 61sp is also referred to as a "first closure portion".

Seventh Embodiment

Figure 38:
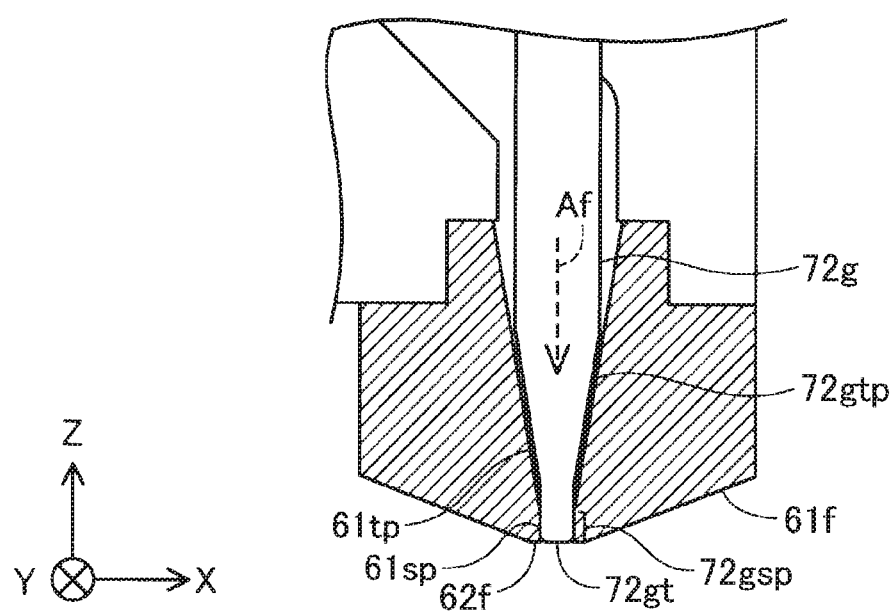
FIG. 38 is a view showing a shape of a closure pin in a three-dimensional shaping apparatus according to a seventh embodiment.

FIG. 38 is a view showing a shape of a closure pin 72g in a three-dimensional shaping apparatus according to a seventh embodiment. A configuration other than the closure pin 72g of the three-dimensional shaping apparatus of the seventh embodiment is the same as that of the three-dimensional shaping apparatus 100f of the sixth embodiment. The closure pin 72g has a tapered part 72gtp and a tip part 72gsp.

The tapered part 72gtp has a tapered (conical side surface-like) outer shape in which a cross-sectional shape thereof becomes smaller as it goes downstream in a transport direction Af of the shaping material. A taper angle of the tapered part 72gtp coincides with a taper angle of the first partial flow path 61tp in the flow path of the nozzle 61f. The tip part 72gsp of the closure pin 72g is disposed on a downstream side with respect to the tapered part 72gtp. The tip part 72gsp has a constant cross-sectional shape with respect to the transport direction Af of the shaping material. An outer diameter of the tip part 72gsp of the closure pin 72f is slightly smaller than the hole diameter Dn of the opening 62f of the nozzle 61f.

By pushing out the closure pin 72g toward the opening 62f in the nozzle 61f, the second partial flow path 61sp of the nozzle 61f is occupied up to the opening 62f by the tip part 72gsp of the closure pin 72g and closed. A position of a surface of the tip 72gt of the closure pin 72g coincides with a surface defined by the opening 62f. In addition, a part of the first partial flow path 61tp of the nozzle 61f on a downstream side is occupied by the tapered part 72gtp of the closure pin 72g and closed. By adopting such a configuration, it is possible to decrease a possibility of occurrence of so-called "stringing" that the shaping material remaining in the nozzle 61f and the shaping material already disposed outside the nozzle 61f are connected to each other in an elongated manner and then separated from each other.

Figure 39:
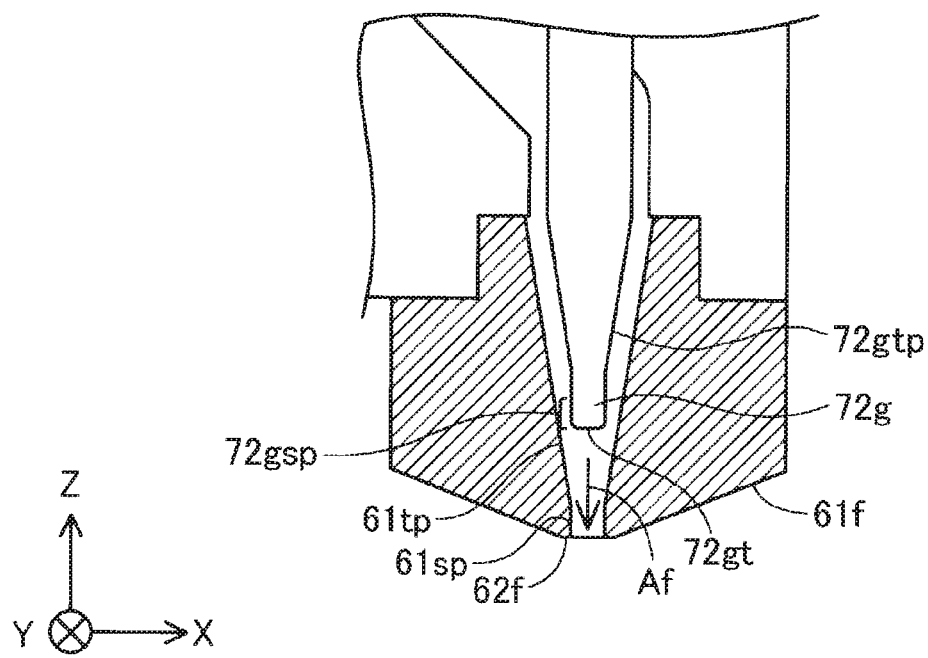
FIG. 39 is a cross-sectional view showing a state where a tapered part of the closure pin is disposed in the first partial flow path of the nozzle.

FIG. 39 is a cross-sectional view showing a state where the tapered part 72gtp of the closure pin 72g is disposed in the first partial flow path 61tp of the nozzle 61f. In the first partial flow path 61tp which is a tapered part in the nozzle 61f, the drive portion 73 is capable of displacing the closure pin 72f along the transport direction Af (equal to a − side direction in the Z axis direction) of the shaping material.

By displacing the tapered part 72gtp of the closure pin 72f within the first partial flow path 61tp which is a tapered part, it is possible to change a size of an annular cross section (cross-sectional area) of a flow path around the tapered part 72gtp in the first partial flow path 61tp from the maximum value (in a case where the closure pin 72f is farthest from the opening 62f) to 0. As a result, it is possible to quantitatively control resistance of flow of the shaping material in the first partial flow path 61tp. Therefore, by such a process, it is possible to easily control a supply amount of the shaping material per unit time from the nozzle 61f.

The tapered part 72gtp of the closure pin 72g in this embodiment is also referred to as a "second closure portion".

Eighth Embodiment

Figure 40:
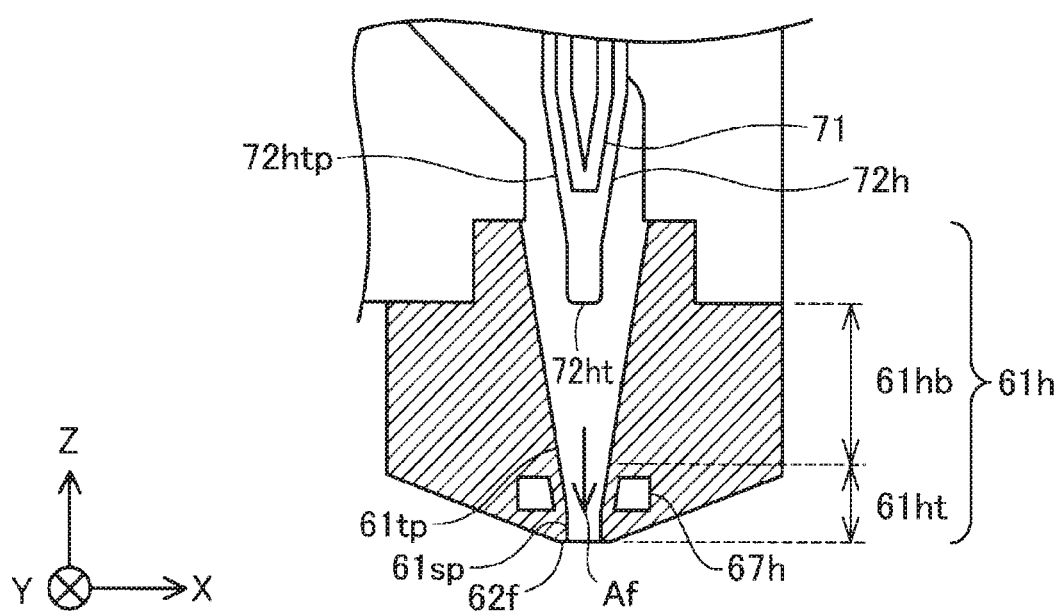
FIG. 40 is a cross-sectional view showing structures of a nozzle and a closure pin in a three-dimensional shaping apparatus according to an eighth embodiment.

FIG. 40 is a cross-sectional view showing structures of a nozzle 61h and a closure pin 72h in a three-dimensional shaping apparatus according to an eighth embodiment. A configuration other than the nozzle 61h and the closure pin 72h of the three-dimensional shaping apparatus of the eighth embodiment are the same as that of the three-dimensional shaping apparatus of the seventh embodiment (see FIGS. 38 and 39).

The closure pin 72h includes a heating portion 71 inside a part disposed inside the nozzle 61h. The heating portion 71 is not disposed at a part (see the nozzle 61f in FIG. 30) which is always positioned outside the nozzle 61h in the closure pin 72h. The heating portion 71 is a part of an electric circuit connected to a power supply which is not shown. An electric power is supplied from the power supply to the heating portion 71, and thus heat is generated by electric resistance.

Due to the closure pin 72h, resistance in a case of flowing the melted shaping material increases in the first partial flow path 61tp of a flow path in which a space through which the shaping material flows. In addition, in a mode in which the closure pin does not include a heating portion, since the shaping material is deprived of heat by the closure pin, fluidity of the shaping material may decrease. However, in a configuration as described above, the shaping material around the closure pin 72h positioned in the flow path is heated by the heating portion 71, and fluidity is increased. Therefore, clogging of the shaping material is unlikely to occur even in a part where a space through which the shaping material flows becomes narrowed due to the closure pin 72h.

The nozzle 61h includes the first partial flow path 61tp and the second partial flow path 61sp in the flow path, and includes a cooling portion 67h at a position surrounding a connection site between the first partial flow path 61tp and the second partial flow path 61sp. The cooling portion 67h flows a cooling medium between radiators which are not shown, so that the tip portion 61ht of the nozzle 61h can be set to a relatively lower temperature than a body portion 61hb positioned on an upstream side of the tip portion 61ht. The tip portion 61ht of the nozzle 61h is a part of the nozzle 61h including the opening 62f. The body portion 61hb of the nozzle 61h is a part positioned on an upstream side of the tip portion 61ht in the transport direction Af of the shaping material.

In such a configuration, it is possible to control a temperature of the shaping material in the tip portion 61ht of the nozzle 61h by cooling the tip portion 61ht of the nozzle 61h with the cooling portion 67h. As a result, it is possible to control viscosity of the shaping material pushed out of an inside of the nozzle 61h and adhesiveness thereof to an inner surface of the nozzle 61h. Therefore, in a case where disposition of the shaping material at a certain part on the shaping stage section 200 is ended, it is possible to effectively prevent a situation where the shaping material adhering to the inside of the nozzle 61h and the shaping material already disposed outside the nozzle 61h are connected in an elongated manner and then separated from each other. Therefore, it is possible to control a shape of a tail end of the shaping material with higher accuracy.

The heating portion 71 in this embodiment is also referred to as a "second heating portion".

Ninth Embodiment

Figure 41:
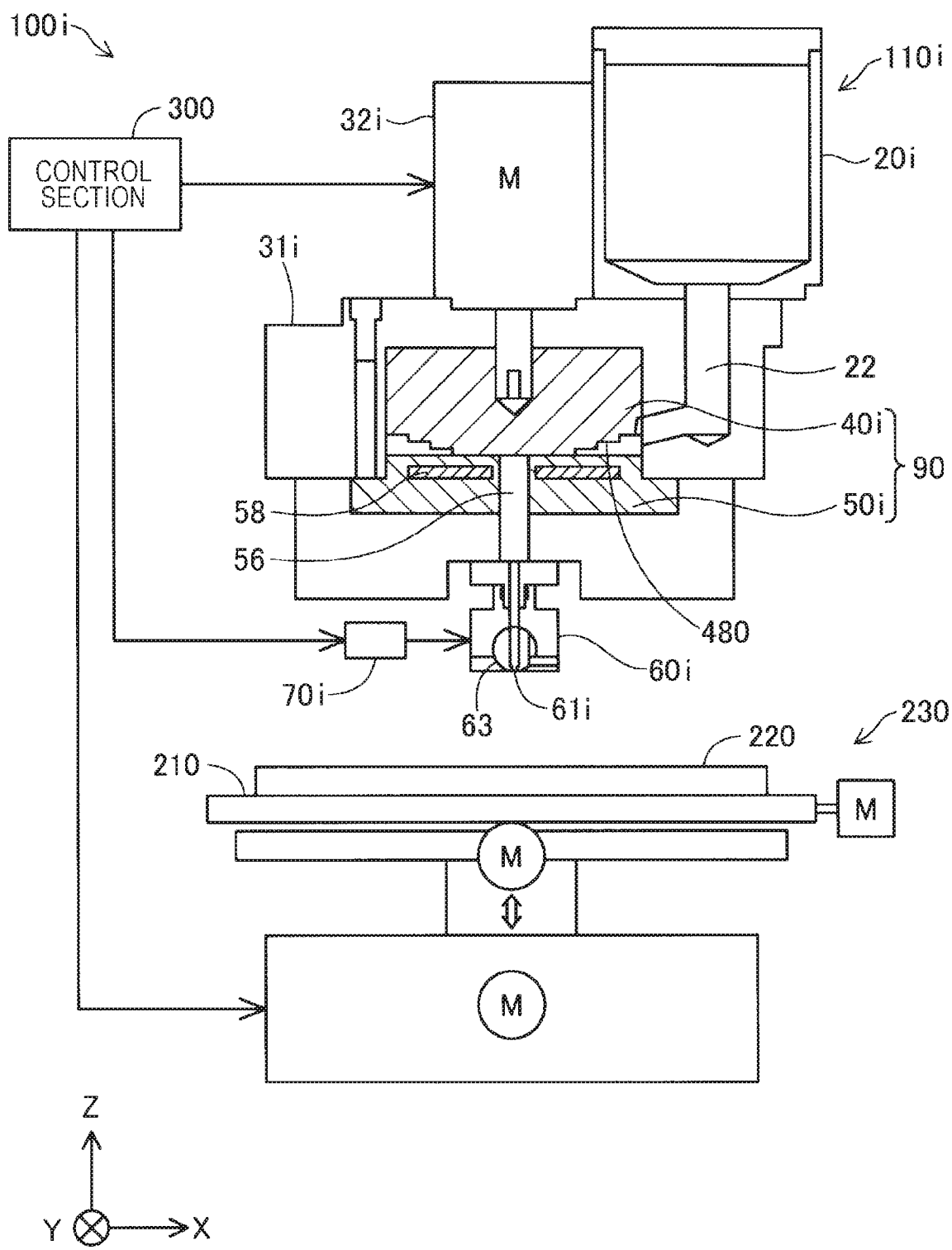
FIG. 41 is a conceptual diagram of a three-dimensional shaping apparatus.

FIG. 41 is a conceptual diagram of a three-dimensional shaping apparatus 100i according to a ninth embodiment. The three-dimensional shaping apparatus 100i includes an injection unit 110i, a movement mechanism 230, and a control section 300.

The injection unit 110i has a drive motor 32i, a plasticization section 90, and an injection section 60i. The plasticization section 90 has a flat screw 40i and a screw facing portion 50i.

The flat screw 40i is housed in the screw case 31i, and is rotated by the drive motor 32i. The flat screw 40i has a scroll groove forming surface 480 on which the scroll groove 420 (see FIG. 42) is formed. The screw facing portion 50i faces the scroll groove forming surface 480, and has a communication hole 56 formed at the center. The screw facing portion 50i has a heater 58 therein.

The plasticization section 90 plasticizes the material supplied between the flat screw 40i and the screw facing portion 50i due to rotation of the flat screw 40i and heating by the heater 58, and converts it into a shaping material. "Plasticization" means that the material is heated and melted. The shaping material is supplied to the injection section 60i from the communication hole 56. The injection section 60i injects the shaping material from the injection port 61i provided at a tip of the injection section 60i toward the shaping pedestal 220 provided in the movement mechanism 230. The injection section 60i includes a rotating body 63 for stopping injection of the shaping material. The rotating body 63 is driven by an actuator 70i such as a rotary air cylinder or an electric motor. Details of the rotating body 63 will be described later.

A material is supplied from the hopper 20i to the plasticization section 90 via the communication path 22. Into the hopper 20i, a material having thermoplastic properties is charged. As the material, the above-mentioned materials can be used. In addition, as a shape of the material, a solid material such as pellets or powder can be used. In addition, the material having thermoplastic properties may be a composition containing a material having thermoplastic properties and other components.

The movement mechanism 230 is a three-axis positioner capable of moving the shaping pedestal 220 placed on the table 210 in three directions of the X direction, the Y direction, and the Z direction. The movement mechanism 230 has a function of changing a relative positional relationship between the injection section 60i and the shaping pedestal 220. By changing the relative positional relationship between the injection section 60i and the shaping pedestal 220 by using the movement mechanism 230, it is possible to manufacture a three-dimensional shaped object having a predetermined shape. In this embodiment, the movement mechanism 230 moves the shaping pedestal 220 in a three-dimensional manner. However, as the movement mechanism 230, a mechanism for moving the injection section 60i (that is, the injection unit 110i) in a three-dimensional manner may be adopted. Alternatively, a movement mechanism may be adopted by which one of the injection section 60i (that is, the injection unit 110i) and the shaping pedestal 220 is moved in one axis direction or two axial directions and the other is moved in the remaining axial direction.

The control section 300 performs control of the drive motor 32i, the heater 58, the actuator 70i, and the movement mechanism 230. The control section 300 is constituted by, for example, a computer including a CPU and a memory. The CPU controls the three-dimensional shaping apparatus 100i by executing a computer program stored in the memory. The computer program may be recorded on a non-transitory tangible recording medium.

Figure 42:
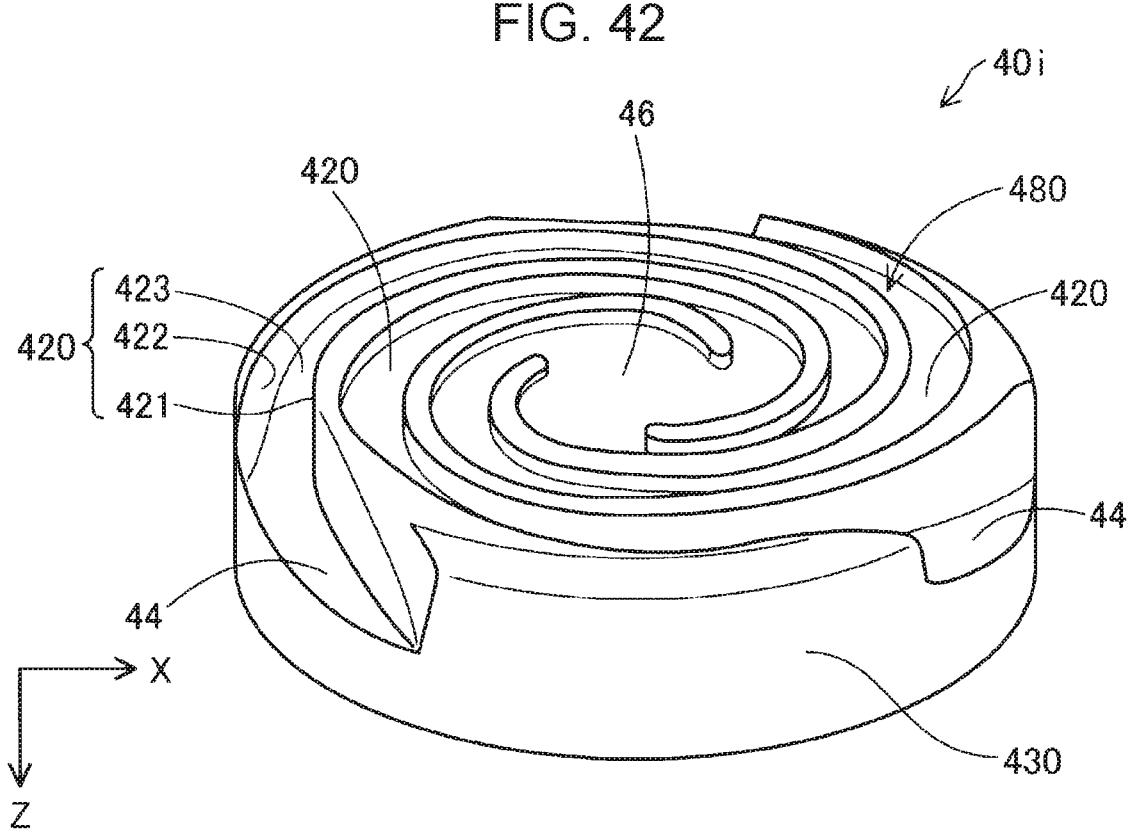
FIG. 42 is a perspective view of a flat screw.

FIG. 42 is a perspective view of the flat screw 40i. The flat screw 40i is a substantially cylindrical screw of which a height in the axial direction is smaller than a diameter thereof. The flat screw 40i has a plurality of scroll grooves 420 on a surface facing the screw facing portion 50i (FIG. 41). The surface on which the scroll groove 420 is formed is referred to as a "scroll groove forming surface 480". The scroll groove 420 is formed in a swirl shape or a spiral shape from an outer periphery of the flat screw 40i toward a central portion 46 of the scroll groove forming surface 480. On a side surface 430 of the flat screw 40i, a plurality of material inlet ports 44 for receiving a material is formed between the flat screw 40i and the screw facing portion 50i. The material inlet port 44 is continuous with the scroll groove 420. The material is supplied to the material inlet port 44 from the hopper 20i via the communication path 22.

The scroll groove 420 is defined by an inner wall 421 positioned radially inward, an outer wall 422 positioned radially outward, and a bottom wall 423. The inner wall 421 and the outer wall 422 are set as the respective shapes, for example, on a basis of an involute curve based on a circle concentric with a rotation center of the flat screw 40i. The material supplied into the scroll groove 420 is guided from an outer wall 422 side toward an inner wall 421 side as the flat screw 40i rotates. In addition, in a case where the flat screw 40i rotates, the material is heated by the heater 58 while being kneaded between the scroll groove 420 and the screw facing portion 50i, so that the material is plasticized and converted into a shaping material.

Figure 43:
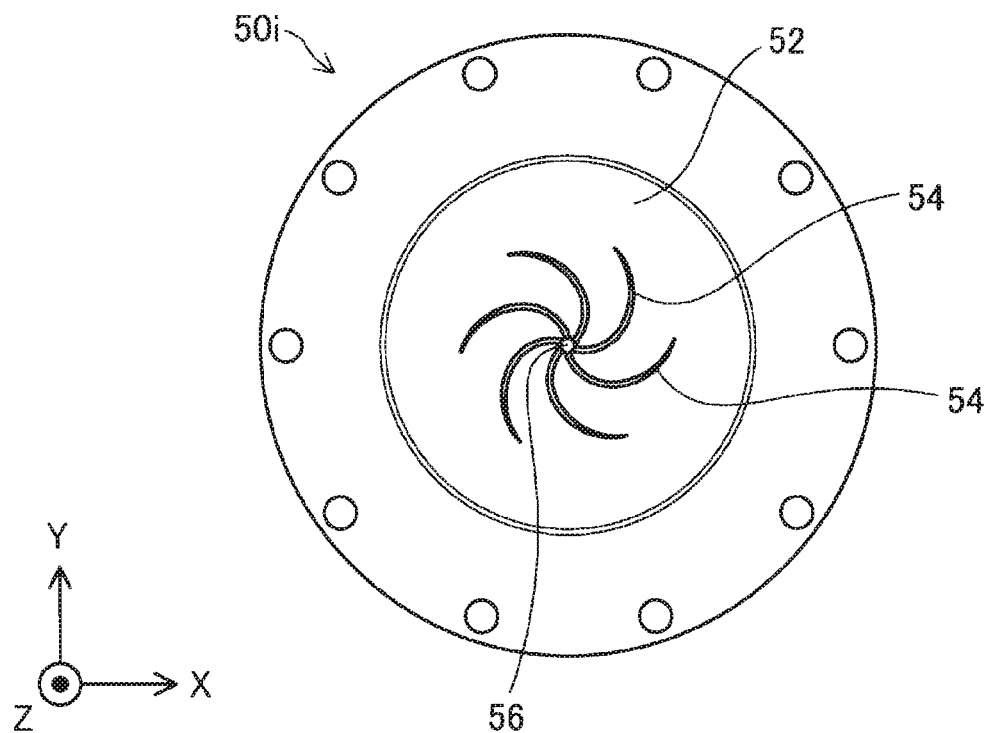
FIG. 43 is a plan view of the screw facing portion.

FIG. 43 is a plan view of the screw facing portion 50i. The screw facing portion 50i has a screw facing surface 52 facing the scroll groove forming surface 480 of the flat screw 40i. On the screw facing surface 52, a plurality of guide grooves 54 formed in a swirl shape or a spiral shape is formed. At the center of the screw facing surface 52, a communication hole 56 for supplying shaping material to the injection section 60i is formed. The plurality of guide grooves 54 has a function of guiding the shaping material to the communication hole 56. As shown in FIG. 41, the heater 58 for heating the material is embedded in the screw facing portion 50i.

Figure 44:
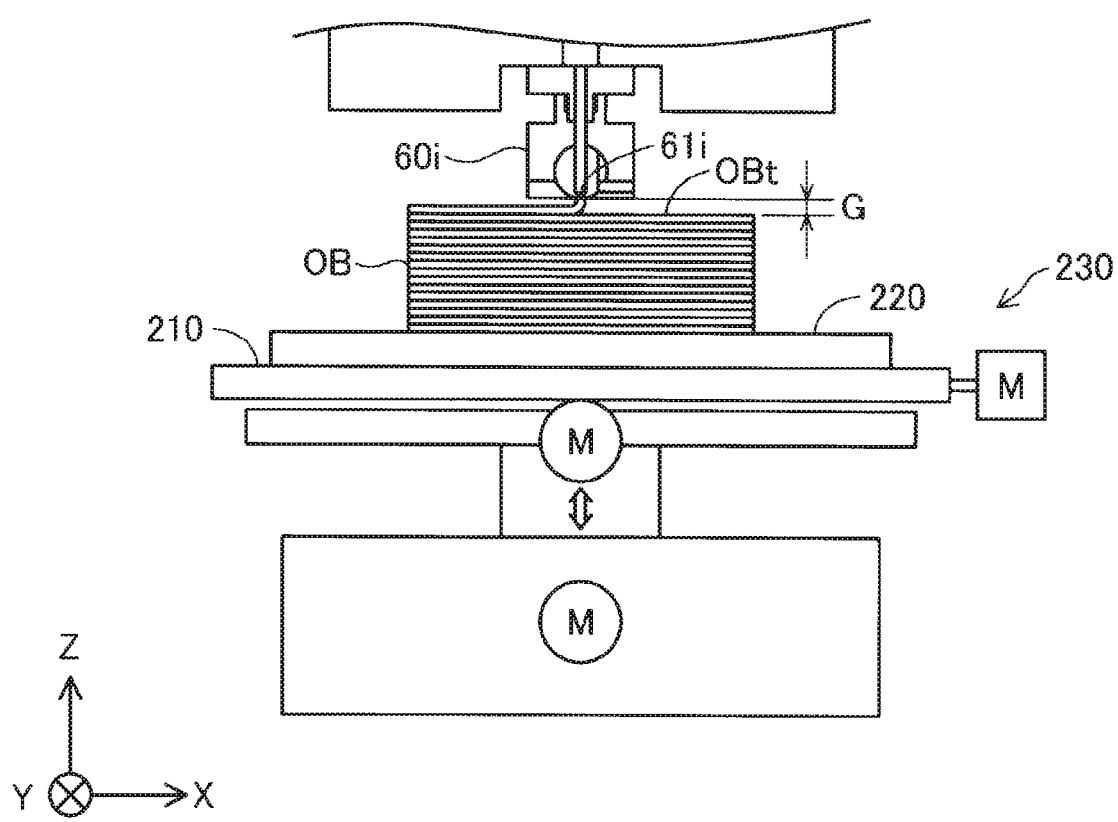
FIG. 44 is an explanatory diagram showing a positional relationship between a three-dimensional shaped object and an injection section.

FIG. 44 is an explanatory diagram showing a positional relationship between a three-dimensional shaped object OB and an injection section 60i. On the shaping pedestal 220, a three-dimensional shaped object OB being manufactured is placed. A gap G is held between the injection port 61i provided in the injection section 60i and an upper surface OBt of the three-dimensional shaped object OB. Here, "the upper surface OBt of the three-dimensional shaped object OB" means a part to be landed by the shaping material injected from the injection port 61i in the vicinity of a position immediately below the injection port 61i. In this embodiment, a size of the gap G is larger than a hole diameter of the injection port 61i. Therefore, the shaping material injected from the injection port 61i is deposited on the upper surface OBt of the three-dimensional shaped object OB in a free state of not being pressed against the upper surface OBt of the three-dimensional shaped object OB being manufactured.

Figure 45:
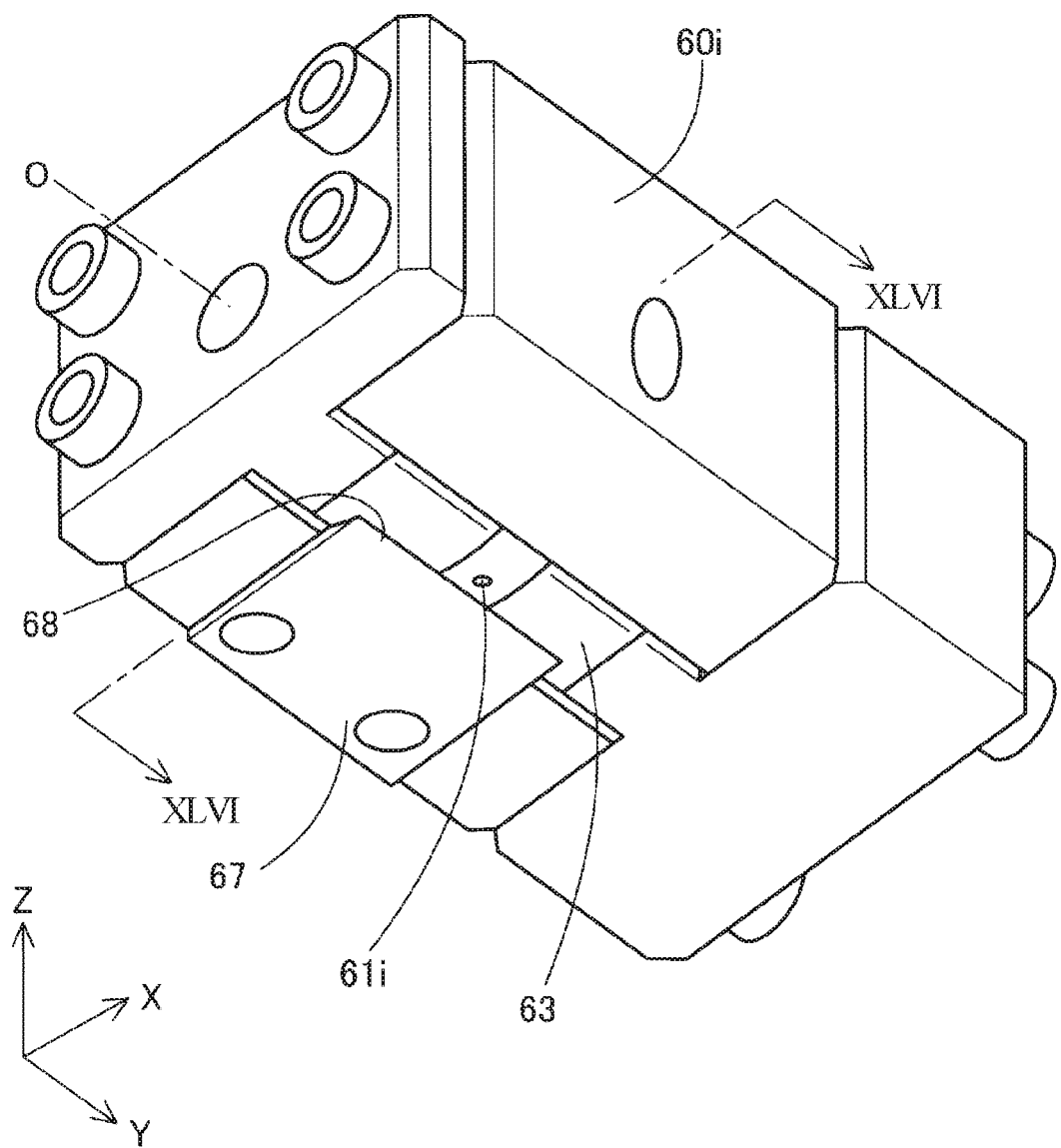
FIG. 45 is a perspective view of the injection section as viewed from a lower surface side.
Figure 46:
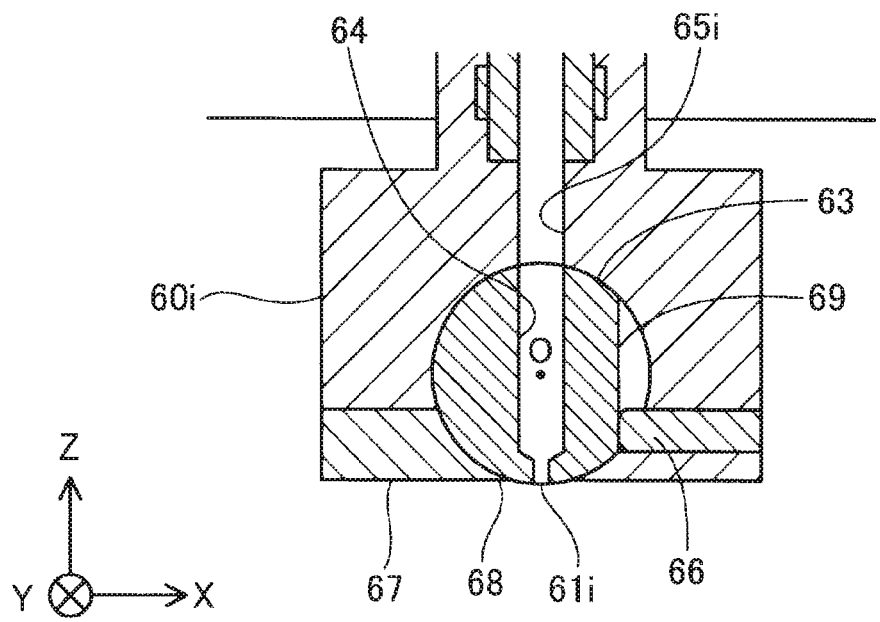
FIG. 46 is a cross-sectional view taken along a line XLVI-XLVI in FIG. 45.

FIG. 45 is a perspective view of the injection section 60*i* as viewed from a lower surface side. FIG. 46 is a cross-sectional view taken along a line XLVI-XLVI in FIG. 45. As shown in FIG. 46, the injection section 60*i* includes a first flow path 65*i* and a rotating body 63. The first flow path 65*i* communicates with the communication hole 56 (FIG. 41). Therefore, the shaping material is supplied from the plasticization section 90 to the first flow path 65*i*.

The rotating body 63 has a substantially columnar shape having a center axis O along a horizontal direction. The rotating body 63 is configured to be rotatable about the center axis O in the injection section 60*i* within a predetermined angular range. The control section 300 drives the actuator 70*i*, and thus rotation of the rotating body 63 is controlled.

The rotating body 63 has a second flow path 64 capable of communicating with the first flow path 65*i* and an injection port 61*i* communicating with the second flow path 64. A hole diameter of the injection port 61*i* is smaller than a hole diameter of a part of the second flow path 64 excluding the injection port 61*i*. In this embodiment, at the first rotational position (position shown in FIG. 46) which is a reference position of the rotating body 63, the second flow path 64 is configured as a linear flow path along a vertical direction. At this first rotational position, an upper end of the second flow path 64 is connected to the first flow path 65*i*, and the injection port 61*i* positioned at a lower end of the second flow path 64 faces vertically downward. That is, in this embodiment, in a case where the rotating body 63 is at the first rotational position, the first flow path 65*i* and the second flow path 64 are brought into a communicating state, and the shaping material is injected from the injection port 61*i*. In this embodiment, an inner diameter of the second flow path 64 (an inner diameter of a part excluding the injection port 61*i*) is equal to an inner diameter of the first flow path 65*i*.

The rotating body 63 of this embodiment includes a flat portion 69. The flat portion 69 is configured by forming a part of an outer periphery of the rotating body 63 in a flat shape along a direction in which the second flow path 64 extends. At the first rotational position, a tip portion of the pin 66 extending from a horizontal direction toward the flat portion 69 comes into contact with a lower end portion of the flat portion 69. Due to the contact between the flat portion 69 and the pin 66, a rotation angle of the rotating body 63 is restricted. It is possible to adjust the rotation angle of the rotating body 63 by adjusting a protrusion amount of the pin 66 toward a flat portion 69 side. In this manner, it is possible to finely adjust a discharge direction of the shaping material from the injection port 61*i*.

Figure 47:
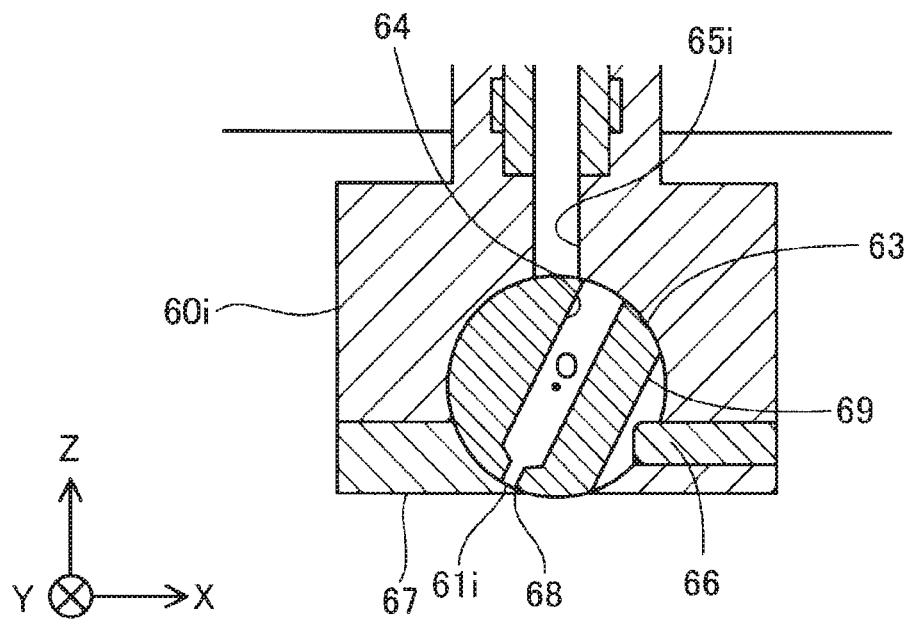
FIG. 47 is a view showing a situation where the rotating body is rotated.

FIG. 47 is a view showing a situation where the rotating body 63 is rotated. FIG. 47 shows a state where the rotating body 63 is at the second rotational position that is rotated by a predetermined angle or more from the first rotational position. At this second rotational position, the first flow path 65*i* and the second flow path are brought into a non-communicating state. In other words, the second rotational position is a position that is rotated from the first rotational position by an angle equal to or greater than an angle at which the first flow path 65*i* and the second flow path 64 are brought into a non-communicating state. At this second rotational position, since the first flow path 65*i* and the second flow path 64 are brought into a non-communicating state, injection of the shaping material from the injection port 61*i* is stopped. In other words, the control section 300 is capable of stopping the injection of the shaping material by driving the actuator 70*i* to rotate the rotating body 63 to the second rotational position. A rotation angle from the first rotational position to the second rotational position is determined depending on a length of the second flow path 64 and hole diameters of the first flow path 65*i* and the second flow path 64, and, for example, can be set to 30 degrees or less.

As shown in FIGS. 46 and 47, in this embodiment, the injection section 60*i* has a cutting portion 67. The cutting portion 67 is disposed on a direction side in which the injection port 61*i* moves in a case where the rotating body 63 rotates from the first rotational position to the second rotational position, rather than at a position of the injection port 61*i* in a case where the rotating body 63 is at the first rotational position. The cutting portion 67 includes a blade 68 for cutting the shaping material. A cutting edge of the blade 68 faces an injection port 61*i* side. Therefore, the shaping material injected from the injection port 61*i* is cut by the cutting portion 67 as the rotating body 63 rotates from the first rotational position to the second rotational position. The cut shaping material is deposited on the upper surface OBt of the three-dimensional shaped object OB. At the second rotational position, the injection port 61*i* is closed by an inner surface of the blade 68. In a case of resuming injection of the shaping material, the control section 300 drives the actuator 70*i* to rotate the rotating body 63 from the second rotational position to the first rotational position. By doing so, the first flow path 65*i* and the second flow path are brought into a communicating state again and injection of the shaping material from the injection port 61*i* is resumed.

According to the three-dimensional shaping apparatus 100*i* of this embodiment as described above, since the injection of the shaping material can be stopped by rotating the rotating body 63 having the injection port 61*i*, it is possible to stop the injection of the shaping material with good response. In addition, since the injection can be resumed by rotating the rotating body 63, it is possible to also increase responsiveness of initiation of the injection. Therefore, according to this embodiment, it is possible to suppress excessive injection of the shaping material and delayed injection, so that shaping accuracy and shaping speed of the three-dimensional shaped object OB is increased.

Further, in this embodiment, since the shaping material injected from the injection port 61*i* can be cut by the cutting portion 67, it is possible to adapt a shape of an end of the shaping material to a certain shape.

Therefore, it is possible to further increase shaping accuracy of the three-dimensional shaped object OB. In addition, in a case where the injection of the shaping material is stopped, since the injection port 61*i* is closed by the cutting portion 67, it is possible to suppress leakage of the shaping material remaining in the second flow path 64 from the injection port 61*i*. Therefore, it is possible to further enhance shaping accuracy of the three-dimensional shaped object OB.

Further, in this embodiment, since the material is plasticized by the plasticization section 90 having the flat screw 40*i*, it is possible to decrease a size of the entire apparatus.

Although the embodiments of the invention have been described, the invention can be realized in aspects other than the above. Other aspects of the invention will be described below.

Another Configuration 1

(1) In the above embodiment, the butterfly valve 72*a* is a substantially square plate-like member in which a part of the drive shaft 76*a* is processed into a plate shape. However, the butterfly valve may be a member processed into another shape, for example, a circular plate-like member. That is, it is sufficient that the butterfly valve is capable of closing a flow path of the first flow path 65a in a case of being disposed at the first position, and is capable of adjusting a flow rate of the shaping material in the first flow path 65a in a case of being disposed at the second position or the third position.

(2) In the above embodiment, the butterfly valve 72a is a substantially square plate-like member having a thickness Th that is one-third of the diameter Wd of the first flow path 65a. However, the thickness of the butterfly valve is not limited thereto. In addition to a mode in which the butterfly valve has a thickness of less than one-third, it is also possible to adopt a mode in which butterfly valve has a thickness of larger than one-third. In such a mode, the butterfly valve is designed to be able to withstand a pressure due to flow of the shaping material, and it is possible to adopt a mode in which the butterfly valve is capable of closing the flow path of the first flow path 65a in a case of being disposed at the first position, and is capable of adjusting the flow rate of the shaping material in the first flow path 65a in a case of being disposed at the second position or the third position.

(3) In the above embodiment, the drive shaft 76a is provided so as to be perpendicular to the flow direction Fd of the shaping material in the first flow path 65a. However, the drive shaft may have, as the axial direction, a direction not perpendicular to the flow direction of the shaping material in the first flow path. In such a mode, for example, in a case where the butterfly valve is a spherical valve having an opening, or the like, by rotation of the drive shaft about the central axis AX so that an opening shape of the valve projected parallel to the flowing direction with respect to a surface perpendicular to the flow direction of the shaping material is changed, it is possible to adopt a mode in which the butterfly valve is capable of closing the flow path of the first flow path in a case of being disposed at the first position, and is capable of adjusting the flow rate of the shaping material in the first flow path in a case of being disposed at the second position or the third position.

Another Configuration 2

In the above embodiment, in the suction section 75, a negative pressure is generated in the first flow path 65a by moving the rod 77 in the branched flow path 79. On the other hand, the suction section 75 may generate a negative pressure in the first flow path 65a by another configuration. For example, the suction section 75 may generate a negative pressure in the first flow path 65a by sucking the shaping material into the branched flow path 79 due to a suction force by a pump. In a case of this configuration, the shaping material sucked into the branched flow path 79 may be recycled by being circulated to the flat screw 40, or may be sent out to an outside of the apparatus as it is.

Another Configuration 3

(1) In the above embodiment, the purge section 80 is provided on a nozzle 61 side (that is, a downstream side) of a position where the flow rate regulation mechanism 70a is provided in the first flow path 65a. However, it is possible to adopt a mode in which the purge section is provided on an upstream side of the position where the flow rate regulation mechanism is provided in the first flow path. In such a mode, it is possible to adopt a mode in which the control section performs control of discharging the shaping material remaining in the first flow path by driving of the purge section, and then of driving the flow rate regulation mechanism to close the first flow path.

(2) In the above embodiment, the delivery port 86 of the purge section 80 is an opening provided in the first flow path 65a. However, a mode in which the delivery port includes a lid portion for closing the opening may be adopted. It is possible to adopt a mode in which the lid portion is formed, for example, of a rubber having a notch radially extending from the center portion of a surface in contact with the first flow path.

(3) In the above embodiment, the shaping material supply device 60a includes both the flow rate regulation mechanism 70a and the purge section 80. However, a mode in which the purge section is not provided and only the flow rate regulation mechanism is provided may be adopted. In addition, a mode in which the shaping material supply device includes the flow rate regulation mechanism, the purge section, and a suction section may be adopted, and a mode in which the shaping material supply device includes the flow rate regulation mechanism and the suction section, and does not include the purge section may be adopted.

Another Configuration 4

(1) In the above embodiment, the butterfly valve 72d is a substantially square plate-like member in which a part of the valve drive shaft 76d is processed into a plate shape. However, the butterfly valve may be a member processed into another shape, for example, a circular plate-like member. That is, it is sufficient that the butterfly valve is capable of closing a flow path of the second flow path in a case of being disposed at the first position, and is capable of adjusting a flow rate of the shaping material in the second flow path in a case of being disposed at the second position or the third position.

(2) In the above embodiment, the butterfly valve 72d is a substantially square plate-like member having a thickness Th that is one-third of the diameter Wd of the second flow path 64. However, the thickness of the butterfly valve is not limited thereto. In addition to a mode in which the butterfly valve has a thickness of less than one-third, it is also possible to adopt a mode in which butterfly valve has a thickness of larger than one-third. In such a mode, the butterfly valve is configured to be able to withstand a pressure due to flow of the shaping material, and it is possible to adopt a mode in which the butterfly valve is capable of closing the flow path of the second flow path 64 in a case of being disposed at the first position, and is capable of adjusting the flow rate of the shaping material in the second flow path 64 in a case of being disposed at the second position or the third position.

(3) In the above embodiment, the valve drive shaft 76d is provided so as to be perpendicular to the flow direction Fd of the shaping material in the second flow path 64. However, the drive shaft may have, as the axial direction, a direction not perpendicular to the flow direction of the shaping material in the second flow path. In such a mode, for example, in a case where the butterfly valve is a spherical valve having an opening, or the like, by rotation of the drive shaft about the central axis AX so that an opening shape of the valve projected parallel to the flowing direction with respect to a surface perpendicular to the flow direction of the shaping material is changed, it is possible to adopt a mode in which the butterfly valve is capable of closing the flow path of the second flow path in a case of being disposed at the first position, and is capable of adjusting the flow rate of the shaping material in the second flow path in a case of being disposed at the second position or the third position.

(4) In the above embodiment, the shaping material supply device 60d includes the cutting portion 67. On the other hand, the shaping material supply device 60d may not include the cutting portion 67. In such a mode, it is possible to adopt a mode in which a member for closing the nozzle 61d is provided in a case where the rotating body 63 is rotated from the first rotational position to the second rotational position. In this manner, since the first flow path 65*d* and the second flow path 64 are brought into a non-communicating state, it is possible to stop discharge of the shaping material with good response.

(5) In the above embodiment, the cutting portion 67 includes the blade 68 for cutting the shaping material. On the other hand, the cutting portion 67 may include a wire for cutting the shaping material. By cutting with the blade 68 or the wire, it is possible to cut the shaping material with a simple configuration and to control a shape of an end of the shaping material delivered to an outside of the nozzle 61*d* to a certain shape.

(6) In the above embodiment, the shaping material production section 30*d* includes the flat screw 40, and at least a part of the material is melted by using the flat screw 40. On the other hand, the shaping material production section 30*d* may perform melting of the material by measures other than the flat screw. For example, the shaping material production section 30*d* may be configured as a common injection equipment including a cylinder, an elongated screw housed in the cylinder, and a heater disposed around the cylinder.

(7) In the above embodiment, the flat portion 69 is provided on the rotating body 63. However, the flat portion 69 and the pin 66 may be omitted.

Another Configuration 5

(1) In the flow rate regulation mechanism 70*e* of the above embodiment, the shutter portion 72*e* may be omitted. In the shutter drive shaft 76*e*, an end thereof may move so as to traverse the second flow path 64*e*, thereby opening and closing the second flow path 64*e*. The shutter portion of the flow rate regulation mechanism may be configured to have a plurality of plate-like members disposed in an overlapped manner. The shutters may, for example, be configured to move in different directions so as to change an opening area of the second flow path 64*e*, thereby opening and closing the second flow path 64*e*.

(2) In the flow rate regulation mechanism 70*e* of the above embodiment, a position of the shutter portion 72*e* is reciprocated parallel to the center axis AX by a reciprocating movement of the shutter drive shaft 76*e*. However, it is possible to adopt a mode in which a position of the shutter portion is rotationally moved by rotation of the shutter drive shaft about the center axis AX without being reciprocated parallel to the center axis AX. In addition, it is possible to adopt a mode in which a position of the shutter portion includes both a reciprocation parallel to the center axis AX and a rotational movement about the center axis AX.

(3) In the flow rate regulation mechanism 70*e* of the above embodiment, an inner diameter of a circular cross section perpendicular to the axial direction of the shutter portion 72*e* coincides with an inner diameter of the second flow path 64*e*. However, the inner diameter of the circular cross section perpendicular to the axial direction of the shutter portion may not coincide with the inner diameter of the second flow path. For example, by making the inner diameter of the shutter portion larger than the inner diameter of the second flow path, it is possible to facilitate connection between the second flow path and the shutter portion. In addition, shapes thereof may not coincide with each other, such as a shape of the cross section perpendicular to the axial direction of the shutter portion is substantially square and a shape of the cross section of the second flow path is circular.

(4) In the flow rate regulation mechanism 70*e* of the above embodiment, the shutter drive shaft 76*e* includes one shutter portion 72*e*. However, it is possible to adopt a mode in which the shutter drive shaft includes a plurality of shutter portions. For example, by connecting a shutter portion of a predetermined inner diameter among the plurality of shutter portions with the second flow path, it is possible to control a flow rate of the shaping material.

Another Configuration 6

(1) In the above embodiment, the shaping material is used as a material for shaping a member having a three-dimensional shape. However, the material for shaping the member having a three-dimensional shape can be a thermosetting resin or a metal. That is, any material can be adopted as long as it is capable of having fluidity and viscosity suitable for shaping a member having a three-dimensional shape due to melting of at least a part thereof.

(2) In the above embodiment, a member constituting the nozzle 61*f* and a member constituting the flow path 65*f* are different from each other (see FIG. 30). However, the member constituting the nozzle 61*f* for supplying the melted shaping material to an outside and the member constituting the flow path 65*f* may be integrally molded. In such a mode, it is possible to understand, as a "downstream part" of the flow path, a partial flow path extending toward an opening of the nozzle in the same direction as a discharge direction of the shaping material from the nozzle.

(3) In the above embodiment, the transport direction Af of the shaping material from the nozzle coincides with the gravity direction (the − side direction in the Z axis direction) (see FIGS. 33 to 35 and FIGS. 38 to 40). However, the transport direction of the shaping material from the nozzle may be another direction such as upward or horizontal direction.

Another Configuration 7

(1) In the above embodiment, the shaping material production section 30*f* includes the flat screw 40*f* (see FIGS. 30 to 32). However, it is also possible to adopt a mode in which the shaping material production section for melting the material does not include the flat screw. For example, it is possible to adopt a mode in which a groove portion for transporting the material is provided on a columnar side surface of a rotating shaft in the shaping material production section.

(2) In the above embodiment, the heater 58, as the first heating portion, is a part of an electric circuit and generates heat due to electric resistance thereof (see FIG. 30). However, as the first heating portion for heating the material, it is possible to adopt another mode such as a device that heats the closure member by circulation of a fluid as a medium that transmits heat or an induction heater.

Another Configuration 8

(1) In the above embodiment, the flow path in the nozzle 61*f* has the first partial flow path 61*tp* in which a circular cross-sectional shape of an internal space becomes smaller as it goes downstream (FIGS. 33 to 35 and FIGS. 38 to 40). However, the flow path in the nozzle including the first partial flow path and the second partial flow path can be configured to have a cross-sectional shape other than a circle such as (i) a polygon such as a tetragon or a hexagon, (ii) an ellipse or oval, and (iii) a shape having a convex part toward an inside such as a star shape. In addition, a flow path part in which a cross-sectional shape of an internal space becomes smaller as it goes downstream may be provided in the flow path inside the nozzle irrespective of a cross-sectional shape of the flow path, or it is also possible to provide the flow path in the nozzle so that a shape of the flow path of the internal space is constant without providing such a part. In addition, it is also possible to provide a flow path in which a flow path shape of an internal space changes in a multistage manner.

(2) In the above embodiment, the closure pins 72f, 72g, 72h are moved along the transport direction Af of the shaping material (see FIGS. 33 to 35, and FIGS. 38 and 39). However, the closure members closing the nozzle may be configured to take different positions with respect to the transport direction of the shaping material. That is, as a result of being moved in a direction different from the transport direction of the shaping material, the closure members may be configured to take different positions in a case of being evaluated in the transport direction of the shaping material.

Another Configuration 9

(1) In the above embodiment, the nozzle 61f includes the second partial flow path 61sp in which the cross-sectional shape of the internal space is constant with respect to the transport direction Af of the shaping material to the tip (FIGS. 33 to 35 and FIGS. 38 to 40). However, it is also possible to adopt a mode in which the nozzle does not include the second partial flow path, in which the cross-sectional shape of the internal space is constant, at the tip part of the flow path. That is, the flow path part in which the circular cross-sectional shape of the internal space becomes smaller as it goes downstream may reach the opening at the tip. In addition, the flow path part in which the circular cross-sectional shape of the internal space becomes larger as it goes downstream may reach the opening at the tip.

(2) In the seventh embodiment and the eighth embodiment, the tip part 72sp of the closure pin 72f has substantially the same size as the second partial flow path 61sp with respect to a displacement direction (which is the same as the transport direction Af of the shaping material in the nozzle 61f). However, it is possible to adopt a mode in which the first closure portion of the closure member has a length equal to or greater than the second partial flow path. That is, it is sufficient that a shape of the first closure portion of the closure member and a displacement amount by the drive portion are secured, so that the second partial flow path of the nozzle is occupied by the first closure portion of the closing member up to the opening.

Another Configuration 10

In the sixth embodiment, the closure pin 72f has a cylindrical shape, and in the second and eighth embodiments, the closure pin 72f has a shape in which two parts having different diameters are connected by a tapered part (tapered parts 72gtp, 72htp) (FIGS. 33 to 35 and FIGS. 38 to 40). However, the closure member can have other shapes. For example, a shape (for example, a feather-like part) for controlling flow of the shaping material may be provided in a part other than the part that is inserted into the second partial flow path of the nozzle.

Another Configuration 11

In the eighth embodiment, the heating portion 71 as the second heating portion is a part of an electric circuit and generates heat due to electric resistance thereof (see FIG. 40). However, as the second heating portion for heating the closure member, it is possible to adopt another mode such as a mode in which the closure member is heated by flowing of a fluid as a medium that transmits heat or an induction heater.

Another Configuration 12

In the eighth embodiment, the cooling portion 67h cools the nozzle by flowing of a fluid as a medium that transmits heat (see FIG. 40). However, it is possible to adopt another mode such as a mode in which heat is dissipated from radiation fins including radiation fins in the cooling portion for cooling the tip portion of the nozzle.

Another Configuration 13

In the above embodiment, the flow path 65f includes the downstream part 651, the upstream part 652, and the connection part 653, which are connected to one another at directions different by 45 degrees in the respective connection parts. However, it is possible to adopt a mode in which the flow path for supplying the shaping material to the nozzle does not include the connection part 653. In addition, parts other than the downstream part 651, the upstream part 652, and the connection part 653, which are connected to one another at directions different by 45 degrees, are provided in the respective connection parts. Furthermore, the downstream part and the upstream part may be connected at an angle other than 45 degrees, such as 60 degrees and 90 degrees. However, in order to efficiently supply the shaping material, the connection angle of the adjacent flow path parts is preferably less than 90 degrees, more preferably 60 degrees or less, and even more preferably 45 degrees or less.

Further, the flow path for supplying the shaping material to the nozzle may have a curved part. For example, a mechanism for displacing the closure member, such as a member capable of expanding and contracting, and generating a driving force for expansion and contraction, may be provided in the flow path for supplying shaping material to the nozzle.

Another Configuration 14

In the above embodiment, the technical contents have been described as the three-dimensional shaping apparatus 100f. However, the discharge unit 110f as a shaping material supply device can be applied to an apparatus for supplying the shaping material to a desired position on a plane, and can also be applied to an apparatus for supplying the shaping material in a linear shape.

Another Configuration 15

In the above embodiment, a position of the nozzle 61f is fixed, and the shaping pedestal 220 moves (see FIGS. 30 and 36). However, it is also possible to adopt a mode in which a member having a three-dimensional shape is shaped by moving a head in a three-dimensional space while the shaping pedestal is fixed. In addition, displacement with respect to some coordinate axes of the three coordinate axes in the three-dimensional space may be realized by moving the head, and displacement with respect to the other some partial coordinate axes may be realized by moving the shaping pedestal. Furthermore, the head and the shaping pedestal may be configured to be displaceable independently from each other in the same direction (coordinate axis).

Another Configuration 16

(1) In the above embodiment, the three-dimensional shaping apparatus 100i includes a cutting portion 67. On the other hand, the three-dimensional shaping apparatus 100i may not include the cutting portion 67. Even in a case where the cutting portion 67 is not included, as the rotating body 63 is rotated, the first flow path 65i and the second flow path 64 are brought into a non-communicating state. Thus, it is possible to stop discharge of the shaping material with good response.

(2) In the above embodiment, the cutting portion 67 includes a blade 68 for cutting the shaping material. On the other hand, the cutting portion 67 may include a wire for cutting the shaping material. By cutting with the blade 68 or the wire, it is possible to cut the shaping material with a simple configuration and to control a shape of an end of the shaping material delivered to an outside of the injection port 61i to a certain shape.

(3) In the above embodiment, the plasticization section 90 includes the flat screw 40i, and plasticizes the material by using the flat screw 40i. On the other hand, the plasticization section 90 may plasticize the material by measures other than the flat screw. For example, the plasticization section 90 (injection unit 110*i*) may be configured as a common injection equipment including a cylinder, an elongated screw housed in the cylinder, and a heater disposed around the cylinder.

In the above embodiment, the three-dimensional shaping apparatus 100*i* may include a cooling mechanism for cooling the cutting portion 67. For example, as such a cooling mechanism, a fan or a gas spraying apparatus that generates airflow towards the cutting portion 67 may be provided. By cooling the cutting portion 67, it is possible to stabilize a shape of the cut surface of the shaping material.

Others

The disclosure is not limited to the above embodiments, examples, and modifications, and can be realized in various configurations within a scope that does not depart from the gist thereof. For example, in order to solve some or all of the above-mentioned problems, or to achieve some or all of the above-mentioned effects, the technical features in the embodiments, examples, and modifications corresponding to technical features in the respective aspects described in the SUMMARY section can be replaced or combined in an appropriate manner. Also, unless the technical features are described as essential in this specification, it is possible to delete such features in an appropriate manner.

What is claimed is:

1. A three-dimensional shaping apparatus comprising:
   a first flow path through which a shaping material flows;
   a nozzle that is configured to communicate with the first flow path and discharge the shaping material; and
   a flow rate regulation mechanism that includes a butterfly valve, a drive shaft, and a valve driver, the butterfly valve being provided in the first flow path, the valve driver being configured to rotate the drive shaft,
   wherein the butterfly valve is a part of the drive shaft,
   when the butterfly valve is at a first position, the butterfly valve prevents the shaping material from flowing through the first flow path, and
   when the butterfly valve is at a second positon different from the first position, the shaping material flows through the first flow path via the butterfly valve.

2. The three-dimensional shaping apparatus according to claim 1,
   wherein the butterfly valve is a plate member rotatably disposed in the first flow path,
   a first cross section area of a first part of the first flow path and a second cross section area of a second part of the first flow path along a plane perpendicular to a flow direction of the shaping material in the first flow path are different from each other, and the first cross section area is larger than the second cross section area, and
   the plate member is disposed in the first part of the first flow path.

3. The three-dimensional shaping apparatus according to claim 1, further comprising:
   a suction member that is configured to suck the shaping material into a branched flow path connected to the first flow path so that a negative pressure is generated in the first flow path.

4. The three-dimensional shaping apparatus according to claim 1, further comprising:
   a purge member that is connected to the first flow path, the purge member being configured to deliver gas into the first flow path.

5. The three-dimensional shaping apparatus according to claim 4,
   wherein the purge member is located closer to the nozzle than the butterfly valve along a flow direction of the shaping material in the first flow path.

6. The three-dimensional shaping apparatus according to claim 4, further comprising:
   a memory configured to store a program; and
   a processor configured to execute the program so as to:
      control the valve driver to locate the butterfly valve at the first position; and
      control the purge member to deliver the gas into the first flow path after the butterfly valve is located at the first position.

7. The three-dimensional shaping apparatus according to claim 1, further comprising:
   a shaping material production member that is configured to melt at least a part of a material to produce the shaping material,
   wherein the shaping material production member includes:
      a facing member that has a heater and a communication hole communicating with the first flow path; and
      a flat screw that faces the facing member, is rotated to send the material to the communication hole while melting at least a part of the material to produce the shaping material, and includes a groove supplying the shaping material to the communication hole, and
   at least a part of the material supplied between the flat screw and the facing member is melted due to rotation of the flat screw and heating by the heater, and the shaping material is produced.

* * * * *